US012666188B2

(12) United States Patent
Zhang et al.

(10) Patent No.: US 12,666,188 B2
(45) Date of Patent: Jun. 23, 2026

(54) ACOUSTIC OUTPUT APPARATUS AND METHOD THEREOF

(71) Applicant: SHENZHEN SHOKZ CO., LTD., Shenzhen (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 264 days.

(21) Appl. No.: 18/451,088

(22) Filed: Aug. 16, 2023

(65) Prior Publication Data

US 2023/0396912 A1 Dec. 7, 2023

Related U.S. Application Data

(63) Continuation of application No. 17/444,834, filed on Aug. 11, 2021, now Pat. No. 11,743,627, which is a
(Continued)

(30) Foreign Application Priority Data

| Apr. 30, 2019 | (CN) | ......................... | 201910364346.2 |
| Sep. 19, 2019 | (CN) | ......................... | 201910888067.6 |
| Sep. 19, 2019 | (CN) | ......................... | 201910888762.2 |

(51) Int. Cl.
| *H04R 1/10* | (2026.01) |
| *G02C 11/00* | (2006.01) |
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
None
See application file for complete search history.

(56) References Cited

U.S. PATENT DOCUMENTS

| 5,327,506 A | 7/1994 | Stites, III |
| 6,062,337 A | 5/2000 | Zinserling |
(Continued)

FOREIGN PATENT DOCUMENTS

| CN | 106792304 A | 5/2017 |
| CN | 109640209 A | 4/2019 |
(Continued)

OTHER PUBLICATIONS

International Search Report in PCT/CN2020/087002 mailed on Jul. 14, 2020, 4 pages.
(Continued)

*Primary Examiner* — Andrew Sniezek
(74) *Attorney, Agent, or Firm* — METIS IP LLC

(57) ABSTRACT

The present disclosure relates to an acoustic output apparatus. The acoustic output apparatus may include an earphone core including at least one acoustic driver for outputting sound though one or more sound guiding holes set on the acoustic output apparatus, a controller configured to cause the at least one acoustic driver to output sound, a power source assembly configured to provide electrical power to the earphone core, the one or more sensors, and the controller, and an interactive control component configured to allow an interaction between a user and the acoustic output apparatus.

17 Claims, 27 Drawing Sheets

910

Acoustic route 945
Transducer 943
Transducer 953
First sound guiding holes 947
E
d₁

Related U.S. Application Data continuation of application No. 17/170,920, filed on Feb. 9, 2021, now Pat. No. 11,122,359, which is a continuation of application No. PCT/CN2020/087002, filed on Apr. 26, 2020.

(51) Int. Cl.

| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/02* | (2006.01) |
| *H04R 1/1025* | (2026.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.

CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | | |
|---|---|---|---|
| 10,555,106 B1 * | 2/2020 | Mehra | G06F 3/165 |
| 10,609,465 B1 | 3/2020 | Wakeland et al. | |
| 11,122,359 B2 * | 9/2021 | Zhang | H04R 1/347 |
| 11,122,369 B2 | 9/2021 | Zhang et al. | |
| 11,743,627 B2 * | 8/2023 | Zhang | H04R 1/02 |
| | | | 381/150 |
| 2007/0098198 A1 | 5/2007 | Hildebrandt | |
| 2009/0147981 A1 | 6/2009 | Blanchard et al. | |
| 2009/0279729 A1 * | 11/2009 | Huang | H04R 1/1016 |
| | | | 381/345 |
| 2010/0310106 A1 | 12/2010 | Blanchard et al. | |
| 2011/0170730 A1 | 7/2011 | Zhu | |
| 2012/0300956 A1 | 11/2012 | Horii | |
| 2013/0051585 A1 * | 2/2013 | Karkkainen | H04R 1/1075 |
| | | | 381/151 |
| 2013/0108068 A1 | 5/2013 | Poulsen et al. | |
| 2015/0055814 A1 * | 2/2015 | Liu | H04R 5/033 |
| | | | 381/373 |
| 2017/0230741 A1 | 8/2017 | Matsuo et al. | |
| 2018/0376231 A1 | 12/2018 | Pfaffinger | |
| 2019/0014425 A1 | 1/2019 | Liao et al. | |
| 2019/0052954 A1 * | 2/2019 | Rusconi Clerici Beltrami | |
| | | | G10K 11/26 |
| 2019/0238971 A1 | 8/2019 | Wakeland et al. | |
| 2020/0100035 A1 * | 3/2020 | Sanger | H04S 7/304 |
| 2020/0137476 A1 | 4/2020 | Shinmen et al. | |
| 2020/0169801 A1 | 5/2020 | Zhu | |
| 2020/0252708 A1 | 8/2020 | Zhu | |
| 2021/0274281 A1 | 9/2021 | Zhang et al. | |

FOREIGN PATENT DOCUMENTS

| | | |
|---|---|---|
| KR | 20170133754 A | 12/2017 |
| WO | 2015087093 A1 | 6/2015 |

OTHER PUBLICATIONS

Written Opinion in PCT/CN2020/087002 mailed on Jul. 14, 2020, 5 pages.

* cited by examiner

100

300

Button Control Module
310

Voice Control Module 320

Posture Control Module
330

Auxiliary Control Module
340

Indication Module 350

320

Receiving Unit 322

Processing Unit 324

Recognition Unit 326

Control Unit 328

910

920

<u>1010</u>

First sound
guiding holes
1047

Transducers
1043

$d_1$

Acoustic
routes 1045

<u>1020</u>

Second sound
guiding holes
1057

Transducers
1053

$d_2$

Acoustic
routes 1055

1100

Signal processing module

Signal processing module

Low-frequency ($d_1$) two point sources        High-frequency ($d_2$) two point sources Frequency division point    f (Hz)

1400

1400

1420

1410

1430

4300

ACOUSTIC OUTPUT APPARATUS AND METHOD THEREOF

CROSS-REFERENCE TO RELATED APPLICATIONS

This application is a continuation of U.S. patent application Ser. No. 17/444,834, filed on Aug. 11, 2021, which a continuation of U.S. patent application Ser. No. 17/170,920 (now U.S. Pat. No. 11,122,359), filed on Feb. 9, 2021, which is a continuation of International Application No. PCT/CN2020/087002, filed on Apr. 26, 2020, which claims priority to Chinese Patent Application No. 201910888067.6, filed on Sep. 19, 2019, Chinese Patent Application No. 201910888762.2, filed on Sep. 19, 2019, and Chinese Patent Application No. 201910364346.2, filed on Apr. 30, 2019, the contents of each of which are hereby incorporated by reference.

TECHNICAL FIELD

The present disclosure generally relates to acoustic devices, and more particularly, relates to a smart wearable apparatus and method for acoustic output.

BACKGROUND

With the development of acoustic technology, acoustic output apparatus have been widely used. An open binaural acoustic output apparatus is a portable audio apparatus that facilitates sound conduction within a specific range of a user. In this case, the user may hear sound in ambient environment when the acoustic output apparatus delivers sound (e.g., a piece of music, a news broadcast, a weather forecast, etc.) to the user. However, an open structure of the open binaural acoustic output apparatus may also lead to a sound leakage of a certain extent. Therefore, it is desirable to provide an acoustic output apparatus and/or method for reducing sound leakage and enhancing sound delivered to the user, thereby improving an audio experience of the user.

SUMMARY

An aspect of the present disclosure relates to an acoustic output apparatus. The acoustic output apparatus may include an earphone core including at least one acoustic driver for outputting sound though one or more sound guiding holes set on the acoustic output apparatus. The acoustic output apparatus may further include a controller configured to cause the at least one acoustic driver to output sound. The acoustic output apparatus may further include a power source assembly configured to provide electrical power to the earphone core, the one or more sensors, and the controller. And the acoustic output apparatus may also include an interactive control component configured to allow an interaction between a user and the acoustic output apparatus.

DETAILED DESCRIPTION

Figure 1:
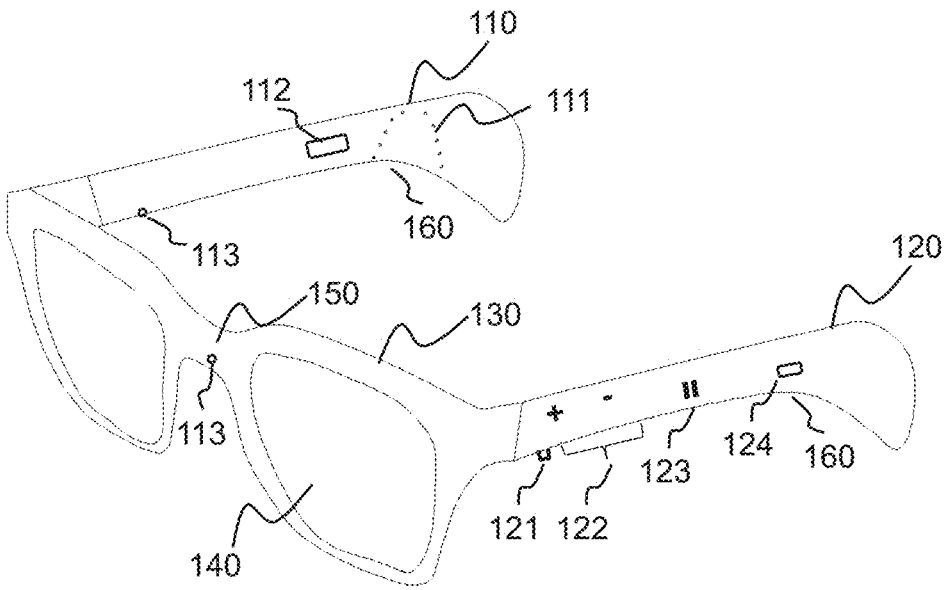
FIG. 1 is a schematic diagram illustrating an exemplary acoustic output apparatus embodied as a glasses according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

An acoustic output apparatus in the present disclosure may refer to a device having a sound output function. In practical applications, the acoustic output apparatus may be implemented by products of various types, such as bracelets, glasses, helmets, watches, clothings, or backpacks. For illustration purposes, a glasses with a sound output function may be provided as an example of the acoustic output apparatus. Exemplary glasses may include myopia glasses, sports glasses, hyperopia glasses, reading glasses, astigmatism lenses, wind/sand-proof glasses, sunglasses, ultraviolet-proof glasses, welding mirrors, infrared-proof mirrors, and virtual reality (VR) glasses, augmented Reality (AR) glasses, mixed reality (MR) glasses, mediated reality glasses, or the like, or any combination thereof.

FIG. 1 is a schematic diagram illustrating an exemplary acoustic output apparatus embodied as a glasses according to some embodiments of the present disclosure. As shown in FIG. 1, a glasses 100 may include a frame and lenses 140. The frame may include legs 110 and 120, a lens ring 130, a nose pad 150, or the like. The legs 110 and 120 may be used to support the lens ring 130 and the lenses 140, and fix the glasses 100 on the user's face. The lens ring 130 may be used to support the lenses 140. The nose pad 150 may be used to fix the glasses 100 on the user's nose.

The glasses 100 may be provided with a plurality of components which may implement different functions. Exemplary components may include a power source assembly for providing power, an acoustic driver for generating sound, a microphone for detecting external sound, a bluetooth module for connecting the glasses 100 to other devices, a controller for controlling the operation of other components, or the like, or any combination thereof. In some embodiments, the interior of the leg 110 and/or the leg 120 may be provided as a hollow structure for accommodating the one or more components.

The glasses 100 may be provided with a plurality of hollow structures. For example, as shown in FIG. 1, a side of the leg 110 and/or the leg 120 facing away from the user's face may be provided with sound guiding holes 111. The sound guiding holes 111 may be connected to one or more acoustic drivers that are set inside of the glasses 100 to export sound produced by the one or more the acoustic drivers. In some embodiments, the sound guiding holes 111 may be provided at a position near the user's ear on the leg 110 and/or the leg 120. For example, the sound guiding holes 111 may be provided at a rear end of the leg 110 and/or the leg 120 being far away from the lens ring 130, a bending part 160 of the leg, or the like. As another example, the glasses 100 may also have a power interface 112, which may be used to charge the power source assembly in the glasses 100. The power interface 112 may be provided on a side of the leg 110 and/or the leg 120 facing the user's face. Exemplary power interfaces may include a dock charging interface, a DC charging interface, a USB charging interface, a lightning charging interface, a wireless charging interface, a magnetic charging interface, or the like, or any combination thereof. In some embodiments, one or more sound inlet holes 113 may also be provided on the glasses 100, and may be used to transmit external sounds (for example, a user's voice, ambient sound, etc.) to the microphones in the glasses 100. The sound inlet holes 113 may be provided at a position facilitating an acquisition of the user's voice on the glasses 100, for example, a position near the user's mouth on the leg 110 and/or 120, a position near the user's mouth under the lens ring 130, a position on the nose pad 150, or any combination thereof. In some embodiments, shapes, sizes, and counts of the one or more hollow structures on the glasses 100 may vary according to actual needs. For example, the shapes of the hollow structures may include, but not limited to, a square shape, a rectangle shape, a triangle shape, a polygon shape, a circle shape, an ellipse shape, an irregular shape, or the like.

In some embodiments, the glasses 100 may be further provided with one or more button structures, which may be used to implement interactions between the user and the glasses 100. As shown in FIG. 1, the one or more button structures may include a power button 121, a sound adjustment button 122, a playback control button 123, a bluetooth button 124, or the like. The power button 121 may include a power on button, a power off button, a power hibernation button, or the like, or any combination thereof. The sound adjustment button 122 may include a sound increase button, a sound decrease button, or the like, or any combination thereof. The playback control button 123 may include a playback button, a pause button, a resume playback button, a call playback button, a call drop button, a call hold button, or the like, or any combination thereof. The bluetooth button 124 may include a bluetooth connection button, a bluetooth off button, a selection button, or the like, or any combination thereof. In some embodiments, the button structures may be provided on the glasses 100. For example, the power button may be provided on the leg 110, the leg 120, or the lens ring 130. In some embodiments, the one or more button structures may be provided in one or more control devices. The glasses 100 may be connected to the one or more control devices via a wired or wireless connection. The control devices may transmit instructions input by the user to the glasses 100, so as to control the operations of the one or more components in the glasses 100.

In some embodiments, the glasses 100 may also include one or more indicators to indicate information of one or more components in the glasses 100. For example, the indicators may be used to indicate a power status, a bluetooth connection status, a playback status, or the like, or any combination thereof. In some embodiments, the indicators may indicate related information of the components via different indicating conditions (for example, different colors, different time, etc.). Merely by way of example, when a power indicator is red, it is indicated that the power source assembly may be in a state of low power. When the power indicator is green, indicating that the power source assembly may be a state of full power. As another example, a bluetooth indicator may flash intermittently, indicating that the bluetooth is connecting to another device. The bluetooth indicator may be blue, indicating that the bluetooth may be connected successfully.

In some embodiments, a sheath may be provided on the leg 110 and/or the leg 120. The sheath may be made of soft material with a certain elasticity, such as silicone, rubber, etc., so as to provide a better sense of touch for the user.

In some embodiments, the frame may be formed integrally, or assembled by plugging, inserting, or the like. In some embodiments, materials used to manufacture the frame may include but not limited to, steel, alloy, plastic, or other single or composite materials. The steel may include but not limited to, stainless steel, carbon steel, or the like. The alloy may include but is not limited to, aluminum alloy, chromium-molybdenum steel, rhenium alloy, magnesium alloy, titanium alloy, magnesium-lithium alloy, nickel alloy, or the like. The plastic may include but not limited to, acrylonitrile-butadiene-styrene copolymer (Acrylonitrile butadiene styrene, ABS), polystyrene (PS), high impact polystyrene (HIPS), polypropylene (PP), polyethylene terephthalate (PET), polyester (PES), polycarbonate (PC), polyamide (PA), polyvinyl chloride (PVC), polyethylene and blown nylon, or the like. The single or composite materials may include but not limited to, glass fiber, carbon fiber, boron fiber, graphite fiber, graphene fiber, silicon carbide fiber, aramid fiber and other reinforcing materials; or a composite of other organic and/or inorganic materials, such as glass fiber reinforced unsaturated polyester, various types of glass steel with epoxy resin or phenolic resin, etc.

The description of the glasses 100 may be provided for illustration purposes and not intended to limit the scope of the present disclosure. For those skilled in the art, various changes and modifications may be made according to the description of the present disclosure. For example, the glasses 100 may include one or more cameras to capture environmental information (for example, scenes in front of the user). As another example, the glasses 100 may also include one or more projectors for projecting pictures (for example, pictures that users see through the glasses 100) onto a display screen.

Figure 2:
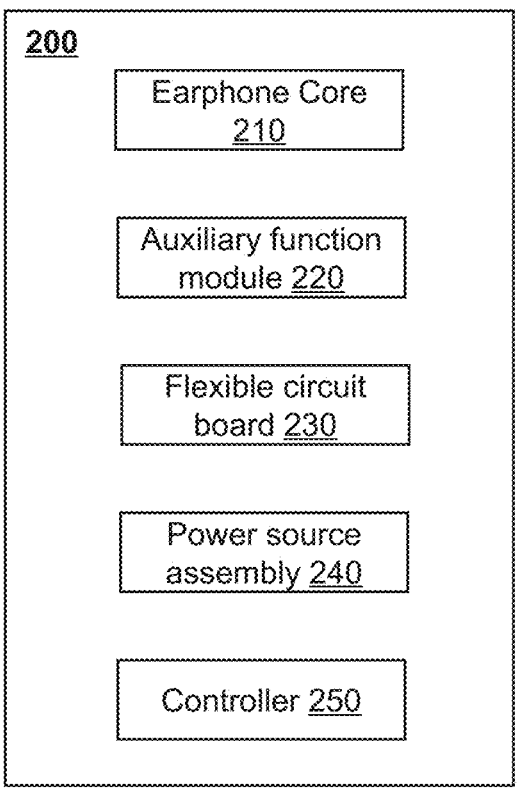
FIG. 2 is a schematic diagram illustrating exemplary components in an acoustic output apparatus according to some embodiments of the present disclosure.

FIG. 2 is a schematic diagram illustrating components in an acoustic output apparatus (e.g., the glasses 100). As shown in FIG. 2, the acoustic output apparatus 200 may include one or more of an earphone core 210, an auxiliary function module 220, a flexible circuit board 230, a power source assembly 240, a controller 250, or the like.

The earphone core 210 may be configured to process signals containing audio information, and convert the signals into sound signals. The audio information may include video or audio files with a specific data format, or data or files that may be converted into sound in a specific manner. The signals containing the audio information may include electrical signals, optical signals, magnetic signals, mechanical signals or the like, or any combination thereof. The processing operation may include frequency division, filtering, denoising, amplification, smoothing, or the like, or any combination thereof. The conversion may involve a coexistence and interconversion of energy of different types. For example, the electrical signal may be converted into mechanical vibrations that generates sound through the earphone core 210 directly. As another example, the audio information may be included in the optical signal, and a specific earphone core may implement a process of converting the optical signal into a vibration signal. Energy of other types that may coexist and interconvert to each other during the working process of the earphone core 210 may include thermal energy, magnetic field energy, and so on.

In some embodiments, the earphone core 210 may include one or more acoustic drivers. The acoustic driver(s) may be used to convert electrical signals into sound for playback. More details of the acoustic driver(s) may be disclosed elsewhere in the present disclosure, for example, FIG. 8 and the descriptions thereof.

The auxiliary function module 220 may be configured to receive auxiliary signals and execute auxiliary functions. The auxiliary function module 220 may include one or more microphones, key switches, bluetooth modules, sensors, or the like, or any combination thereof. The auxiliary signals may include status signals (for example, on, off, hibernation, connection, etc.) of the auxiliary function module 220, signals generated through user operations (for example, input and output signals generated by the user through keys, voice input, etc.), signals in the environment (for example, audio signals in the environment), or the like, or any combination thereof. In some embodiments, the auxiliary function module 220 may transmit the received auxiliary signals through the flexible circuit board 230 to the other components in the acoustic output apparatus 200 for processing.

A button module may be configured to control the acoustic output apparatus 200, so as to implement the interaction between the user and the acoustic output apparatus 200. The user may send a command to the acoustic output apparatus 200 through the button module to control the operation of the acoustic output apparatus 200. In some embodiments, the button module may include a power button, a playback control button, a sound adjustment button, a telephone control button, a recording button, a noise reduction button, a bluetooth button, a return button, or the like, or any combination thereof. The power button may be configured to control the status (on, off, hibernation, or the like) of the power source assembly module. The playback control button may be configured to control sound playback by the earphone core 210, for example, playing information, pausing information, continuing to play information, playing a previous item, playing a next item, mode selection (e.g. a sport mode, a working mode, an entertainment mode, a stereo mode, a folk mode, a rock mode, a bass mode, etc.), playing environment selection (e.g., indoor, outdoor, etc.), or the like, or any combination thereof. The sound adjustment button may be configured to control a sound amplitude of the earphone core 210, for example, increasing the sound, decreasing the sound, or the like. The telephone control button may be configured to control telephone answering, rejection, hanging up, dialing back, holding, and/or recording incoming calls. The record button may be configured to record and store the audio information. The noise reduction button may be configured to select a degree of noise reduction. For example, the user may select a level or degree of noise reduction manually, or the acoustic output apparatus

200 may select a level or degree of noise reduction automatically according to a playback mode selected by the user or detected ambient sound. The bluetooth button may be configured to turn on bluetooth, turn off bluetooth, match bluetooth, connect bluetooth, or the like, or any combination thereof. The return button may be configured to return to a previous menu, interface, or the like.

A sensor may be configured to detect information related to the acoustic output apparatus 200. For example, the sensor may be configured to detect the user's fingerprint, and transmit the detected fingerprint to the controller 250. The controller 250 may match the received fingerprint with a fingerprint pre-stored in the acoustic output apparatus 200. If the matching is successful, the controller 250 may generate an instruction that may be transmitted to each component to initiate the sound output apparatus 200. As another example, the sensor may be configured to detect the position of the acoustic output apparatus 200. When the sensor detects that the acoustic output apparatus 200 is detached from a user's face, the sensor may transmit the detected information to the controller 250, and the controller 250 may generate an instruction to pause or stop the playback of the acoustic output apparatus 200. In some embodiments, exemplary sensors may include a ranging sensor (e.g., an infrared ranging sensor, a laser ranging sensor, etc.), a speed sensor, a gyroscope, an accelerometer, a positioning sensor, a displacement sensor, a pressure sensor, a gas sensor, a light sensor, a temperature sensor, a humidity sensor, a fingerprint sensor, an image sensor, an iris sensor, an image sensor (e.g., a vidicon, a camera, etc.), or the like, or any combination thereof.

The flexible circuit board 230 may be configured to connect different components in the acoustic output apparatus 200. The flexible circuit board 230 may be a flexible printed circuit (FPC). In some embodiments, the flexible circuit board 230 may include one or more bonding pads and/or one or more flexible wires. The one or more bonding pads may be configured to connect the one or more components of the acoustic output apparatus 200 or other bonding pads. One or more leads may be configured to connect the components of the acoustic output apparatus 200 with one bonding pad, two or more bonding pads, or the like. In some embodiments, the flexible circuit board 230 may include one or more flexible circuit boards. Merely by ways of example, the flexible circuit board 230 may include a first flexible circuit board and a second flexible circuit board. The first flexible circuit board may be configured to connect two or more of the microphone, the earphone core 210, and the controller 250. The second flexible circuit board may be configured to connect two or more of the power source assembly 240, the earphone core 210, the controller 250, or the like. In some embodiments, the flexible circuit board 230 may be an integral structure including one or more regions. For example, the flexible circuit board 230 may include a first region and a second region. The first region may be provided with flexible leads for connecting the bonding pads on the flexible circuit board 230 and other components on the acoustic output apparatus 200. The second region may be configured to set one or more bonding pads. In some embodiments, the power source assembly 240 and/or the auxiliary function module 220 may be connected to the flexible circuit board 230 (for example, the bonding pads) through the flexible leads of the flexible circuit board 230.

The power source assembly 240 may be configured to provide electrical power to the components of the acoustic output apparatus 200. In some embodiments, the power source assembly 240 may include a flexible circuit board, a battery, etc. The flexible circuit board may be configured to connect the battery and other components of the acoustic output apparatus 200 (for example, the earphone core 210), and provide power for operations of the other components. In some embodiments, the power source assembly 240 may also transmit its state information to the controller 250 and receive instructions from the controller 250 to perform corresponding operations. The state information of the power source assembly 240 may include an on/off state, state of charge, time for use, a charging time, or the like, or any combination thereof. In some embodiments, the power source assembly may include a body region and a sealing region. The thickness of the body region may be greater than the thickness of the sealing region. A side surface of the sealing region and a side surface of the body region may have a shape of a stair.

According to information of the one or more components of the acoustic output apparatus 200, the controller 250 may generate an instruction to control the power source assembly 240. For example, the controller 250 may generate control instructions to control the power source assembly 240 to provide power to the earphone core 210 for generating sound. As another example, when the acoustic output apparatus 200 does not receive input information within a certain time, the controller 250 may generate a control instruction to control the power source assembly 240 to enter a hibernation state. In some embodiments, the power source assembly 240 may include a storage battery, a dry battery, a lithium battery, a Daniel battery, a fuel battery, or any combination thereof.

Merely by way of example, the controller 250 may receive a sound signal from the user, for example, "play a song", from the auxiliary function module 220. By processing the sound signal, the controller 250 may generate control instructions related to the sound signal. For example, the control instructions may control the earphone core 210 to obtain information of songs from the storage module (or other devices). Then an electric signal for controlling the vibration of the earphone core 210 may be generated according to the information.

In some embodiments, the controller 250 may include one or more electronic frequency division modules. The electronic frequency division modules may divide a frequency of a source signal. The source signal may come from one or more sound source apparatus (for example, a memory storing audio data) integrated in the acoustic output apparatus. The source signal may also be an audio signal (for example, an audio signal received from the auxiliary function module 220) received by the acoustic output apparatus 200 in a wired or wireless manner. In some embodiments, the electronic frequency division modules may decompose an input source signal into two or more frequency-divided signals containing different frequencies. For example, the electronic frequency division module may decompose the source signal into a first frequency-divided signal with high-frequency sound and a second frequency-divided signal with low-frequency sound. Signals processed by the electronic frequency division modules may be transmitted to the acoustic driver in the earphone core 210 in a wired or wireless manner. More details of the electronic frequency division modules may be disclosed elsewhere in the present disclosure, for example, FIG. 8 and the descriptions thereof.

In some embodiments, the controller 250 may include a central processing unit (CPU), an application-specific integrated circuit (ASIC), an application-specific instruction-set processor (ASIP), a graphics processing unit (GPU), a physical processing unit (PPU), a digital signal processor (DSP), a field-programmable gate array (FPGA), a program-mable logic device (PLD), a controller, a microcontroller unit, a reduced instruction set computer (RISC), a microprocessor, or the like, or any combination thereof.

In some embodiments, one or more of the earphone core 210, the auxiliary function module 220, the flexible circuit board 230, the power source assembly 230, and the controller 250 may be provided in the frame of the glasses 100. Specifically, one or more of the electronic components may be provided in the hollow structure of the leg 110 and/or the leg 120. The connection and/or communication between the electronic components provided in the leg 110 and/or the leg 120 may be wired or wireless. The wired connection may include metal cables, fiber optical cables, hybrid cables, or the like, or any combination thereof. The wireless connection may include a local area network (LAN), a wide area network (WAN), a bluetooth, a ZigBee, a near field communication (NFC), or the like, or any combination thereof.

The description of the acoustic output apparatus 200 may be for illustration purposes, and not intended to limit the scope of the present disclosure. For those skilled in the art, various changes and modifications may be made according to the description of the present disclosure. For example, the components and/or functions of the acoustic output apparatus 200 may be changed or modified according to a specific implementation. For example, the acoustic output apparatus 200 may include a storage component for storing signals containing audio information. As another example, the acoustic output apparatus 200 may include one or more processors, which may execute one or more sound signal processing algorithms for processing sound signals. These changes and modifications may remain within the scope of the present disclosure.

Figure 3:
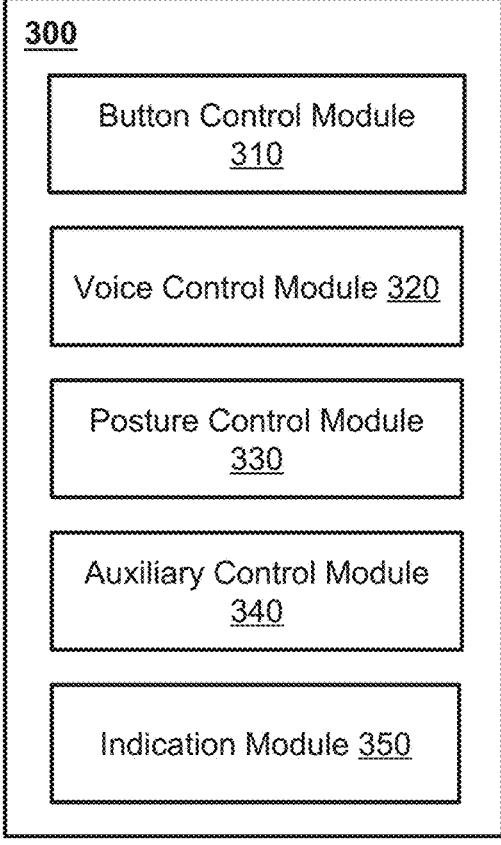
FIG. 3 is a block diagram illustrating an exemplary interactive control component in an acoustic output apparatus according to some embodiments of the present disclosure.

FIG. 3 is a block diagram illustrating an exemplary interactive control system in an acoustic output apparatus according to some embodiments of the present disclosure. In some embodiments, at least part of functions of the interactive control component 300 may be implemented by the auxiliary function module 220 illustrated in FIG. 2. For example, modules and/or units in the interactive control component 300 may be integrated in the auxiliary function module 220 as part thereof. In some embodiments, the interactive control component 300 may be disposed as an independent system in the acoustic output apparatus for interactive control (e.g., interactive control in an AR/VR scenario). In some embodiments, the interactive control component 300 may include a button control module 310, a voice control module 320, a posture control module 330, an auxiliary control module 340, and an indication control module 350.

The button control module 310 may be configured to control the acoustic output apparatus, so as to implement an interaction between a user and the acoustic output apparatus. The user may send an instruction to the acoustic output apparatus through the button control module 310 to control an operation of the acoustic output apparatus. In some embodiments, the button control module 310 may include a power button, a playback control button, a sound adjustment button, a telephone control button, a recording button, a noise reduction button, a bluetooth button, a return button, or the like, or any combination thereof. Functions of one or more buttons included in the button control module 310 may be similar to the button module of the auxiliary function module 220 illustrated in FIG. 2, and may not be repeated here. In some embodiments, the one or more buttons included in the button control module 310 may be disposed on the glasses 100. For example, the power button may be disposed on the leg 110, the leg 120, or the lens ring 130. In some embodiments, the one or more buttons included in the button control module 310 may be disposed in one or more control devices. The glasses 100 may be connected to the one or more control devices via a wired or wireless connection. The control devices may transmit instructions input by the user to the glasses 100, so as to control operations of the one or more components in the glasses 100.

In some embodiments, the button control module 310 may include two forms including physical buttons and virtual buttons. For example, when the button control module 310 includes physical buttons, the physical buttons may be disposed outside a housing of an acoustic output apparatus (e.g., the glasses 100). When the user wears the acoustic output apparatus, the physical buttons may not contact with human skin and may be exposed on the outside to facilitate user operations on the physical button. In some embodiments, an end surface of each button in the button control module 310 may be provided with an identifier corresponding to its function. In some embodiments, the identifier may include text (e.g., Chinese and/or English), symbols (e.g., the volume plus button may be marked with "+", and the volume minus button may be marked with "−"), or the like, or any combination thereof. In some embodiments, the identifier may be set on the button by means of laser printing, screen printing, pad printing, laser filler, thermal sublimation, hollow text, or the like, or any combination thereof. In some embodiments, the identifier on the button may also be disposed on the surface of the housing around the buttons. In some embodiments, control programs installed in the acoustic output apparatus may generate virtual buttons on a touch screen having an interaction function. The user may select the function, volume, file, etc. of the acoustic output apparatus through the virtual button. In addition, the acoustic output apparatus may have a combination of a touch screen and a physical button. In some embodiments, the touch screen may be or include a virtual user-interface (UI). Taking an acoustic output apparatus customized for AR as an example, the user may interact with the acoustic output apparatus via the virtual UI. One or more virtual buttons may be provided on the virtual UI. The user may select and/or touch the one or more virtual buttons to control the acoustic output apparatus. For example, the user may select a virtual sound adjustment button on the virtual UI to adjust a volume of an audio played in the virtual UI. Alternatively or additionally, the user may also adjust the volume of the audio played in the virtual UI by selecting one or more physical buttons disposed on the acoustic output apparatus.

In some embodiments, the button control module 310 may implement different interaction functions based on different operations of the user. For example, the user may click a button (a physical button or a virtual button) once to pause or start a music, a recording, etc. As another example, the user may tap the button twice quickly to answer a call. As a further example, the user may click the button regularly (e.g., clicking once every second for a total of two clicks) to start a recording. In some embodiments, the operations of the user may include clicking, swiping, scrolling, or the like, or any combination thereof. For example, the user may slide up and down on a surface of a button using his/her finger to increase or decrease volume.

In some embodiments, the functions corresponding to the button control module 310 may be customized by the user. For example, the user may adjust the functions that the button control module 310 can implement through applications settings. In addition, operation modes (e.g., the number of clicks and swipe gestures) to achieve a specific function may also be set by the user through the application. For example, an operation instruction for answering a call may be set from one click to two clicks, and an operation instruction for switching to the next or the previous song may be set from two clicks to three clicks. According to the above user-defined methods, the operation modes of the button control module 310 may conform operating habits of the user, which may avoid operating errors and improve user experience.

In some embodiments, the acoustic output apparatus may be connected to an external device through the button control module 310. For example, the acoustic output apparatus may be connected to a mobile phone through a button configured to control a wireless connection (e.g., a button controlling a Bluetooth module). Optionally, after a connection is established, the user may directly operate the acoustic output apparatus on the external device (e.g., the mobile phone) to implement one or more functions.

Figure 4:
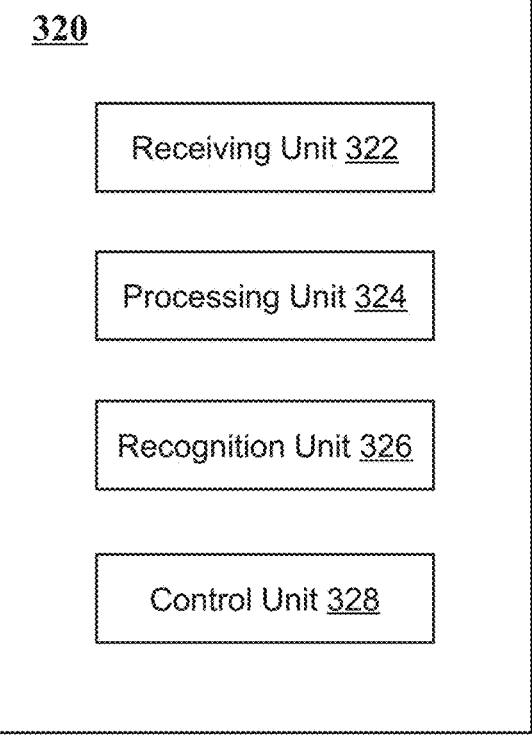
FIG. 4 is a block diagram illustrating an exemplary voice control module in an acoustic output apparatus according to some embodiments of the present disclosure.

The voice control module 320 may be configured to control the acoustic output apparatus based on voices received from the user. FIG. 4 is a block diagram illustrating an exemplary voice control module in an acoustic output apparatus according to some embodiments of the present disclosure. In some embodiments, as illustrated in FIG. 4, the voice control module 320 may include a receiving unit 322, a processing unit 324, a recognition unit 326, and a control unit 328.

The receiving unit 322 may be configured to receive a voice control instruction from a user (and/or a smart device) and send the voice control instruction to the processing unit 324. In some embodiments, the receiving unit 322 may include one or more microphones, or a microphone array. The one or more microphones or the microphone array may be housed within the acoustic output apparatus or in another device connected to the acoustic output apparatus. In some embodiments, the one or more microphones or the microphone array may be generic microphones. In some embodiments, the one or more microphones or the microphone array may be customized for VR and/or AR. In some embodiments, the receiving unit 322 may be positioned so as to receive audio signals (e.g., speech/voice input by the user to enable a voice control functionality) proximate to the acoustic output apparatus. For example, the receiving unit 322 may receive a voice control instruction of the user wearing the acoustic output apparatus and/or other users proximate to or interacting with the user. In some embodiments, when the receiving unit 322 receives a voice control instruction issued by a user, for example, when the receiving unit 322 receives a voice control instruction of "start playing", the voice control instruction may be sent to the processing unit 324.

The processing unit 324 may be communicatively connected with the receiving unit 322. In some embodiments, when the processing unit 324 receives a voice control instruction of the user from the receiving unit 322, the processing unit 324 may generate an instruction signal based on the voice control instruction, and further send the instruction signal to the recognition unit 326.

The recognition unit 326 may be communicatively connected with the processing unit 324 and the control unit 328, and configured to identify whether the instruction signal matches a preset signal. The preset signal may be previously input by the user and saved in the acoustic output apparatus (e.g., in a storage module). For example, the recognition unit 326 may perform a speech recognition process and/or a semantic recognition process on the instruction signal and determine whether the instruction signal matches the preset signal. In response to a determination that the instruction signal matches the preset signal, the recognition unit 326 may send a matching result to the control unit 328.

The control unit 328 may control the operation of the acoustic output apparatus based on the instruction signal and the matching result. Taking an acoustic output apparatus customized for VR as an example, the acoustic output apparatus may be positioned to determine a location of the user wearing the acoustic output apparatus. When the user is proximate to or facing towards a historical site, an audio associated with the historical site may be recommended to the user via a virtual interface. The user may send a voice control instruction of "start playing" for paly the audio. The receiving unit 322 may receive the voice control instruction and send it to the the processing unit 324. The processing unit 324 may generate an instruction signal according to the voice control instruction and send the instruction signal to the recognition unit 326. When the the recognition unit 326 determines that the instruction signal corresponding to the voice control instruction matches a preset signal, the control unit 328 may execute the voice control instruction automatically. That is, the control unit 328 may cause the acoustic output apparatus to start playing the audio immediately on the virtual interface.

In some embodiments, the voice control module 320 may further include a storage module, which may be communicatively connected with the receiving unit 322, the processing unit 324, and the recognition unit 326. The receiving unit 322 may receive a preset voice control instruction and send it to the processing unit 324. The processing unit 324 may generate a preset signal according to a preset voice control instruction and sends the preset signal to the storage module. When the recognition unit 326 needs to match the instruction signal received by the receiving unit 322 with the preset signal, the storage module may send the preset signal to the recognition unit 326 via the communication connection.

In some embodiments, the processing unit 324 in the voice control module 320 may further perform a denoise process on the voice control instruction. The denoising process may refer to removing ambient sound included in the voice control instruction. In some embodiments, for example, in a complex environment, the receiving unit 322 may receive a voice control instruction and send it to the processing unit 324, before the processing unit 324 generates a corresponding instruction signal according to the voice control instruction, in order to avoid ambient sounds from disturbing the recognition process of the recognition unit 326, the voice control instruction may be denoised. For example, when the receiving unit 322 receives a voice control instruction issued by a user on an outdoor road, the voice control instruction may include noisy environmental sounds such as vehicle driving, whistle on the road. The processing module 302 may reduce the influence of the environmental sound on the voice control instruction through the denoise process.

The posture control module 330 may be configured to control the acoustic output apparatus based on a posture instruction of the user. For example, the posture control module 330 may recognize an action and/or a posture of the user and perform a fuction corresponding to the action and/or the posture. In some embodiments, posture control module 330 may include one or more sensors for recognizing the an action and/or a posture of the user. Exemplary sensors may include include an optical-based tracking sensor (e.g., an optical camera), an accelerometer, a magnetometer, a gyroscope, a radar, a distance sensor, a speed sensor, a positioning sensor, a displacement sensor, a pressure sensor, a gas sensor, a light sensor, a temperature sensor, a humidity sensor, a fingerprint sensor, an image sensor, an iris sensor, or the like, or any combination thereof. In some embodiments, the one or more sensors may detect a change in the user's orientation, such as a turning of the torso or an about-face movement. In some embodiments, the one or more sensors may sense gestures of the user or a body part (e.g., head, torso, limbs) of the user. In some embodiments, the one or more sensors may generate sensor data regarding the orientation and/or the gestures of the user accordingly and transmit the sensor data to, for example, a processing unit included in the posture control module 330. The posture control module 330 may analyze the sensor data and identify an action and/or a posture. Further, the posture control module 330 may control the the acoustic output apparatus to perform a function corresponding to the identified action and/or posture.

In some embodiments, the identified action and/or posture may include a count and/or frequency of blinking of the user, a count, direction, and/or frequency of nodding and/or shaking head of the user, and a count, direction, frequency, and form of hand movements of the user, etc. For example, the user may interact with the acoustic output apparatus by blinking a certain times and/or at a certain frequency. Specifically, the user may turn on the sound playback function of the acoustic output device by blinking twice, and turn off the Bluetooth function of the acoustic output device by blinking three times. As another example, the user may interact with the acoustic output apparatus by nodding a certain count, in a certain direction and/or at a certain frequency. Specifically, the user may answer a call by nodding once, and reject the call or turn off music playback by shaking his/her head once. As a further example, the user may interact with the acoustic output apparatus through a gesture, or the like. Specifically, the user may open the acoustic output apparatus by extending his/her palm, close the acoustic output apparatus by holding his/her fist, take a picture by making a "scissor" gesture, or the like. As still a further example, in an AR scenario, the user may interact with the acoustic output apparatus via a virtual UI. Specifically, the acoustic output apparatus may provide a plurality of choices corresponding to spatially delineated zones in an array defined relative to a physical position of the acoustic output apparatus. The user may shake his/her head to switch between different zones, or blink once to expand a zone.

The auxiliary control module 340 may be configured to detect working states of the acoustic output apparatus and components thereof, and control the acoustic output apparatus and the components thereof according to the working states (e.g., a placement state, a worn state, whether it has been tapped, an angle of inclination, power, etc.). For example, when detecting that the acoustic output apparatus is not worn, the auxiliary control module 340 may power off one or more components of the acoustic output apparatus after a preset time (e.g., 15 s). As another example, when detecting regular taps (e.g., two consecutive rapid taps) on the acoustic output apparatus, the auxiliary control module 340 may pause the output of the acoustic output apparatus. As a further example, when detecting a state of low power of a power module included in the acoustic output apparatus, the auxiliary control module 340 may control the acoustic output apparatus to output a prompt sound for charging.

In some embodiments, the auxiliary control module 340 may include a detector, a sensor, a gyroscope, or the like. The detector may include a battery detector, a weight detector, an infrared detector, a mechanical detector, or the like, or any combination thereof. The sensor may include a temperature sensor, a humidity sensor, a pressure sensor, a displacement sensor, a flow sensor, a liquid level sensor, a force sensor, a speed sensor, a torque sensor, or the like, or any combination thereof. The gyroscope may be configured to detect a placement direction of the acoustic output apparatus. For example, when the gyroscope detects that a bottom of the acoustic output apparatus is placed upward, the auxiliary control module 340 may turn off the power module after a preset time (e.g., 20 s). The gyroscope may also communicate with a gyroscope of an external device (e.g., a mobile phone) directly or through a communication module, such that the auxiliary control module 340 may control the acoustic output apparatus based on detection results of the gyroscope included in the auxiliary control module 340 and the gyroscope of the external device. For example, when the gyroscope included in the auxiliary control module 340 detects that a bottom of the acoustic output apparatus is placed upward, and the gyroscope of the external device detects that the external device is in a static state, the auxiliary control module 340 may turn off the power module after a preset time (e.g., 15 s).

The indication control module 350 may be configured to indicate working states of the acoustic output apparatus. In some embodiments, the indication control module 350 may include an indicator. The indicator may emit one or more colored lights and/or blink different times to indicate different states (eg, on, off, volume, power, tone, speed of speech, etc.) of the acoustic output apparatus. For example, when the acoustic output apparatus is turned on, the indicator may emit green light, and when the acoustic output apparatus is turned off, the indicator may emit red light. As another example, when the acoustic output apparatus is turned on, the indicator may blink three times, and when the acoustic output apparatus is turned off, the indicator may blink one time. As a further example, when the acoustic output apparatus provides an AR/VR scenario, the indicator may emit green light, and when the acoustic output apparatus stops providing an AR/VR scenario, the indicator may emit red light. In some embodiments, the indicator may also emit light of one or more colors and/or blink different times to indicate a connection state of a communication module in the acoustic output apparatus. For example, when the communication module connects with an external device, the indicator may emit green light, and when the communication module fails to connect with the external device, the indicator may emit red light. As a further example, when the communication module fails to connect with the external device, the indicator may keep flashing. In some embodiments, the indicator may also emit light of one or more colors and/or blink different times to indicate the power of a power module. For example, when the power module is out of power, the indicator may emit red light. As another example, when the power module is out of power, the indicator may keep flashing. In some embodiments, the indicator may be disposed at any position of the acoustic output apparatus. For example, the indicator may be disposed on the leg 110, the leg 120, or the lens ring 130 of the glasses 100.

The modules in the interactive control component 300 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. In some embodiments, the interactive control component 300 may include one or more other modules and/or units, and one or more modules and/or units included in the interactive control component 300 may be unnecessary. For example, the indication control module 350 may also include a voice indication unit which may be configured to indicate working states of the acoustic output apparatus by using pre-stored voices. As another example, the auxiliary control module 340 may be unnecessary. At least part of functions of the auxiliary control module 340 may be implemented by other modules included in the interactive control component 300.

Figure 5:
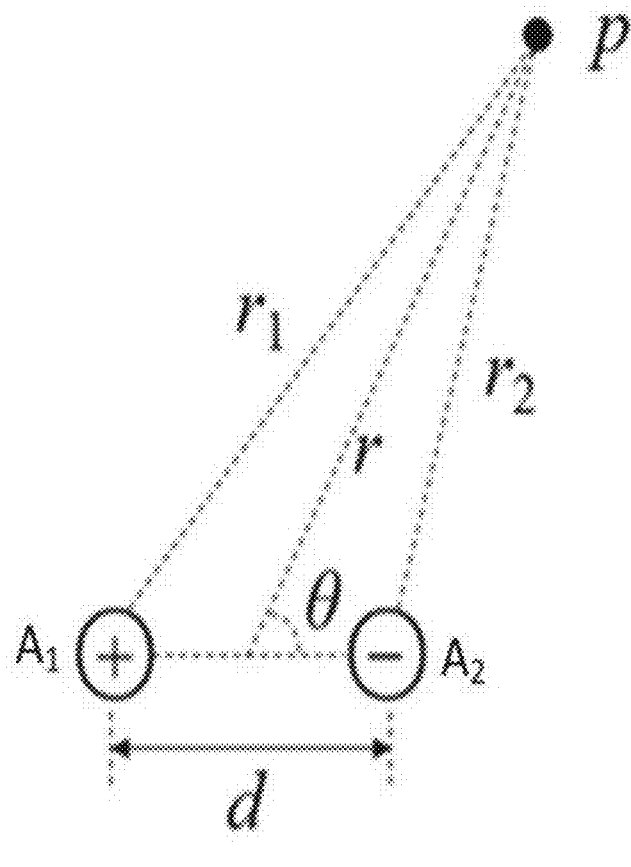
FIG. 5 is a schematic diagram illustrating exemplary two point sources according to some embodiments of the present disclosure.

FIG. 5 is a schematic diagram illustrating an exemplary two point sources according to some embodiments of the present disclosure. In order to further explain the effect of the setting of the sound guiding holes on the acoustic output apparatus, and considering that the sound may be regarded as propagating outwards from the sound guiding holes, the present disclosure may describe sound guiding holes on an acoustic output apparatus as sound sources for externally outputting sound.

Just for the convenience of description and for the purpose of illustration, when sizes of the sound guiding holes on the acoustic output apparatus are small, each sound guiding hole may be approximately regarded as a point source (or referred to as a point sound source or a sound source). In some embodiments, any sound guiding hole provided on the acoustic output apparatus for outputting sound may be approximated as a single point (sound) source on the acoustic output apparatus. The sound field pressure p generated by a single point source may satisfy Equation (1):

$$p = \frac{j\omega\rho_0}{4\pi r}Q_0\exp j(\omega t - kr), \tag{1}$$

where $\omega$ denotes an angular frequency, $\rho_0$ denotes an air density, r denotes a distance between a target point and the point source, $Q_0$ denotes a volume velocity of the point source, and k denotes the wave number. It may be concluded that the magnitude of the sound field pressure of the point source at the target point is inversely proportional to the distance from the target point to the point source.

It should be noted that the sound guiding holes for outputting sound as point sources may only serve as an explanation of the principle and effect of the present disclosure, and may not limit the shapes and sizes of the sound guiding holes in practical applications. In some embodiments, if an area of a sound guiding hole is large enough, the sound guiding hole may also be equivalent to a planar acoustic source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at the spatial scale discussed in the present disclosure, and may have similar sound propagation characteristics and the similar mathematical description method. Further, for those skilled in the art, without creative activities, it may be known that the acoustic effect achieved by "an acoustic driver may output sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of radiating sound outward with structures such as surface sound sources may be similar to that of point sources, and may not be repeated here.

As mentioned above, at least two sound guiding holes corresponding to a same acoustic driver may be set on the acoustic output apparatus provided in the specification. In this case, two point sources may be formed, which may reduce sound transmitted to the surrounding environment. For convenience, sound output from the acoustic output apparatus to the surrounding environment may be referred to as a far-field leakage since it can be heard by others in the environment. The sound output from the acoustic output apparatus to the ears of the user wearing the acoustic output apparatus may be referred to as a near-field sound since a distance between the acoustic output apparatus and the user is relatively short. In some embodiments, the sound output from two sound guiding holes (i.e., two point sources) may have a certain phase difference. When the distance between the two point sources and the phase difference of the two point sources meet a certain condition, the acoustic output apparatus may output different sound effects in the near field (for example, the position of the user's ear) and the far field. For example, if the phases of the point sources corresponding to the two sound guiding holes are opposite, that is, an absolute value of the phase difference between the two point sources is 180 degrees, the far-field leakage may be reduced according to the principle of reversed phase cancellation. More details regarding an enhancement of the acoustic output apparatus by adjusting the amplitude and/or phase of each point source may be found in International application No. PCT/CN2019/130884, filed on Dec. 31, 2019, the entire content of which may be hereby incorporated by reference.

As shown in FIG. 5, a sound field pressure p generated by two point sources may satisfy Equation (2):

$$p = \frac{A_1}{r_1}\exp j(\omega t - kr_1 + \varphi_1) + \frac{A_2}{r_2}\exp j(\omega t - kr_2 + \varphi_2), \quad (2)$$

where $A_1$ and $A_2$ denote intensities of the two point sources, and $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2 * r * \frac{d}{2} * \cos\theta} \\ r_2 = \sqrt{r^2 + \left(\frac{d}{2}\right)^2 + 2 * r * \frac{d}{2} * \cos\theta} \end{cases}, \quad (3)$$

where r denotes a distance between a target point and the center of the two point sources in the space, and $\theta$ indicates an angle between a line connecting the target point and the center of the two point sources and the line on which the two point source is located.

It may be concluded from Equation (3) that a magnitude of the sound pressure pat the target point in the sound field may relate to the intensity of each point source, the distance d, the phase of each point source, and the distance r.

Two point sources with different output effects may be achieved by different settings of sound guiding holes, such that the volume of the near-field sound may be improved, and the far-field leakage may be reduced. For example, an acoustic driver may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be coupled with a sound guiding hole acoustically. The sound on the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be coupled with another sound guiding hole acoustically. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sounds with a specific phase relationship (e.g., opposite phases) may be output at the two sound guiding holes. As a result, a problem that the acoustic output apparatus has a low volume in the near-field and a sound leakage in the far-field may be effectively resolved.

Under certain conditions, compared to the volume of a far-field leakage of a single point source, the volume of a far-field leakage of two point sources may increase with the frequency. In other words, the leakage reduction capability of the two point sources in the far field may decrease with the frequency increases. For further description, a curve illustrating a relationship between a far-field leakage and a frequency may be described in connection with FIG. 6.

Figure 6:
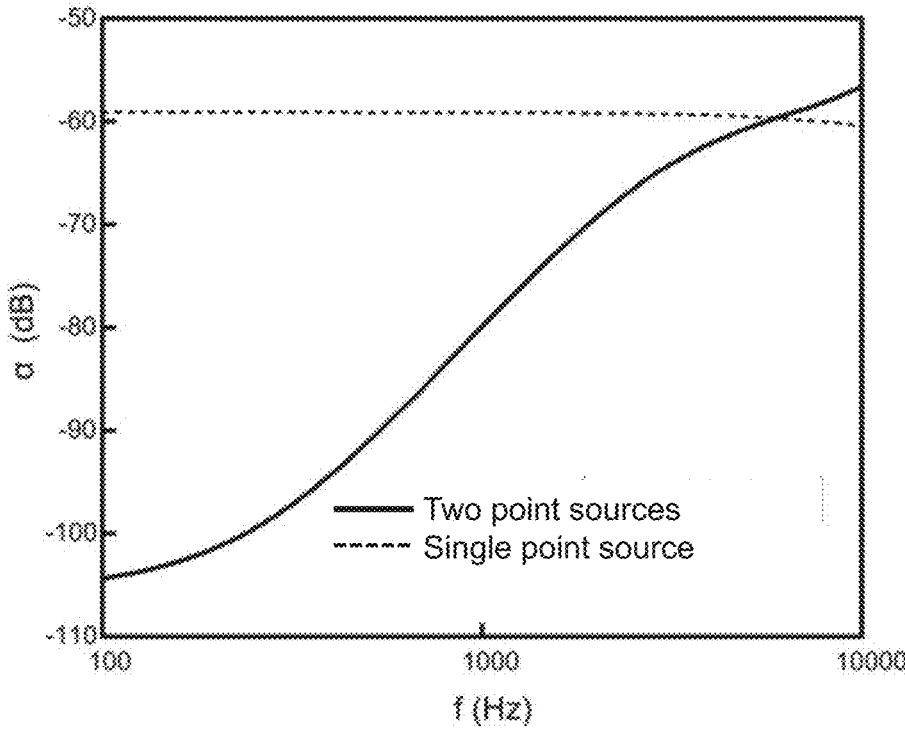
FIG. 6 is a schematic diagram illustrating a variation of sound leakage of two point sources and a single point source along with frequency according to some embodiments of the present disclosure.

FIG. 6 is a schematic diagram illustrating a variation of a sound leakage of two point sources and a single point source as a function of frequency according to some embodiments of the present disclosure. The distance between the two point sources in FIG. 6 may be fixed, and the two point sources may have a substantially same amplitude and opposite phases. The dotted line may indicate a variation curve of a volume of a leaked sound of the single point source at different frequencies. The solid line may indicate a variation curve of a volume of a leaked sound of the two point sources at different frequencies. The abscissa of the diagram may represent the sound frequency (f), and the unit may be Hertz (Hz). The ordinate of the diagram may use a normalization parameter $\alpha$ to evaluate the volume of a leaked sound. The parameter $\alpha$ may be determined according to Equation (4):

$$\alpha = \frac{|P_{far}|^2}{|P_{ear}|^2}, \quad (4)$$

where $P_{far}$ represents the sound pressure of the acoustic output apparatus in the far-field (i.e., the sound pressure of the far-field sound leakage). $P_{ear}$ represents the sound pressure around the user's ears (i.e., the sound pressure of the near-field sound). The larger the value of $\alpha$, the larger the far-field leakage relative to the near-field sound heard will be, indicating that a poorer capability of the acoustic output apparatus for reducing the far-field leakage.

As shown in FIG. 6, when the frequency is below 6000 Hz, the far-field leakage produced by the two point sources may be less than the far-field leakage produced by the single point source, and may increase as the frequency increases. When the frequency is close to 10000 Hz (for example, about 8000 Hz or above), the far-field leakage produced by the two point sources may be greater than the far-field leakage produced by the single point source. In some embodiments, a frequency corresponding to an intersection of the variation curves of the two point sources and the single point source may be determined as an upper limit frequency that the two point sources are capable of reducing a sound leakage.

For illustrative purposes, when the frequency is relatively small (for example, in a range of 100 Hz~1000 Hz), the capability of reducing a sound leakage of the two point sources may be strong (e.g., the value of a is small, such as below –80 dB). In such a frequency band, an increase of the volume of the sound heard by the user may be determined as an optimization goal. When the frequency is larger (for example, in a range of 1000 Hz~8000 Hz), the capability of reducing a sound leakage of the two point sources may be weak (e.g., above –80 dB). In such a frequency band, a decrease of the sound leakage may be determined as the optimization goal.

According to FIG. 6, it may be possible to determine a frequency division point based on the variation tendency of the two point sources' capability of reducing a sound leakage. Parameters of the two point sources may be adjusted according to the frequency division point so as to reducing the sound leakage of the acoustic output apparatus. For example, the frequency corresponding to $\alpha$ of a specific value (for example, –60 dB, –70 dB, –80 dB, –90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point. More details of the frequency division point may be disclosed elsewhere in the present disclosure, for example, FIG. 8 and the descriptions thereof.

In some embodiments, the method for measuring and determining the sound leakage may be adjusted according to the actual conditions. For example, a plurality of points on a spherical surface centered by s center point of the two point sources with a radius of r (for example, 40 centimeter) may be identified, and an average value of amplitudes of the sound pressure at the plurality of points may be determined as the value of the sound leakage. The distance between the near-field listening position and the point sources may be far less than the distance between the point sources and the spherical surface for measuring the far-field leakage. Optionally, the ratio of the distance from the near-field listening position to the center of the two point sources to the radius r may be less than 0.3, 0.2, 0.15, or 0.1. As another example, one or more points of the far-field may be taken as the position for measuring the sound leakage, and the sound volume of the position may be taken as the value of the sound leakage. As another example, a center of the two point sources may be used as a center of a circle at the far field, and sound pressure amplitudes of two or more points evenly distributed at the circle according to a certain spatial angle may be averaged as the value of the sound leakage. These methods may be adjusted by those skilled in the art according to actual conditions, and is not intended to be limiting.

According to FIG. 6, it may be concluded that in the high-frequency band (a higher frequency band determined according to the frequency division point), the two point sources may have a weak capability to reduce a sound leakage. In the low-frequency band (a lower frequency band determined according to the frequency division point), the two point sources may have a strong capability to reduce a sound leakage. At a certain sound frequency, if the distance between the two point sources changes, its capability to reduce a sound leakage may be changed, and the difference between volume of the sound heard by the user (also referred to as "heard sound") and volume of the leaked sound may also be changed. For a better description, the curve of a far-field leakage as a function of the distance between the two point sources may be described with reference to FIGS. 7A and 7B.

Figure 7A:
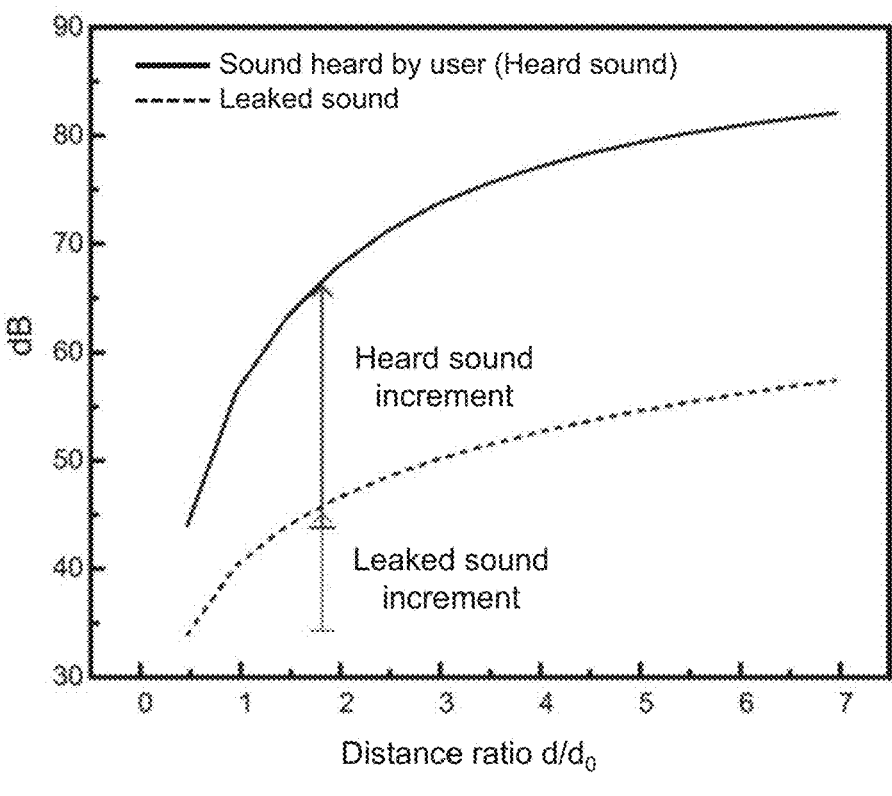
FIGS. 7A-7B are graphs illustrating a volume of the near-field sound and a volume of the far-field leakage as a function of a distance of two point sources according to some embodiments of the present disclosure.
Figure 7B:
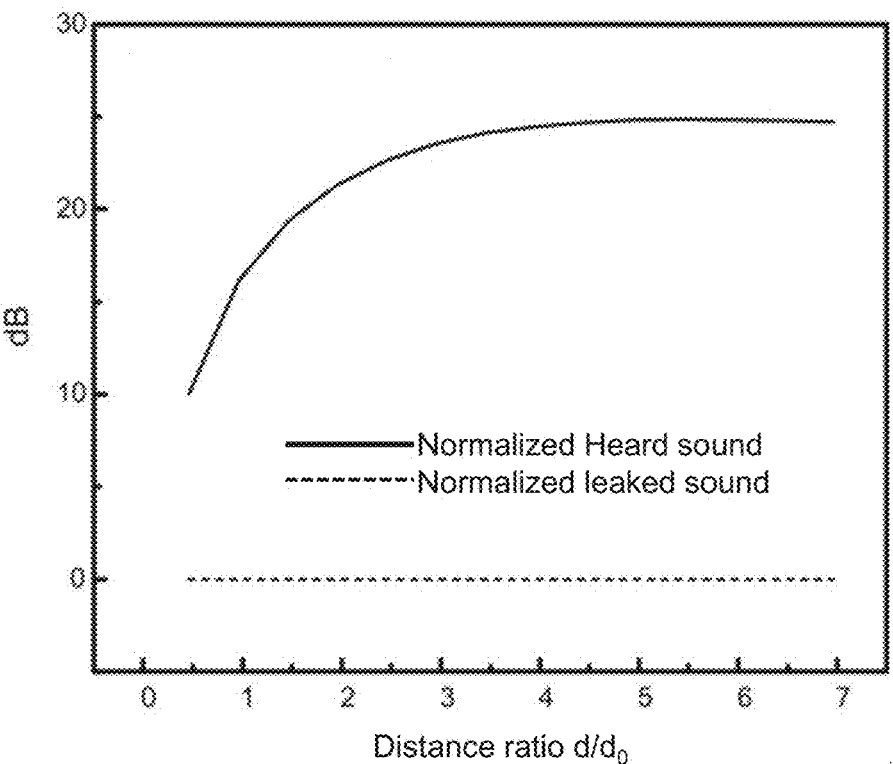

FIGS. 7A and 7B are exemplary graphs illustrating a volume of a near-field sound and a volume of a far-field leakage as a function of a distance between two point sources according to some embodiments of the present disclosure. FIG. 7B may be generated by performing a normalization on the graph in FIG. 7A.

In FIG. 7A, a solid line may represent a variation curve of the volume of the two point sources as a function of the distance between the two point sources, and the dotted line may represent the variation curve of the volume of the leaked sound of the two point sources as a function of the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm~10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 7A, d0 may be 5 mm.

When the sound frequency is a constant, the volume of the sound heard by the user and volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 7A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 7B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0~7. For example, the threshold ratio of d/d0 may be set in the range of 0.5~4.5. As another example, the threshold ratio of d/d0 may be set in the range of 1~4.

In some embodiments, the threshold ratio value may be determined based on the variation of the difference between the volume of the sound heard by the user and the volume of the leaked sound of the two point sources of FIG. 7A. For example, the ratio corresponding to the maximum difference between the volume of the sound heard by the user and the volume of the leaked sound may be determined as the threshold ratio. As shown in FIG. 7B, when the distance ratio d/d0 is less than the threshold ratio (e.g., 4), a curve of a normalized sound heard by the user (also referred to as "normalized heard sound") may show an upward trend (the slope of the curve is larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

According to the descriptions above, if the listening position is fixed, the parameters of the two point sources may be adjusted by certain means. It may be possible to achieve an effect that the volume of the near-field sound has a significant increase while the volume of the far-field leakage only increases slightly (i.e., the increase in the volume of the near-field sound is greater than the volume of the far-field leakage). For example, two or more sets of two point sources (such as a set of high-frequency two point sources and a set of low-frequency two point sources) may be used. For each set, the distance between the point sources in the set are adjusted by a certain means, so that the distance between the high-frequency two point sources may be less than the distance between the low-frequency two point sources. The low-frequency two point sources may have a small sound leakage (the capability to reduce the sound leakage is strong), and the high-frequency two point sources have a large sound leakage (the capability to reduce the sound leakage is weak). The volume of the sound heard by the user may be significantly larger than the volume of the leaked sound if a smaller distance between the two point sources is set in the high-frequency band, thereby reducing the sound leakage.

In some embodiments, each acoustic driver may have a corresponding pair of sound guiding holes. The distance between the sound guiding holes corresponding to each acoustic driver may affect the volume of the near-field sound transmitted to the user's ears and the volume of the far-field leakage transmitted to the environment. In some embodiments, if the distance between the sound guiding holes corresponding to a high-frequency acoustic driver is less than that between the sound guiding holes corresponding to a low-frequency acoustic driver, the volume of the sound heard by the user may be increased and the sound leakage may be reduced, thereby preventing the sound from being heard by others near the user of the acoustic output apparatus. According to the above descriptions, the acoustic output apparatus may be effectively used as an open earphone even in a relatively quiet environment.

Figure 8:
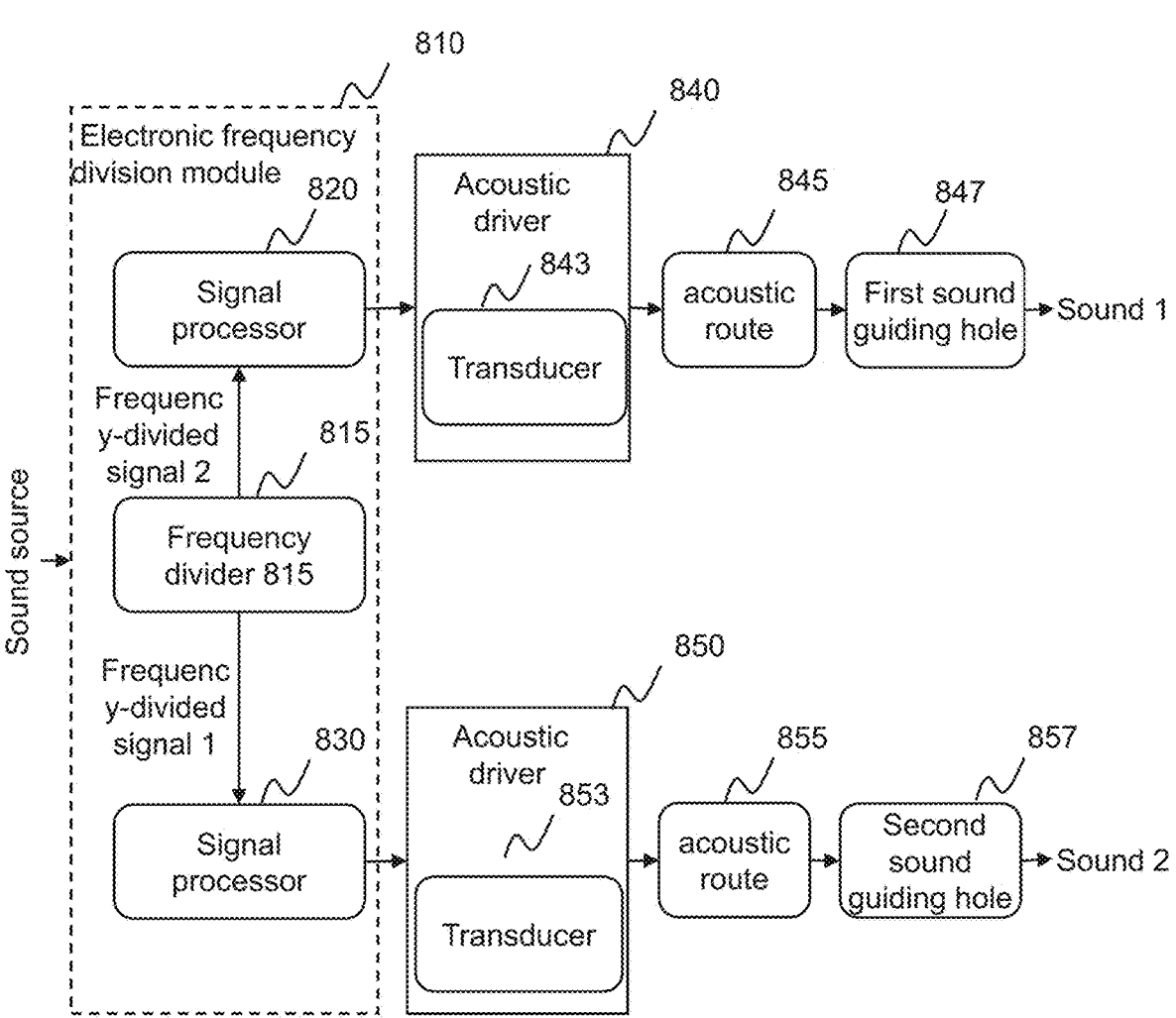
FIG. 8 is a schematic diagram illustrating an exemplary acoustic output apparatus according to some embodiments of the present disclosure.

FIG. 8 is a schematic diagram illustrating an exemplary acoustic output apparatus according to some embodiments of the present disclosure. As shown in FIG. 8, the acoustic output apparatus 800 may include an electronic frequency division module 810, an acoustic driver 840, an acoustic driver 850, an acoustic route 845, an acoustic route 855, at least two first sound guiding holes 847, and at least two second sound guiding holes 857. In some embodiments, the acoustic output apparatus 800 may further include a controller (not shown in the figure). The electronic frequency division module 810 may be part of the controller and configured to generate electrical signals that are input into different acoustic drivers. The connection between different components in the acoustic output apparatus 800 may be wired and/or wireless. For example, the electronic frequency division module 810 may send signals to the acoustic driver 840 and/or the acoustic driver 850 through a wired transmission or a wireless transmission.

The electronic frequency division module 810 may divide the frequency of a source signal. The source signal may come from one or more sound source apparatus (for example, a memory storing audio data). The sound source apparatus may be part of the acoustic output apparatus 800 or an independent device. The source signal may be an audio signal that is received by the acoustic output apparatus 800 via a wired or wireless means. In some embodiments, the electronic frequency division module 810 may decompose the source signal into two or more frequency-divided signals having different frequencies. For example, the electronic frequency division module 110 may decompose the source signal into a first frequency-divided signal (or frequency-divided signal 1) having a high-frequency sound and a second frequency-divided signal (or frequency-divided signal 2) having a low-frequency sound. For convenience, a frequency-divided signal having the high-frequency sound may be referred to as a high-frequency signal, and a frequency-divided signal having the low-frequency sound may be referred to as a low-frequency signal.

For the purposes of description, a low-frequency signal described in the present disclosure may refer to a sound signal with a frequency in a first frequency range (or referred to as a low frequency range). A high-frequency signal may refer to a sound signal with a frequency in a second frequency range (or referred to as a high frequency range). The first frequency range and the second frequency range may or may not include overlapping frequency ranges. The second frequency range may include frequencies higher than the first frequency range. Merely by way of example, the first frequency range may include frequencies below a first threshold frequency. The second frequency range may include frequencies above a second threshold frequency. The first threshold frequency may be lower than the second threshold frequency, or equal to the second threshold frequency, or higher than the second threshold frequency. For example, the first threshold frequency may be lower than the second threshold frequency (for example, the first threshold frequency may be 600 Hz and the second threshold frequency may be 700 Hz), which means that there is no overlap between the first frequency range and the second frequency range. As another example, the first threshold frequency may be equal to the second frequency (for example, both the first threshold frequency and the second threshold frequency may be 650 Hz or any other frequency values). As another example, the first threshold frequency may be higher than the second threshold frequency, which indicates that there is an overlap between the first frequency range and the second frequency range. In such cases, in some embodiments, the difference between the first threshold frequency and the second threshold frequency may not exceed a third threshold frequency. The third threshold frequency may be a fixed value, for example, 20 Hz, 50 Hz, 100 Hz, 150 Hz, or 200 Hz. Optionally, the third threshold frequency may be a value related to the first threshold frequency and/or the second threshold frequency (for example, 5%, 10%, 15%, etc., of the first threshold frequency). Alternatively, the third threshold frequency may be a value flexibly set by the user according to the actual needs, which may be not limited herein. It should be noted that the first threshold frequency and the second threshold frequency may be flexibly set according to different situations, and are not limited herein.

In some embodiments, the electronic frequency division module 810 may include a frequency divider 815, a signal processor 820, and a signal processor 830. The frequency divider 815 may be used to decompose the source signal into two or more frequency-divided signals containing different frequency components, for example, a frequency-divided signal 1 having a high-frequency sound component and a frequency-divided signal 2 having a low-frequency sound component. In some embodiments, the frequency divider 815 may be any electronic device that may implement the signal decomposition function, including but not limited to one of a passive filter, an active filter, an analog filter, a digital filter, or any combination thereof. In some embodiments, the frequency divider 815 may divide the source signal based on one or more frequency division points. A frequency division point may refer to a specific frequency distinguishing the first frequency range and the second frequency range. For example, when there is an overlapping frequency range between the first frequency range and the second frequency range, the frequency division point may be a feature point within the overlapping frequency range (for example, a low-frequency boundary point, a high-frequency boundary point, a center frequency point, etc., of the overlapping frequency range). In some embodiments, the frequency division point may be determined according to a relationship between the frequency and the sound leakage of the acoustic output apparatus (for example, the curves shown in FIGS. 6, 7A, and 7B). For example, considering that the sound leakage of the acoustic output apparatus changes with the frequency, a frequency point corresponding to the volume of the leaked sound satisfying a certain condition may be selected as the frequency division point, for example, 1000 Hz shown in FIG. 6. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic drivers 840 and 850. For example, considering that a low-frequency acoustic driver and a high-frequency acoustic driver have different frequency response curves, the frequency division point may be selected within a frequency range. The frequency range may be above ½ of the upper limiting frequency of the low-frequency acoustic driver and below 2 times of the lower limiting frequency of the high-frequency acoustic driver. In some embodiments, the frequency division point may be selected in a frequency range above ⅓ of the upper limiting frequency of the low-frequency acoustic driver and below 1.5 times of the lower limiting frequency of the high-frequency acoustic driver. In some embodiments, in the overlapping frequency range, the positional relationship between point sources may also affect the volume of the sound produced by the acoustic output apparatus in the near field and the far field. More details may be found in International application No. PCT/CN2019/130886, filed on Dec. 31, 2019, the entire contents of which are hereby incorporated by reference.

The signal processor 820 and the signal processor 830 may further process a frequency-divided signal to meet the requirements of sound output. In some embodiments, the signal processor 820 and/or the signal processor 830 may include one or more signal processing components. For example, the signal processing components(s) may include, but not limited to, an amplifier, an amplitude modulator, a phase modulator, a delayer, a dynamic gain controller, or the like, or any combination thereof. Merely by way of example, the processing of a sound signal by the signal processor 820 and/or the signal processor 830 may include adjusting the amplitude of a portion of the sound signal that has a specific frequency. In some embodiments, if the first frequency range and the second frequency range overlap, the signal processors 820 and 830 may adjust the intensity of a portion of a sound signal that has the frequency in the overlapping frequency range (for example, reduce the amplitude of the portion that has the frequency in the overlapping frequency range). This may avoid that in a final sound outputted by acoustic output apparatus, the portion that corresponds to the overlapping frequency range may have an excessive volume caused by the superposition of multiple sound signals.

After being processed by the signal processors 820 or 830, the frequency-divided signals 1 and 2 may be transmitted to the acoustic drivers 840 and 850, respectively. In some embodiments, the processed frequency-divided signal transmitted into the acoustic driver 840 may be a sound signal having a lower frequency range (e.g., the first frequency range). Therefore, the acoustic driver 840 may also be referred to as a low-frequency acoustic driver. The processed frequency-divided transmitted into the acoustic driver 850 may be a sound signal having a higher frequency range (e.g., the second frequency range). Therefore, the acoustic driver 850 may also be referred to as a high-frequency acoustic driver. The acoustic driver 840 and the acoustic driver 850 may convert sound signals into a low-frequency sound and a high-frequency sound, respectively, then propagate the converted signals outwards.

In some embodiments, the acoustic driver 840 may be acoustically coupled to at least two first sound guiding holes. For example, the acoustic driver 840 may be acoustically coupled to the two first sound guiding holes 847 via two acoustic routes 845. The acoustic driver 840 may propagate sound through the at least two first sound guiding holes 847. The acoustic driver 850 may be acoustically coupled to at least two second sound guiding holes. For example, the acoustic driver 850 may be acoustically coupled to the two second sound guiding holes 857 via two acoustic routes 855. The acoustic driver 850 may propagate sound through the at least two second sound guiding holes 857. A sound guiding hole may be a small hole formed on the acoustic output apparatus with a specific opening and allowing sound to pass. The shape of a sound guiding hole may include but not limited to a circle shape, an oval shape, a square shape, a trapezoid shape, a rounded quadrangle shape, a triangle shape, an irregular shape, or the like, or any combination thereof. In addition, the number of the sound guiding holes connected to the acoustic driver 840 or 850 may not be limited to two, which may be an arbitrary value instead, for example, three, four, six, or the like.

In some embodiments, in order to reduce the far-field leakage of the acoustic output apparatus 800, the acoustic driver 840 may be used to output low-frequency sounds with the same (or approximately the same) amplitude and opposite (or approximately opposite) phases via the at least two first sound guiding holes. The acoustic driver 850 may be used to output high-frequency sounds with the same (or approximately the same) amplitude and opposite (or approximately opposite) phases via the at least two second sound guiding holes. In this way, the far-field leakage of low-frequency sounds (or high-frequency sounds) may be reduced according to the principle of acoustic interference cancellation.

According to FIGS. 6 7A and 7B, considering that the wavelength of a low-frequency sound is longer than that of a high-frequency sound, and in order to reduce the interference cancellation of the sound in the near field (for example, near the user's ear), the distance between the first sound guiding holes and the distance between the second sound guiding holes may have different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may not be longer than 40 mm, for example, in the range of 20 mm-40 mm. The second distance may not be longer than 12 mm, and the first distance may be longer than the second distance. In some embodiments, the first distance may not be shorter than 12 mm. The second distance may be shorter than 7 mm, for example, in the range of 3 mm-7 mm. In some embodiments, the first distance may be 30 mm, and the second distance may be 5 mm. As another example, the first distance may be at least twice longer than the second distance. In some embodiments, the first distance may be at least three times longer than the second distance. In some embodiments, the first distance may be at least 5 times longer than the second distance.

As shown in FIG. 8, the acoustic driver 840 may include a transducer 843. The transducer 843 may transmit a sound to the first sound guiding hole(s) 847 through the acoustic route 845. The acoustic driver 850 may include a transducer 853. The transducer 853 may transmit a sound to the second sound guiding hole(s) 857 through the acoustic route 855. In some embodiments, the transducer may include, but not limited to, a transducer of a gas-conducting acoustic output apparatus, a transducer of a bone-conducting acoustic output apparatus, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (such as the low-frequency acoustic driver 840, the high-frequency acoustic driver 850) may include transducers with different properties or different counts of tranducers. For example, each of the low-frequency acoustic driver 840 and the high-frequency acoustic driver 850 may include a transducer, and the transducers of the frequency acoustic driver 840 and the high-frequency acoustic driver 850 may have different frequency response characteristics (such as a low-frequency speaker unit and a high-frequency speaker unit). As another example, the low-frequency acoustic driver 840 may include two transducers 843 (such as two low-frequency speaker units), and the high-frequency acoustic driver 850 may include two transducers 853 (such as two high-frequency speaker units).

In some embodiments, the acoustic output apparatus 800 may generate sounds with different frequency ranges by other means, for example, a transducer frequency division, an acoustic route frequency division, or the like. When the acoustic output apparatus 800 uses a transducer or an acoustic route to divide a sound, the electronic frequency division module 810 (e.g., the part inside the dotted frame in FIG. 8) may be omitted. The source signal may be input to the acoustic driver 840 and the acoustic driver 850, respectively.

In some embodiments, the acoustic output apparatus 800 may use a plurality of transducers to achieve signal frequency division. For example, the acoustic driver 840 and the acoustic driver 850 may convert the inputted source signal into a low-frequency signal and a high-frequency signal, respectively. Specifically, through the transducer 843 (such as a low-frequency speaker), the low-frequency acoustic driver 840 may convert the source signal into the low-frequency sound having a low-frequency component. The low-frequency sound may be transmitted to at least two first sound guiding holes 847 along at least two different acoustic routes 845. Then the low-frequency sound may be propagated outwards through the first sound guiding holes 847. Through the transducer 853 (such as a high-frequency speaker), the high-frequency acoustic driver 850 may convert the source signal into the high-frequency sound having a high-frequency component. The high-frequency sound may be transmitted to at least two second sound guiding holes 857 along at least two different acoustic routes 855. Then the high-frequency sound may be propagated outwards through the second sound guiding holes 857.

In some alternative embodiments, an acoustic route (e.g., the acoustic routes 845 and the acoustic routes 855) connecting a transducer and a sound guiding hole may affect the nature of the transmitted sound. For example, an acoustic route may attenuate or change the phase of the transmitted sound to some extent. In some embodiments, the acoustic route may include a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. Exemplary acoustic resistance materials may include but not limited to plastic, textile, metal, permeable material, woven material, screen material or mesh material, porous material, particulate material, polymer material, or the like, or any combination thereof. By setting acoustic routes of different acoustic impedances, the sounds output of different transducers may be acoustically filtered. In this case, the sounds output through different acoustic routes have different frequency components.

In some embodiments, the acoustic output apparatus 800 may utilize a plurality of acoustic routes to achieve signal frequency division. Specifically, the source signal may be inputted into a specific acoustic driver and converted into a sound including high and low-frequency components. The sound may be propagated along an acoustic route having a specific frequency selection characteristic. For example, the sound may be propagated along an acoustic route with a low-pass characteristic to a corresponding sound guiding hole to output a low-frequency sound. In this process, the high-frequency component of the sound may be absorbed or attenuated by the acoustic route with a low-pass characteristic. Similarly, the sound signal may be propagated along an acoustic route with a high-pass characteristic to the corresponding sound guiding hole to output a high-frequency sound. In this process, the low-frequency component of the sound may be absorbed or attenuated by the acoustic route with the high-pass characteristic.

In some embodiments, the controller in the acoustic output apparatus 800 may cause the low-frequency acoustic driver 840 to output a sound in the first frequency range (i.e., a low-frequency sound), and cause the high-frequency acoustic driver 850 to output a sound in the second frequency range (i.e., a high-frequency sound). In some embodiments, the acoustic output apparatus 800 may also include a supporting structure. The supporting structure may be used to carry an acoustic driver (such as the high-frequency acoustic driver 850, the low-frequency acoustic driver 840), so that the acoustic driver may be positioned away from the user's ear. In some embodiments, the sound guiding hole(s) acoustically coupled with the high-frequency acoustic driver 850 may be located closer to an expected position of the user's ears (for example, the ear canal entrance), while the sound guiding hole(s) acoustically coupled with the low-frequency acoustic driver 840 may be located further away from the expected position. In some embodiments, the supporting structure may be used to package the acoustic driver. For example, the supporting structure may include a casing made of various materials such as plastic, metal, and tape. The casing may encapsulate the acoustic driver and form a front chamber and a rear chamber corresponding to the acoustic driver. The front chamber may be acoustically coupled to one of the at least two sound guiding holes corresponding to the acoustic driver. The rear chamber may be acoustically coupled to the other of the at least two sound guiding holes corresponding to the acoustic driver. For example, the front chamber of the low-frequency acoustic driver 840 may be acoustically coupled to one of the at least two first sound guiding holes 847. The rear chamber of the low-frequency acoustic driver 840 may be acoustically coupled to the other of the at least two first sound guiding holes 847. The front chamber of the high-frequency acoustic driver 850 may be acoustically coupled to one of the at least two second sound guiding holes 857. The rear chamber of the high-frequency acoustic driver 850 may be acoustically coupled to the other of the at least two second sound guiding holes 857. In some embodiments, a sound guiding hole (such as the first sound guiding hole(s) 847 and the second sound guiding hole(s) 857) may be disposed on the casing.

The above description of the acoustic output apparatus 800 may be merely provided by way of example. Those skilled in the art may make adjustments and changes to the structure, quantity, etc., of the acoustic driver, which is not limiting in the present disclosure. In some embodiments, the acoustic output apparatus 800 may include any number of the acoustic drivers. For example, the acoustic output apparatus 800 may include two groups of the high-frequency acoustic drivers 850 and two groups of the low-frequency acoustic drivers 840, or one group of the high-frequency acoustic drives 850 and two groups of the low-frequency acoustic drivers 840, and these high-frequency/low-frequency drivers may be used to generate a sound in a specific frequency range, respectively. As another example, the acoustic driver 840 and/or the acoustic driver 850 may include an additional signal processor. The signal processor may have the same structural component as or different structural component from the signal processor 820 or 830.

It should be noted that the acoustic output apparatus and its modules shown in FIG. 8 may be implemented in various ways. For example, in some embodiments, the system and the modules may be implemented by hardware, software, or a combination of both. The hardware may be implemented by a dedicated logic. The software may be stored in a storage which may be executed by a suitable instruction execution system, for example, a microprocessor or a dedicated design hardware. It will be appreciated by those skilled in the art that the above methods and systems may be implemented by computer-executable instructions and/or embedded in control codes of a processor. For example, the control codes may be provided by a medium such as a disk, a CD or a DVD-ROM, a programmable memory device, such as read-only memory (e.g., firmware), or a data carrier such as an optical or electric signal carrier. The system and the modules in the present disclosure may be implemented not only by a hardware circuit in a programmable hardware device in an ultra large scale integrated circuit, a gate array chip, a semiconductor such a logic chip or a transistor, a field programmable gate array, or a programmable logic device. The system and the modules in the present disclosure may also be implemented by a software to be performed by various processors, and further also by a combination of hardware and software (e.g., firmware).

It should be noted that the above description of the acoustic output apparatus 800 and its components is only for convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the electronic frequency division module 810 may be omitted, and the frequency division of the source signal may be implemented by the internal structure of the low-frequency acoustic driver 840 and/or the high-frequency acoustic driver 850. As another example, the signal processor 820 or 830 may be a part independent of the electronic frequency division module 810. Those modifications may fall within the scope of the present disclosure.

Figure 9A:
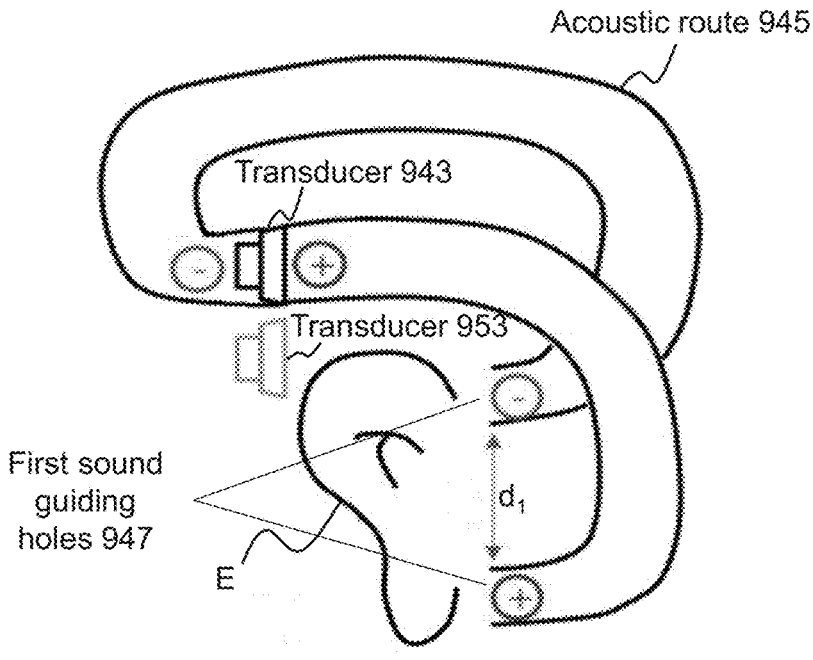
FIGS. 9A-9B are schematic diagrams illustrating exemplary application scenarios of an acoustic driver according to some embodiments of the present disclosure.
Figure 9B:
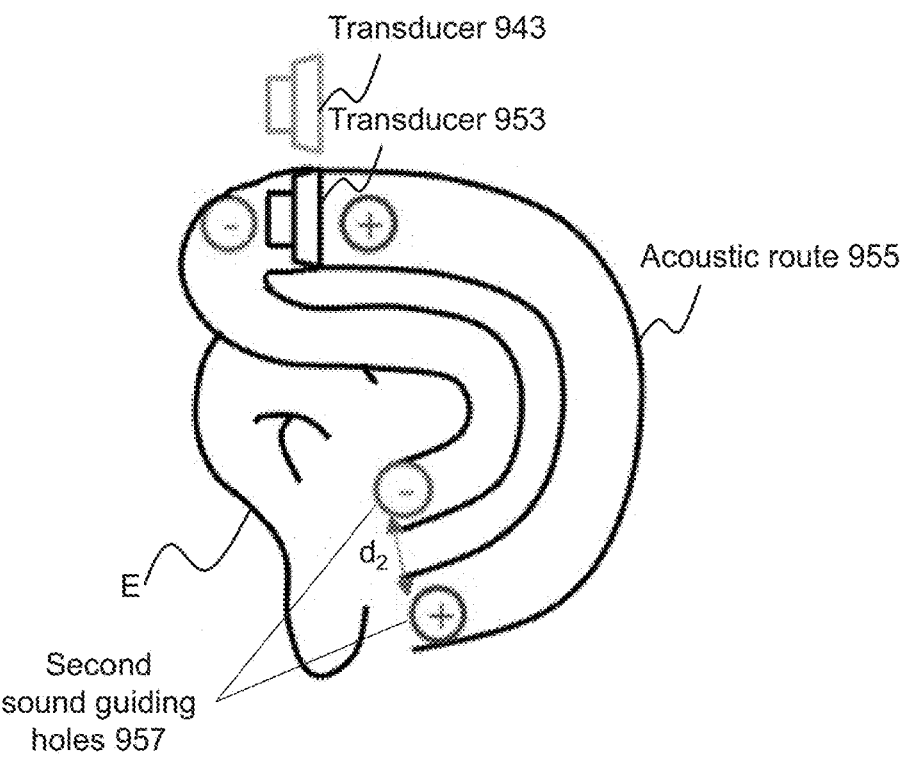

FIGS. 9A and 9B are schematic diagrams illustrating exemplary acoustic output apparatuses according to some embodiments of the present disclosure. For the purpose of illustration, sounds outputted by different sound guiding holes coupled with a same transducer may be described as an example. In FIGS. 9A and 9B, each transducer may have a front side and a rear side, and a front chamber and a rear chamber may exist on the front and rear side of the transducer, respectively. In some embodiments, these structures may have the same or approximately the same equivalent acoustic impedance, such that the transducer may be loaded symmetrically. The symmetrical load of the transducer may form sound sources satisfying an amplitude and phase relationship at different sound guiding holes (such as the "two point sources" having a same amplitude and opposite phases as described above), such that a specific sound field may be formed in the high-frequency range and/or the low-frequency range (for example, the near-field sound may be enhanced and the far-field leakage may be suppressed).

As shown in FIGS. 9A and 9B, an acoustic driver (for example, the acoustic driver 910 or 920) may include transducers, and acoustic routes and sound guiding holes connected to the transducers. In order to describe an actual application scenario of the acoustic output apparatus more clearly, a position of a user's ear E is shown in FIGS. 9A and 9B for explanation. FIG. 9A illustrates an application scenario of the acoustic driver 910. The acoustic driver 910 may include a transducer 943 (or referred to as a low-frequency acoustic driver), and the transducer 943 may be coupled with two first sound guiding holes 947 through an acoustic route 945. FIG. 9B illustrates an application scenario of the acoustic driver 920. The acoustic driver 920 may include a transducer 953 (or referred to as a high-frequency acoustic driver), and the transducer 953 may be coupled with two second sound guiding holes 957 through an acoustic route 955.

The transducer 943 or 953 may vibrate under the driving of an electric signal, and the vibration may generate sounds with equal amplitudes and opposite phases (180 degrees inversion). The type of the transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 943 or 953 may include a vibration diaphragm, which may vibrate when driven by an electrical signal, and the front and rear sides of the vibration diaphragm may simultaneously output a normal-phase sound and a reverse-phase sound. In FIGS. 9A and 9B, "+" and "−" may be used to represent sounds with different phases, wherein "+" may represent a normal-phase sound, and "−" may represent a reverse-phase sound.

In some embodiments, a transducer may be encapsulated by a casing of a supporting structure, and the interior of the casing may be provided with sound channels connected to the front and rear sides of the transducer, respectively, thereby forming an acoustic route. For example, a front cavity of the transducer 943 may be coupled to one of the two first sound guiding holes 947 through a first acoustic route (i.e., a half of the acoustic route 945), and a rear cavity of the transducer 943 may acoustically be coupled to the other sound guiding hole of the two first sound guiding holes 947 through a second acoustic route (i.e., the other half of the acoustic route 945). A normal-phase sound and a reverse-phase sound output from the transducer 943 may be output from the two first sound guiding holes 947, respectively. As another example, a front cavity of the transducer 953 may be coupled to one of the two sound guiding holes 957 through a third acoustic route (i.e., half of the acoustic route 955), and a rear cavity of the transducer 953 may be coupled to another sound guiding hole of the two second sound guiding holes 957 through a fourth acoustic route (i.e., the other half of the acoustic route 955). A normal-phase sound and a reverse-phase sound output from the transducer 953 may be output from the two second sound guiding holes 957, respectively.

In some embodiments, an acoustic route may affect the nature of the transmitted sound. For example, an acoustic route may attenuate or change the phase of the transmitted sound to some extent. In some embodiments, the acoustic route may include one or more of a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. In some embodiments, the acoustic resistance material may include but not limited to plastics, textiles, metals, permeable materials, woven materials, screen materials, and mesh materials, or the like, or any combination thereof. In some embodiments, in order to prevent the sound transmitted by the acoustic driver's front chamber and rear chamber from being differently disturbed, the front chamber and rear chamber corresponding to the acoustic driver may have the approximately same equivalent acoustic impedance. Additionally, sound guiding holes with the same acoustic resistance material, the same size and/or shape, etc., may be used.

The distance between the two first sound guiding holes 947 of the low-frequency acoustic driver may be expressed as d1 (i.e., the first distance). The distance between the two second sound guiding holes 957 of the high-frequency acoustic driver may be expressed as d2 (i.e., the second distance). By setting the distances d1 and d2, a higher sound volume output in the low-frequency band and a stronger ability to reduce the sound leakage in the high-frequency band may be achieved. For example, the distance between the two first sound guiding holes 947 is greater than the distance between the two second sound guiding holes 957 (i.e., d1>d2).

In some embodiments, the transducer 943 and the transducer 953 may be housed together in a housing of an acoustic output apparatus, and be placed in isolation in a structure of the housing.

In some embodiments, the acoustic output apparatus may include multiple sets of high-frequency acoustic drivers and low-frequency acoustic drivers. For example, the acoustic output apparatus may include a set of high-frequency acoustic drivers and a set of low-frequency acoustic drivers for simultaneously outputting sound to the left and/or right ears. As another example, the acoustic output apparatus may include two sets of high-frequency acoustic drivers and two sets of low-frequency acoustic drivers, wherein one set of high-frequency acoustic drivers and one set of low-frequency acoustic drivers may be used to output sound to a user's left ear, and the other set of high-frequency acoustic drivers and the other set of low-frequency acoustic drivers may be used to output sound to a user's right ear.

In some embodiments, the high-frequency acoustic driver and the low-frequency acoustic driver may have different powers. In some embodiments, the low-frequency acoustic driver may have a first power, the high-frequency acoustic driver may have a second power, and the first power may be greater than the second power. In some embodiments, the first power and the second power may be arbitrary values.

Figure 10A:
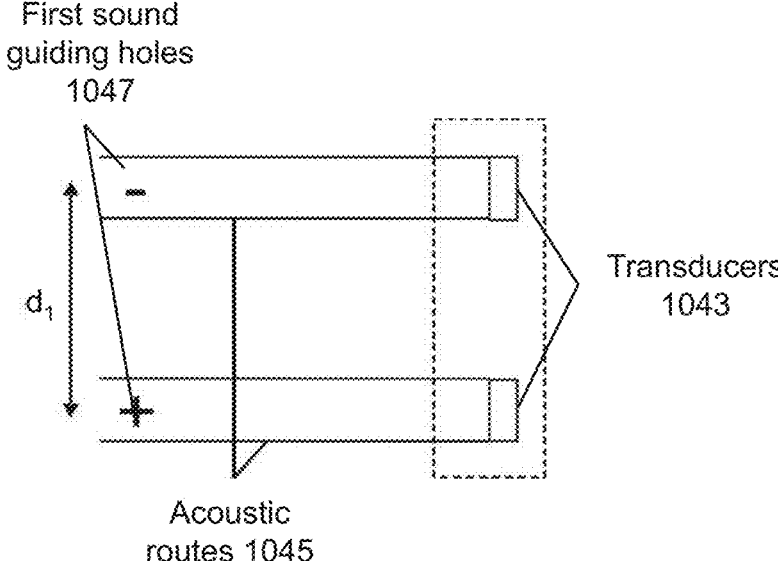
FIGS. 10A-10C are schematic diagrams illustrating exemplary sound outputs according to some embodiments of the present disclosure.
Figure 10B:
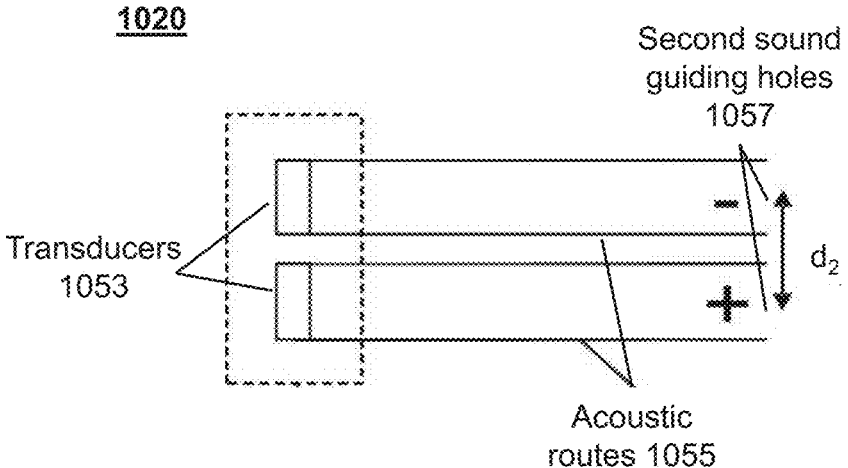
Figure 10C:
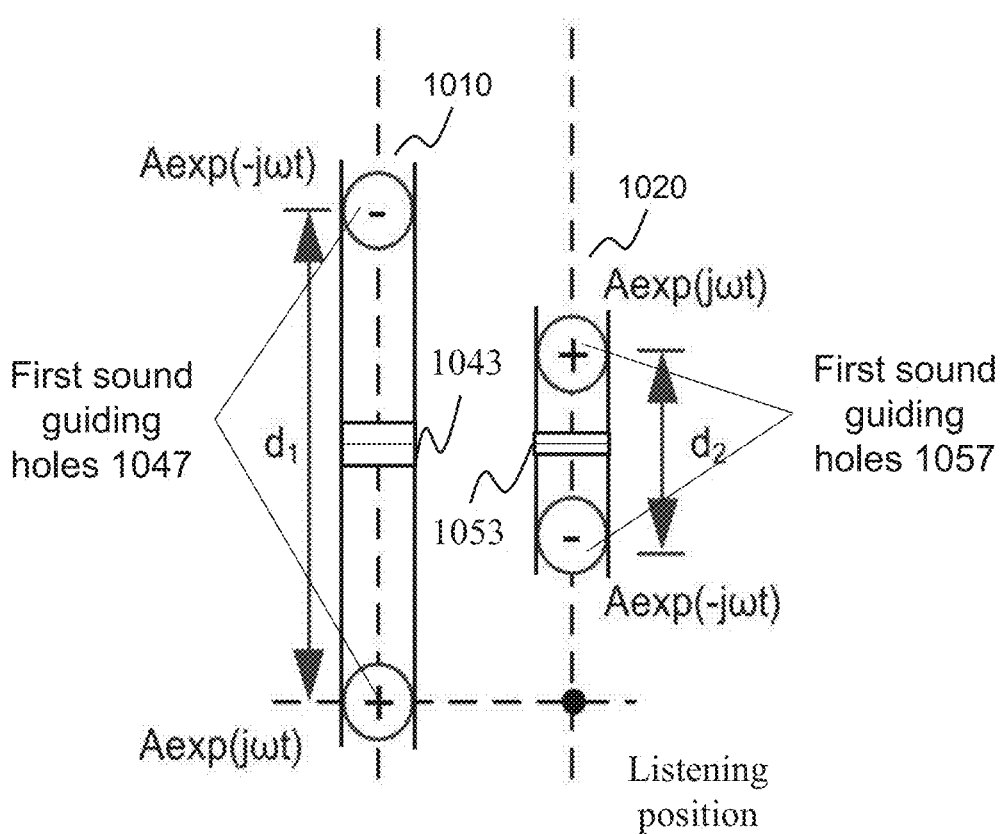

FIGS. 10A, 10B, and 10C are schematic diagrams illustrating sound output scenarios according to some embodiments of the present disclosure.

In some embodiments, the acoustic output apparatus may generate sounds in the same frequency range through two or more transducers, and the sounds may propagate outwards through different sound guiding holes. In some embodiments, different transducers may be controlled by the same controller or different controllers, respectively, and may produce sounds that satisfy a certain phase and amplitude condition (for example, sounds with the same amplitude but opposite phases, sounds with different amplitudes and opposite phases, etc.). For example, a controller may make the electrical signals input into two low-frequency transducers of an acoustic driver have the same amplitude and opposite phases. In this way, the two low-frequency transducers may output low-frequency sounds with the same amplitude but opposite phases.

Specifically, the two transducers in an acoustic driver (such as a low-frequency acoustic driver 1010 or a high-frequency acoustic driver 1020) may be arranged side by side in an acoustic output apparatus, one of which may be used to output a normal-phase sound, and the other may be used to output a reverse-phase sound. As shown in FIG. the acoustic driver 1010 may include two transducers 1043, two acoustic routes 1045, and two first sound guiding holes 1047. As shown in FIG. 10B, the acoustic driver 1050 may include two transducers 1053, two acoustic routes 1055, and two second sound guiding holes 1057. Driven by electrical signals with opposite phases, the two transducers 1043 may generate a set of low-frequency sounds with opposite phases (180 degrees inversion). One of the two transducers 1043 (such as the transducer located below) may output a normal-phase sound, and the other (such as the transducer located above) may output a reverse-phase sound. The two low-frequency sounds with opposite phases may be transmitted to the two first sound guiding holes 1047 along the two acoustic routes 1045, respectively, and propagate outwards through the two first sound guiding holes 1047. Similarly, driven by electrical signals with opposite phases, the two transducers 1053 may generate a set of high-frequency sounds with opposite phases (180 degrees inversion). One of the two transducers 1053(such as the transducer located below) may output a normal-phase high-frequency sound, and the other (such as the transducer located above) may output a reverse-phase high-frequency sound. The high-frequency sounds with opposite phases may be transmitted to the two second sound guiding holes 1057 along the two acoustic routes 1055, respectively, and propagate outwards through the two second sound guiding holes 1057.

In some embodiments, the two transducers in an acoustic driver (for example, the low-frequency acoustic driver 1043 and the high-frequency acoustic driver 1053) may be arranged relatively close to each other along a straight line, and one of them may be used to output a normal-phase sound and the other may be used to output a reverse-phase sound.

As shown in FIG. 10C, the left side may be the acoustic driver 1010, and the right side may be the acoustic driver 1020. The two transducers 1043 of the acoustic driver 1010 may generate a set of low-frequency sounds of equal amplitude and opposite phases under the control of the controller, respectively. One of the transducers 1043 may output a normal-phase low-frequency sound, and transmit the normal-phase low-frequency sound along a first acoustic route to a first sound guiding hole 1047. The other transducer 1043 may output a reverse-phase low-frequency sound, and transmit the reverse-phase low-frequency sound along a second acoustic route to another first sound guiding hole 1047. The two transducers 1053 of the acoustic driver 1020 may generate high-frequency sounds of equal amplitude and opposite phases under the control of the controller, respectively. One of the transducers 1053 may output a normal-phase high-frequency sound, and transmit the normal-phase high-frequency sound along a third acoustic route to a second sound guiding hole 1057. The other transducer 1053 may output a reverse-phase high-frequency sound, and transmit the reverse-phase high-frequency sound along a fourth acoustic route to another second sound guiding hole 1057.

In some embodiments, the transducer 1043 and/or the transducer 1053 may be of various suitable types. For example, the transducer 1043 and the transducer 1053 may be dynamic coil speakers, which may have the characteristics of a high sensitivity in low-frequency, a deep low frequency depth, and a small distortion. As another example, the transducer 1043 and the transducer 1053 may be moving iron speakers, which may have the characteristics of a small size, a high sensitivity, and a large high-frequency range. As another example, the transducers 1043 and 1053 may be air-conducted speakers or bone-conducted speakers. As yet another example, the transducer 1043 and the transducer 1053 may be balanced armature speakers. In some embodiments, the transducer 1043 and the transducer 1053 may be of different types. For example, the transducer 1043 may be a moving iron speaker, and the transducer 1053 may be a moving coil speaker. As another example, the transducer 1043 may be a dynamic coil speaker, and the transducer 1053 may be a moving iron speaker.

In FIGS. 10A-10C, the distance between the two point sources of the acoustic driver 1010 may be d1, the distance between the two point sources of the acoustic driver 1020 may be d2, and d1 may be greater than d2. As shown in FIG. 10C, the listening position (that is, the position of the ear canal when the user wears an acoustic output apparatus) may be approximately located on a line of a set of two point sources. In some embodiments, the listening position may be located at any suitable position. For example, the listening position may be located on a circle centered on the center point of the two point sources. As another example, the listening position may be on the same side of the two lines of the two sets of point sources.

It may be understood that the simplified structure of the acoustic output apparatus shown in FIGS. 10A-10C may be merely by way of example, which may be not a limitation for the present disclosure. In some embodiments, the acoustic output apparatus may include a supporting structure, a controller, a signal processor, or the like, or any combination thereof.

Figure 11A:
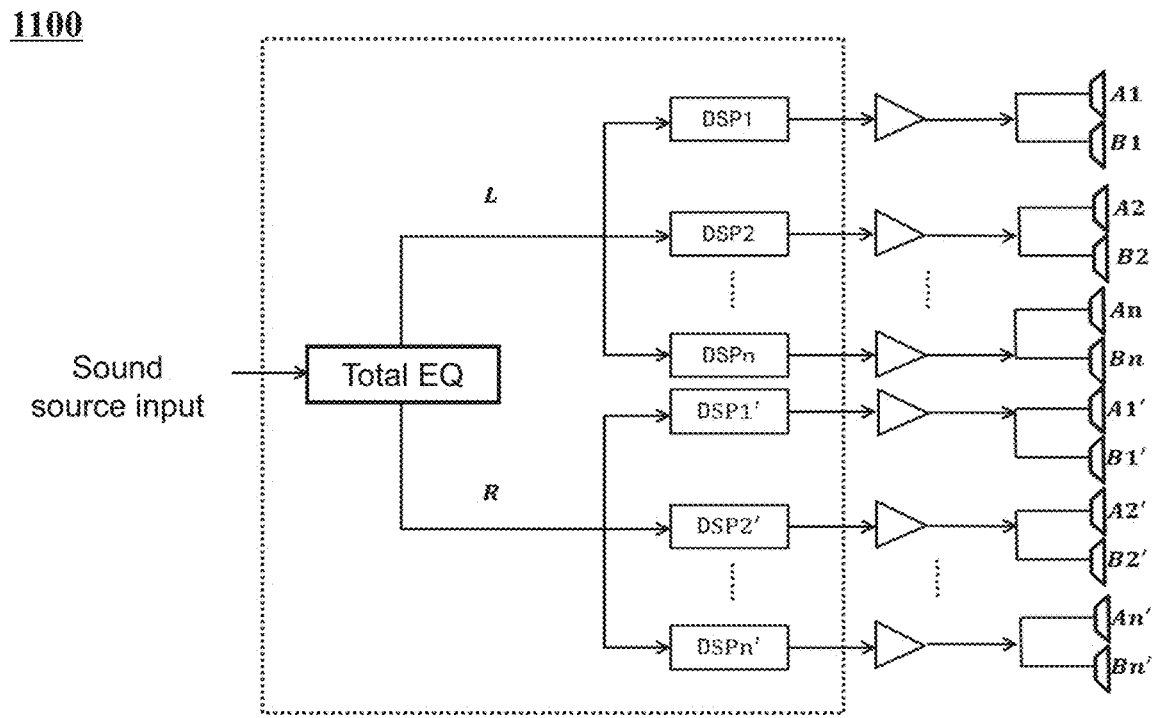
FIGS. 11A-11B are schematic diagrams illustrating acoustic output apparatuses according to some embodiments of the present disclosure.
Figure 11B:
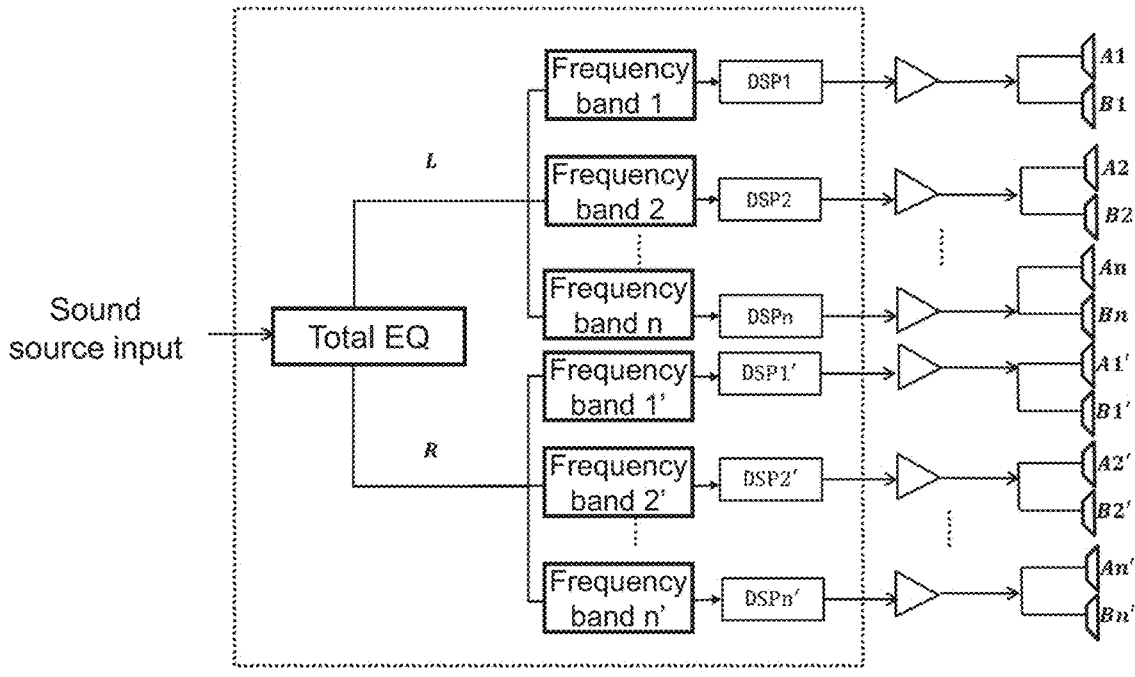

FIGS. 11A and 11B are schematic diagrams illustrating an acoustic output apparatus according to some embodiments of the present disclosure.

In some embodiments, acoustic drivers (e.g., acoustic drivers 1043 or 1053) may include multiple narrow-band speakers. As shown in FIG. 11A, the acoustic output apparatus may include a plurality of narrow-band speaker units and a signal processing module. On the left or right side of the user, the acoustic output apparatus may include n groups, narrow-band speaker units, respectively. Each group of narrow-band speaker units may have different frequency response curves, and the frequency response of each group may be complementary and collectively cover the audible sound frequency band. A narrow-band speaker unit used herein may be an acoustic driver with a narrower frequency response range than a low-frequency acoustic driver and/or a high-frequency acoustic driver. Taking the speaker units located on the left side of the user as shown in FIG. 11A as an example: A1~An and B1~Bn form n groups of two point sources. When a same electrical signal is input, each two point sources may generate sounds with different frequency ranges. By setting the distance do of each two point sources, the near-field and far-field sound of each frequency band may be adjusted. For example, in order to enhance the volume of near-field sound and reduce the volume of far-field leakage, the distance between a pair of two point sources corresponding to a high frequency may be less than the distance between a pair of two point sources corresponding to a low frequency.

In some embodiments, the signal processing module may include an Equalizer (EQ) processing module and a Digital Signal Processor (DSP) processing module. The signal processing module may be used to implement signal equalization and other digital signal processing algorithms (such as amplitude modulation and phase modulation). The processed signal may be connected to a corresponding acoustic driver (for example, a narrow-band speaker unit) to output a sound. Preferably, a narrow-band speaker unit may be a dynamic coil speaker or a moving iron speaker. In some embodiments, the narrow-band speaker unit may be a balanced armature speaker. Two point sources may be constructed using two balanced armature speakers, and the sound output from the two speakers may be in opposite phases.

In some embodiments, an acoustic driver (such as acoustic drivers 840, 850, 1040 or 1050) may include multiple sets of full-band speakers. As shown in FIG. 11B, the acoustic output apparatus may include a plurality of sets of full-band speaker units and a signal processing module. On the left or right side of the user, the acoustic output apparatus may include n groups full-band speaker units, respectively. Each full-band speaker unit may have the same or similar frequency response curve, and may cover a wide frequency range.

Taking the speaker units located on the left side of the user as shown in FIG. 11B as an example: A1~An and B1~Bn form n groups of two point sources. The difference between FIGS. 11A and 11B may be that the signal processing module in FIG. 11B may include at least one set of filters for performing frequency division on the sound source signal to generate electric signals corresponding to different frequency ranges, and the electric signals corresponding to different frequency ranges may be input into each group of full-band speaker units. In this way, each group of speaker units (similar to the two point sources) may produce sounds with different frequency ranges separately.

Figure 12A:
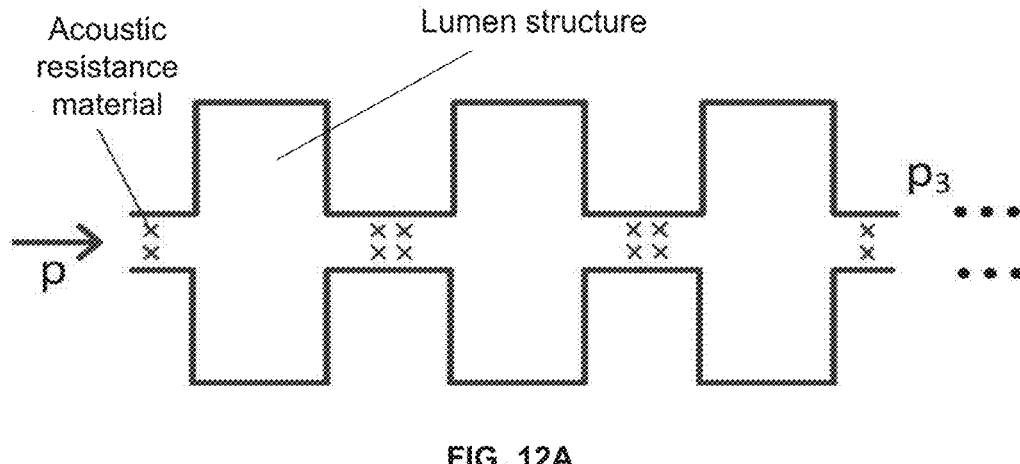
FIGS. 12A-12C are schematic diagrams illustrating acoustic routes according to some embodiments of the present disclosure.
Figure 12B:
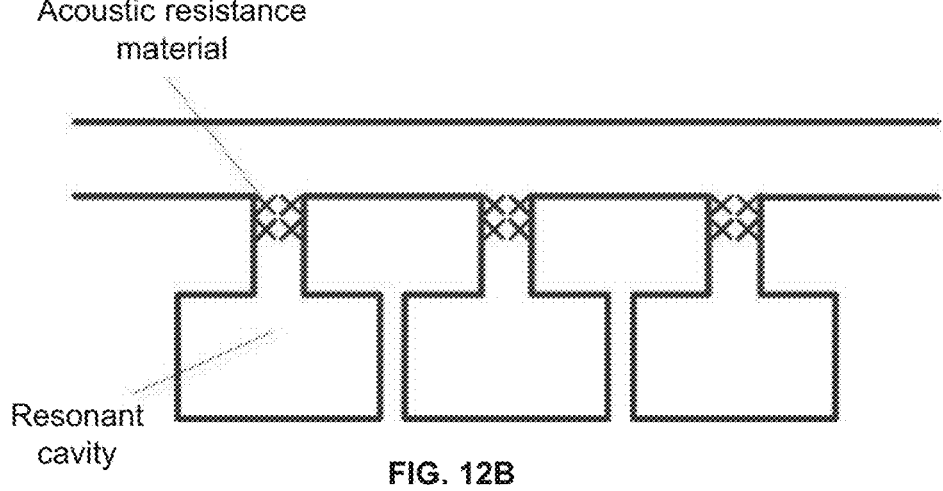
Figure 12C:
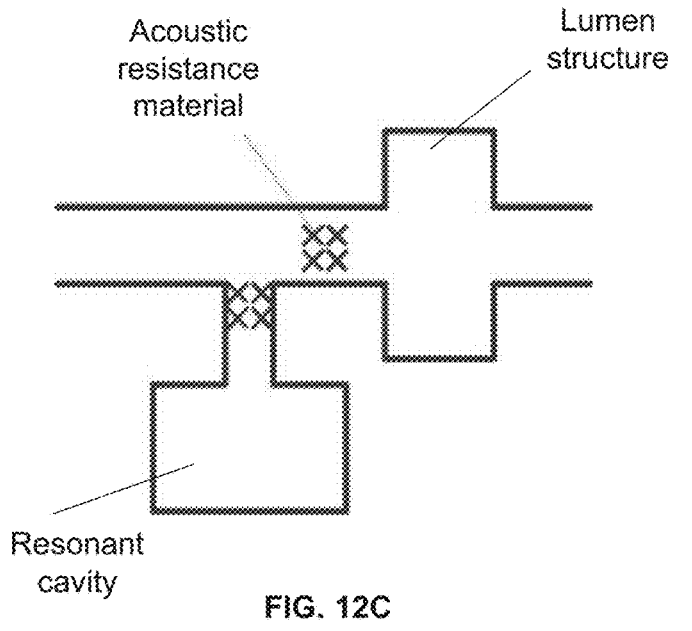

FIGS. 12A-12C are schematic diagrams illustrating an acoustic route according to some embodiments of the present disclosure.

As described above, an acoustic filtering structure may be constructed by setting structures such as a sound tube, a sound cavity, and a sound resistance in an acoustic route to achieve frequency division of sound. FIGS. 12A-12C show schematic structural diagrams of frequency division of a sound signal using an acoustic route. It should be noted that FIGS. 12A-12C may be examples of setting the acoustic route when using the acoustic route to perform frequency division on the sound signal, and may not be a limitation on the present disclosure.

As shown in FIG. 12A, an acoustic route may include one or more groups of lumen structures connected in series, and an acoustic resistance material may be provided in the lumen structures to adjust the acoustic impedance of the entire structure to achieve a filtering effect. In some embodiments, a band-pass filtering or a low-pass filtering may be performed on the sound by adjusting the size of the lumen structures and/or the acoustic resistance material to achieve frequency division of the sound. As shown in FIG. 12B, a structure with one or more sets of resonant cavities (for example, Helmholtz cavity) may be constructed on a branch of the acoustic route, and the filtering effect may be achieved by adjusting the size of each resonant cavity and the acoustic resistance material. As shown in FIG. 12C, a combination of a lumen structure and a resonant cavity (for example, a Helmholtz cavity) may be constructed in an acoustic route, and a filtering effect may be achieved by adjusting the size of the lumen structure and/or a resonant cavity, and/or the acoustic resistance material.

Figure 13:
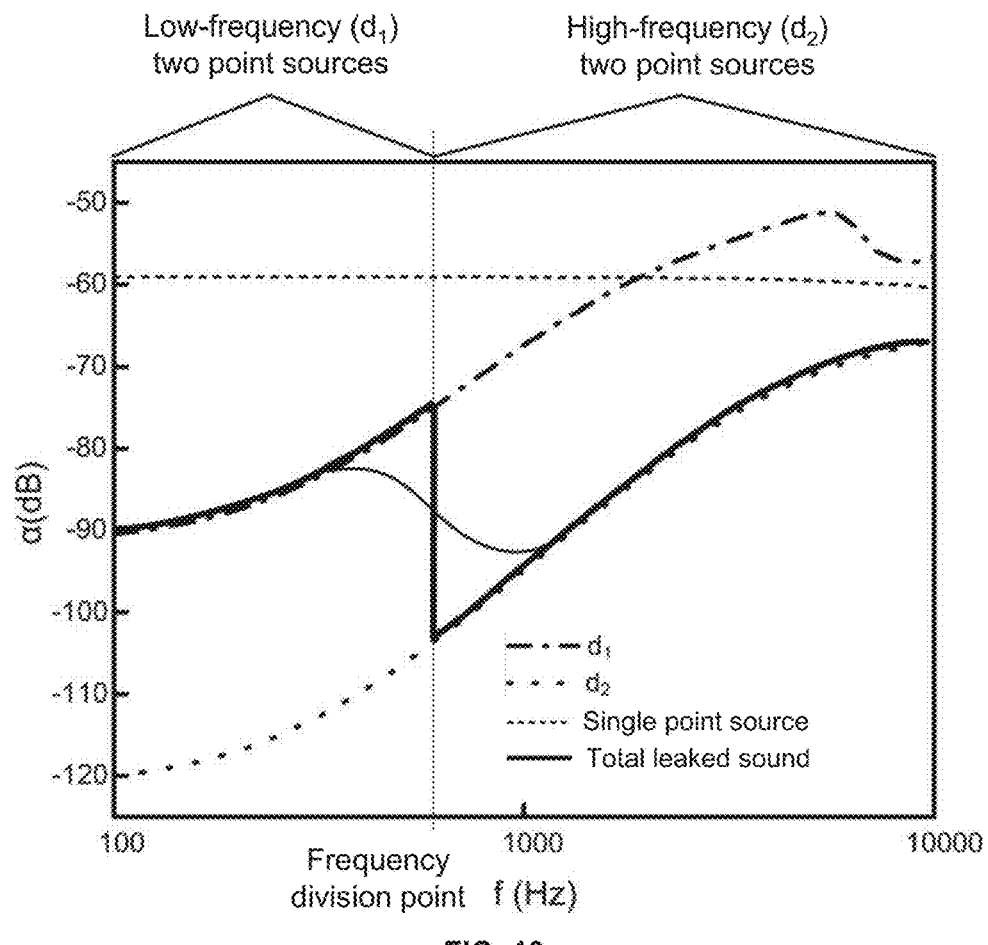
FIG. 13 is an exemplary graph illustrating a sound leakage under a combination of two sets of two point sources according to some embodiments of the present disclosure.

FIG. 13 shows a curve of a sound leakage of an acoustic output apparatus (for example, the acoustic output apparatus 800) under the action of two sets of two point sources (a set of high-frequency two point sources and a set of low-frequency two point sources). The frequency division points of the two sets of two point sources may be around 700 Hz.

A normalization parameter $\alpha$ may be used to evaluate the volume of the leaked sound (descriptions of $\alpha$ may be found in Equation (4)). As shown in FIG. 13, compared with a single point source, the two sets of two point sources may have a stronger ability to reduce sound leakage. In addition, compared with the acoustic output apparatus provided with only one set of two point sources, the two sets of two point sources may output high-frequency sounds and low-frequency sounds, separately. The distance between the low-frequency two point sources may be greater than that of the high-frequency two point sources. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcame. Therefore, by setting the distance d1 and/or the distance d2, the acoustic output apparatus provided in the embodiments of the present disclosure may obtain a stronger sound leakage suppressing capability than an acoustic output apparatus having a single point source or a single set of two point sources.

In some embodiments, affected by factors such as the filter characteristic of a circuit, the frequency characteristic of a transducer, and the frequency characteristic of an acoustic route, the actual low-frequency and high-frequency sounds of the acoustic output apparatus may differ from those shown in FIG. 13. In addition, low-frequency and high-frequency sounds may have a certain overlap (aliasing) in the frequency band near the frequency division point, causing the total sound leakage reduction of the acoustic output apparatus not have a mutation at the frequency division point as shown in FIG. 13. Instead, there may be a gradient and/or a transition in the frequency band near the frequency division point, as shown by a thin solid line in FIG. 13. It may be understood that these differences may not affect the overall leakage reduction effect of the acoustic output apparatus provided by the embodiments of the present disclosure.

According to FIGS. 8 to 13 and the related descriptions, the acoustic output apparatus provided by the present disclosure may be used to output sounds in different frequency bands by setting high-frequency two point sources and low-frequency two point sources, thereby achieving a better acoustic output effect. In addition, by setting different sets of two point sources with different distances, the acoustic output apparatus may have a stronger capability to reduce the sound leakage in a high frequency band, and meet the requirements of an open acoustic output apparatus.

In some alternative embodiments, an acoustic output apparatus may include at least one acoustic driver, and the sound generated by the at least one acoustic driver may propagate outwards through at least two sound guiding holes coupled with the at least one acoustic driver. In some embodiments, the acoustic output apparatus may be provided with a baffle structure, so that the at least two sound guiding holes may be distributed on two sides of the baffle. In some embodiments, the at least two sound guiding holes may be distributed on both sides of the user's auricle. At this time, the auricle may serve as a baffle that separates the at least two sound guiding holes, so that the at least two sound guiding holes may have different acoustic routes to the user's ear canal. More descriptions of two point sources and a baffle may be found in International applications No. PCT/CN2019/130921 and No. PCT/CN2019/130942, both filed on Dec. 31, 2019, the entire contents of each of which are hereby incorporated by reference in the present disclosure.

Figure 14:
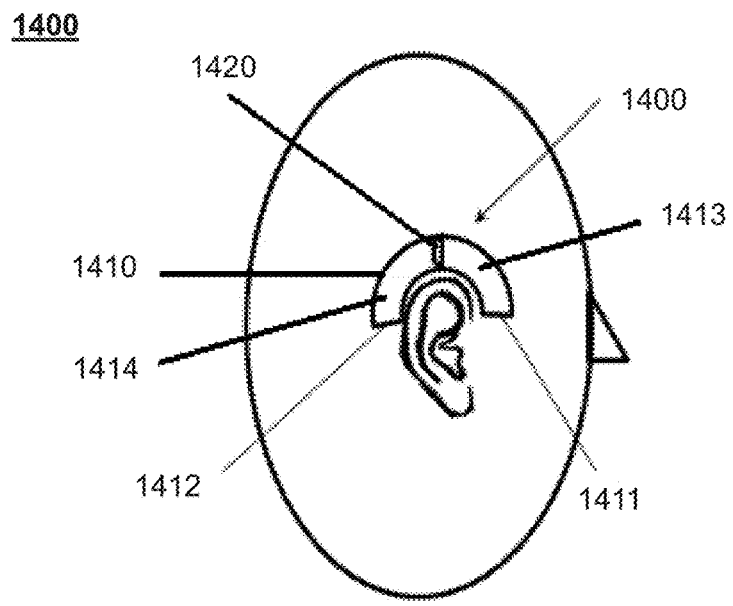
FIG. 14 is a schematic diagram illustrating another exemplary acoustic output apparatus according to some embodiments of the present disclosure.

FIG. 14 is a schematic diagram illustrating another exemplary acoustic output apparatus 1400 according to some embodiments of the present disclosure. As shown in FIG. 14, the acoustic output apparatus 1400 may include a supporting structure 1410 and an acoustic driver 1420 mounted within the supporting structure 1410. In some embodiments, the acoustic output apparatus 1400 may be worn on the user's body (for example, the human body's head, neck, or upper torso) through the supporting structure 1410. At the same time, the supporting structure 1410 and the acoustic driver 1420 may approach but not block the ear canal, so that the user's ear may remain open, thus the user may hear both the sound output from the acoustic output apparatus 1400 and the sound of the external environment. For example, the acoustic output apparatus 1400 may be arranged around or partially around the user's ear, and transmit sounds by means of air conduction or bone conduction.

The supporting structure 1410 may be used to be worn on the user's body and include one or more acoustic drivers 1420. In some embodiments, the supporting structure 1410 may have an enclosed shell structure with a hollow interior, and the one or more acoustic drivers 1420 may be located inside the supporting structure 1410. In some embodiments, the acoustic output apparatus 1400 may be combined with a product, such as glasses, a headset, a display apparatus, an AR/VR helmet, etc. In this case, the supporting structure 1410 may be fixed near the user's ear in a hanging or clamping manner. In some alternative embodiments, a hook may be provided on the supporting structure 1410, and the shape of the hook may match the shape of the user's auricle, so that the acoustic output apparatus 1400 may be independently worn on the user's ear through the hook. The acoustic output apparatus 1400 may communicate with a signal source (for example, a computer, a mobile phone, or other mobile devices) in a wired or wireless manner (for example, Bluetooth). For example, the acoustic output apparatus 1400 at the left and right ears may be directly in communication connection with the signal source in a wireless manner. As another example, the acoustic output apparatus 1400 at the left and right ears may include a first output apparatus and a second output apparatus. The first output apparatus may be in communication connection with the signal source, and the second output apparatus may be wirelessly connected with the first output apparatus in a wireless manner. The audio output of the first output apparatus and the second output apparatus may be synchronized through one or more synchronization signals. A wireless connection disclosed herein may include but not limited to a Bluetooth, a local area network, a wide area network, a wireless personal area network, a near field communication, or the like, or any combination thereof.

In some embodiments, the supporting structure 1410 may have a shell structure with a shape suitable for human ears, for example, a circular ring, an oval, a polygonal (regular or irregular), a U-shape, a V-shape, a semi-circle, so that the supporting structure 1410 may be directly hooked at the user's ear. In some embodiments, the supporting structure 1410 may include one or more fixed structures. The fixed structure(s) may include an ear hook, a head strip, or an elastic band, so that the acoustic output apparatus 1400 may be better fixed on the user, preventing the acoustic output apparatus 1400 from falling down. Merely by way of example, the elastic band may be a headband to be worn around the head region. As another example, the elastic band may be a neckband to be worn around the neck/shoulder region. In some embodiments, the elastic band may be a continuous band and be elastically stretched to be worn on the user's head. In the meanwhile, the elastic band may also exert pressure on the user's head so that the acoustic output apparatus 1400 may be fixed to a specific position on the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 1410 of the acoustic output apparatus 1400 by a physical connection. The flexible portion may be made of an elastic material (for example, cloth, composite, or/and neoprene).

In some embodiments, when the user wears the acoustic output apparatus 1400, the supporting structure 1410 may be located above or below the auricle. The supporting structure 1410 may be provided with a sound guiding hole 1411 and a sound guiding hole 1412 for transmitting sound. In some embodiments, the sound guiding hole 1411 and the sound guiding hole 1412 may be located on both sides of the user's auricle, respectively, and the acoustic driver 1420 may output sounds through the sound guiding hole 1411 and the sound guiding hole 1412.

The acoustic driver 1420 may be a component that may receive an electrical signal, and convert the electrical signal into a sound signal for output. In some embodiments, in terms of frequency, the type of the acoustic driver 1420 may include a low-frequency acoustic driver, a high-frequency acoustic driver, or a full-frequency acoustic driver, or any combination thereof. In some embodiments, the acoustic driver 1420 may include a moving coil, a moving iron, a piezoelectric, an electrostatic, a magnetostrictive driver, or the like, or a combination thereof.

In some embodiments, the acoustic driver 1420 may include a vibration diaphragm. When the vibration diaphragm vibrates, sounds may be transmitted from the front and rear sides of the vibration diaphragm, respectively. In some embodiments, the front side of the vibration diaphragm in the supporting structure 1410 may be provided with a front chamber 1413 for transmitting sound. The front chamber 1413 may be acoustically coupled with the sound guiding hole 1411. The sound on the front side of the vibration diaphragm may be outputted from the sound guiding hole 1411 through the front chamber 1413. The rear side of the vibration diaphragm in the supporting structure 1410 may be provided with a rear chamber 1414 for transmitting sound. The rear chamber 1414 may be acoustically coupled with the sound guiding hole 1412. The sound on the rear side of the vibration diaphragm may be outputted from the sound guiding hole 1412 through the rear chamber 1414. It should be noted that, when the vibration diaphragm is vibrating, the front side and the rear side of the vibration diaphragm may simultaneously generate sounds with opposite phases. After passing through the front chamber 1413 and rear chamber 1414, respectively, the sounds may propagate outward from the sound guiding hole 1411 and the sound guiding hole 1412, respectively. In some embodiments, by adjusting the structure of the front chamber 1413 and the rear chamber 1414, the sounds output by the acoustic driver 1420 at the sound guiding hole 1411 and the sound guiding hole 1412 may meet specific conditions. For example, by designing the lengths of the front chamber 1413 and the rear chamber 1414, the sound guiding hole 1411 and the sound guiding hole 1412 may output sounds with a specific phase relationship (for example, opposite phases). Therefore, the problems including a small volume of the sound heard by the user in the near field of the acoustic output apparatus 1400 and a large sound leakage in the far field of the acoustic output apparatus 1400 may be effectively resolved.

In some alternative embodiments, the acoustic driver 1420 may also include a plurality of vibration diaphragms (e.g., two vibration diaphragms). Each of the plurality of vibration diaphragms may vibrate to generate a sound, which may pass through a cavity connected to the vibration diaphragm in the supporting structure, and output from corresponding sound guiding hole(s). The plurality of vibration diaphragms may be controlled by the same controller or different controllers and generate sounds that satisfy certain phase and amplitude conditions (for example, sounds of the same amplitude but opposite phases, sounds of different amplitudes and opposite phases, etc.).

As mentioned above, with a certain sound frequency, as the distance between two point sources increases, the volume of the sound heard by the user and the volume of the leaked sound corresponding to the two point sources may increase. For a clearer description, the relationship between volume of the sound heard by the user, the volume of sound leakage, and the point source distance d may be further explained in connection with FIGS. 15 through 17.

Figure 15:
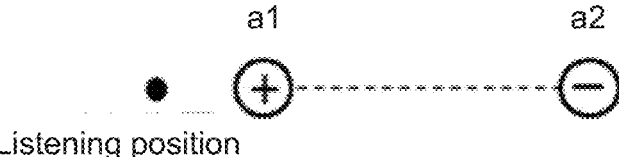
FIG. 15 is a schematic diagram illustrating two point sources and listening positions according to some embodiments of the present disclosure

FIG. 15 is a schematic diagram illustrating two point sources and a listening position according to some embodiments of the present disclosure. As shown in FIG. 15, a point source a1 and a point source a2 may be on a same side of the listening position. The point source a1 may be closer to the listening position, and the point source a1 and the point source a2 may output sounds with the same amplitude but opposite phases.

Figure 16:
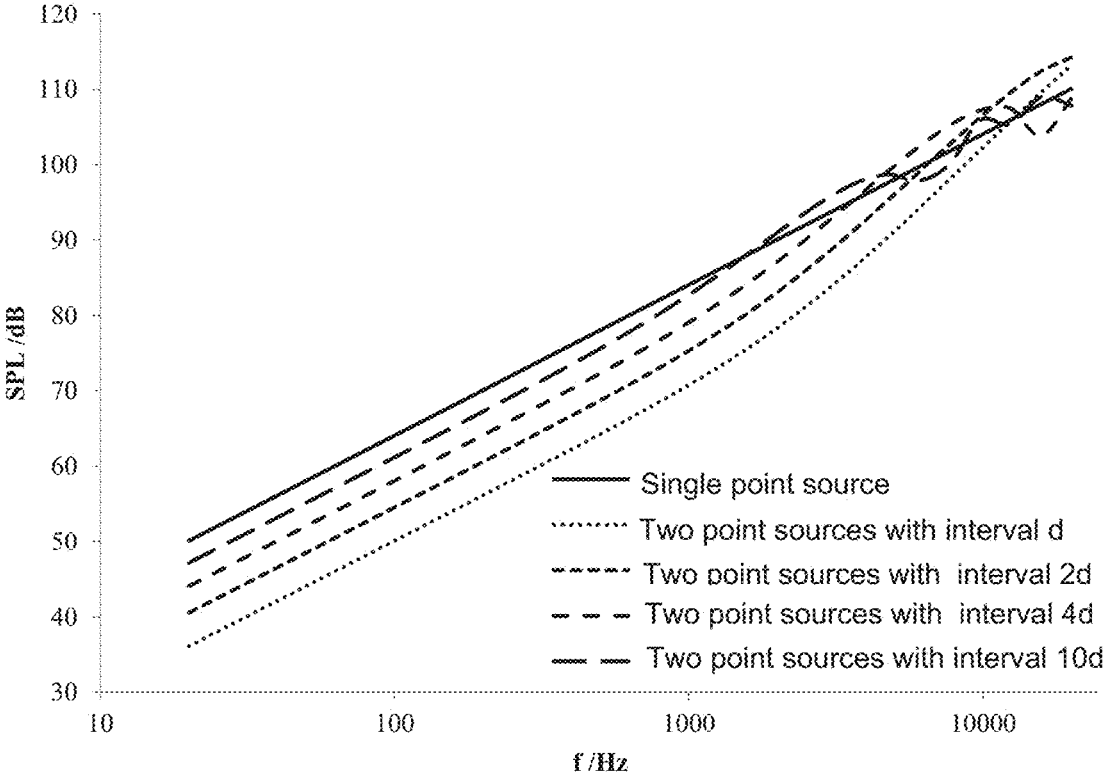
FIG. 16 is a graph illustrating a variation of a volume of the sound heard by the user of a two point sources with different distances as a function of frequency according to some embodiments of the present disclosure.

FIG. 16 is a graph illustrating a variation of the volume of the sound heard by the user of two point sources with different distances as a function of a frequency of sound according to some embodiments of the present disclosure. The abscissa may represent the frequency (f) of the sound output by the two point sources (denoted as a1 and a2), and the unit may be hertz (Hz). The ordinate may represent the volume of the sound, and the unit may be decibel (dB). As shown in FIG. 16, as the distance between the point source a1 and the point source a2 gradually increases (for example, from d to 10d), the sound volume at the listening position may gradually increase. That is, as the distance between the point source a1 and the point source a2 increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at a same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 17:
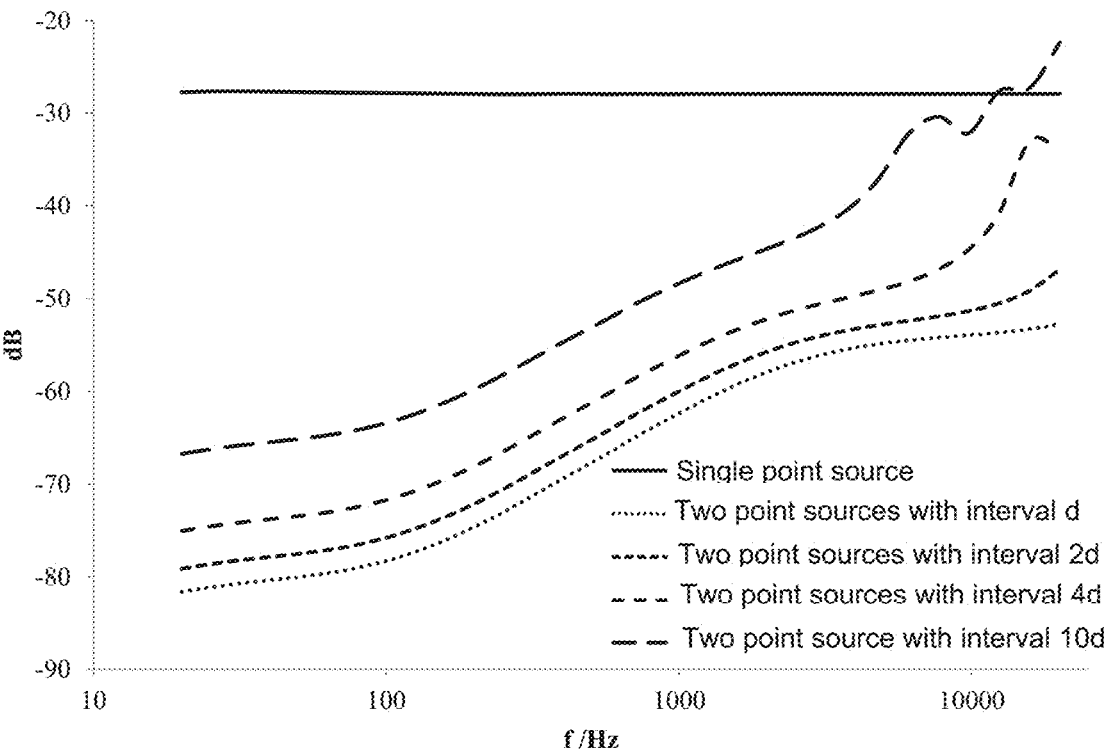
FIG. 17 is a graph illustrating a variation of a normalized parameter of two point sources in a far field along with frequency according to some embodiments of the present disclosure.

In some embodiments, by increasing the distance between the two point sources (for example, the point source a1 and the point source a2), the sound volume at the listening position may be increased. But as the distance increases, the sound cancellation of the two point sources may become weaker, which may lead to an increase of the far-field sound leakage. For illustration purposes, FIG. 17 is a graph illustrating a variation of a normalized parameter of different distances between two point sources in the far field along with a frequency of sound according to some embodiments of the present disclosure. The abscissa may represent the frequency (f) of the sound, the unit may be Hertz (Hz). The ordinate may use a normalization parameter α for evaluating the volume of the leaked sound, and the unit may be decibel (dB). As shown in FIG. 17, taking the normalization parameter α of a single point source as a reference, as the distance between the two point sources increases from d to 10d, the normalization parameter α may gradually increase, indicating that the sound leakage may gradually increase. More descriptions regarding the normalization parameter α may be found in equation (4) and related descriptions.

Figure 18:
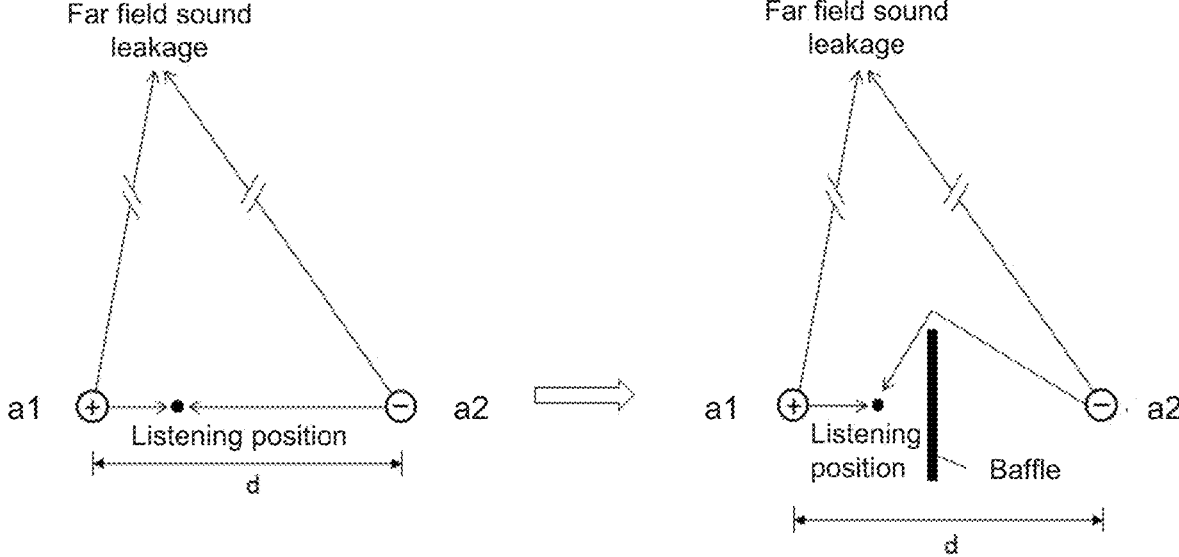
FIG. 18 is a distribution diagram illustrating an exemplary baffle provided between two point sources according to some embodiments of the present disclosure.

In some embodiments, adding a baffle structure to the acoustic output apparatus may be beneficial to improve the output effect of the acoustic output apparatus, that is, to increase the sound intensity at the near-field listening position, while reduce the volume of the far-field sound leakage. For illustration, FIG. 18 is a diagram illustrating an exemplary baffle provided between two point sources according to some embodiments of the present disclosure. As shown in FIG. 18, when a baffle is provided between the point source a1 and the point source a2, in the near field, the sound wave of the point source a2 may need to bypass the baffle to interfere with the sound wave of the point source a1 at the listening position, which may be equivalent to increasing the length of the acoustic route from the point source a2 to the listening position. Therefore, assuming that the point source a1 and the point source a2 have a same amplitude, compared to the case without a baffle, the difference in the amplitude of the sound waves of the point source a1 and the point source a2 at the listening position may increase, so that the degree of cancellation of the two sounds at the listening position may decrease, causing the sound volume at the listening position to increase. In the far field, because the sound waves generated by the point source a1 and the point source a2 do not need to bypass the baffle in a large space, the sound waves may interfere (similar to the case without a baffle). Compared to the case without a baffle, the sound leakage in the far field may not increase significantly. Therefore, a baffle structure being provided between the point source a1 and the point source a2 may increase the sound volume at the near-field listening position significantly while the volume of the far-field leakage does not increase significantly.

Figure 19:
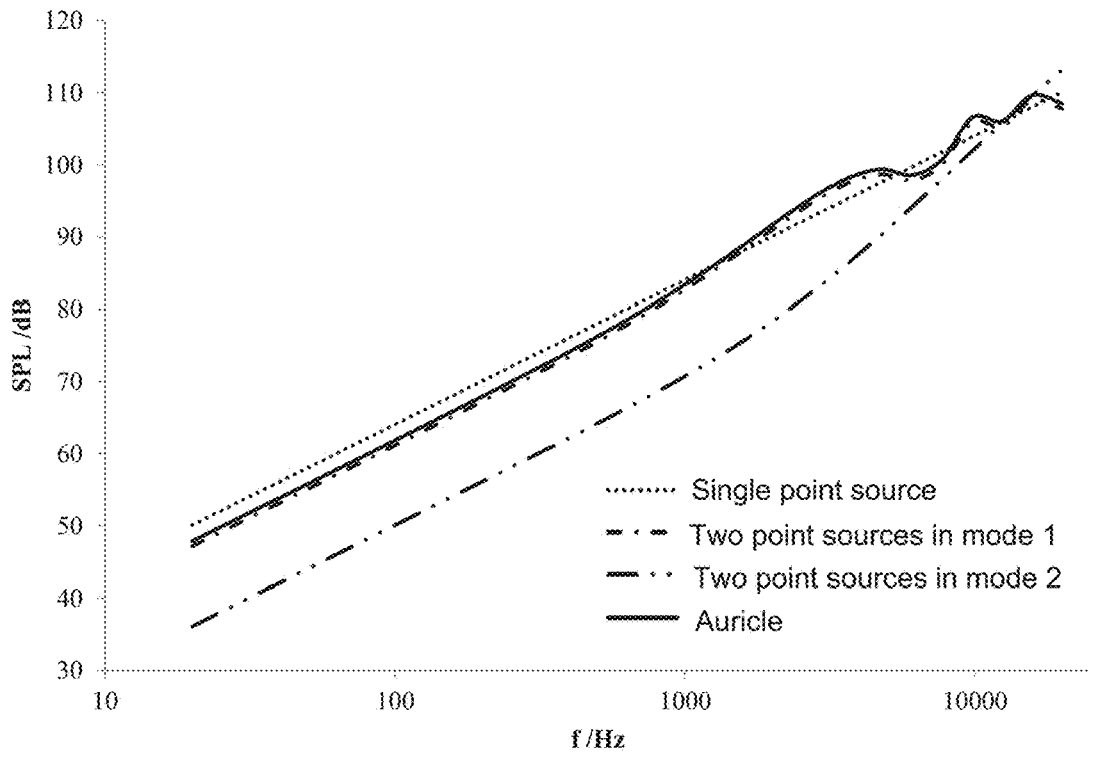
FIG. 19 is a graph illustrating a variation of a volume of sound heard by the user as a function of frequency when an auricle is located between two point sources according to some embodiments of the present disclosure.
Figure 20:
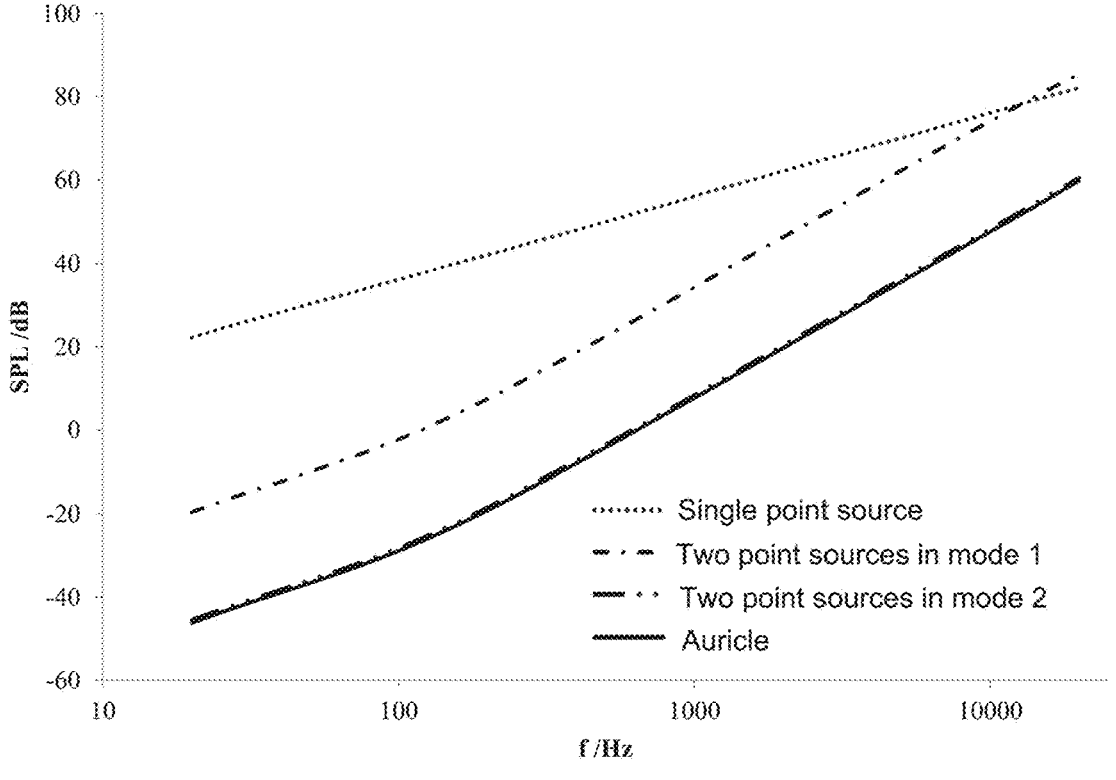
FIG. 20 is a graph illustrating a variation of a volume of leaked sound as a function of frequency when an auricle is located between two point sources according to some embodiments of the present disclosure.
Figure 21:
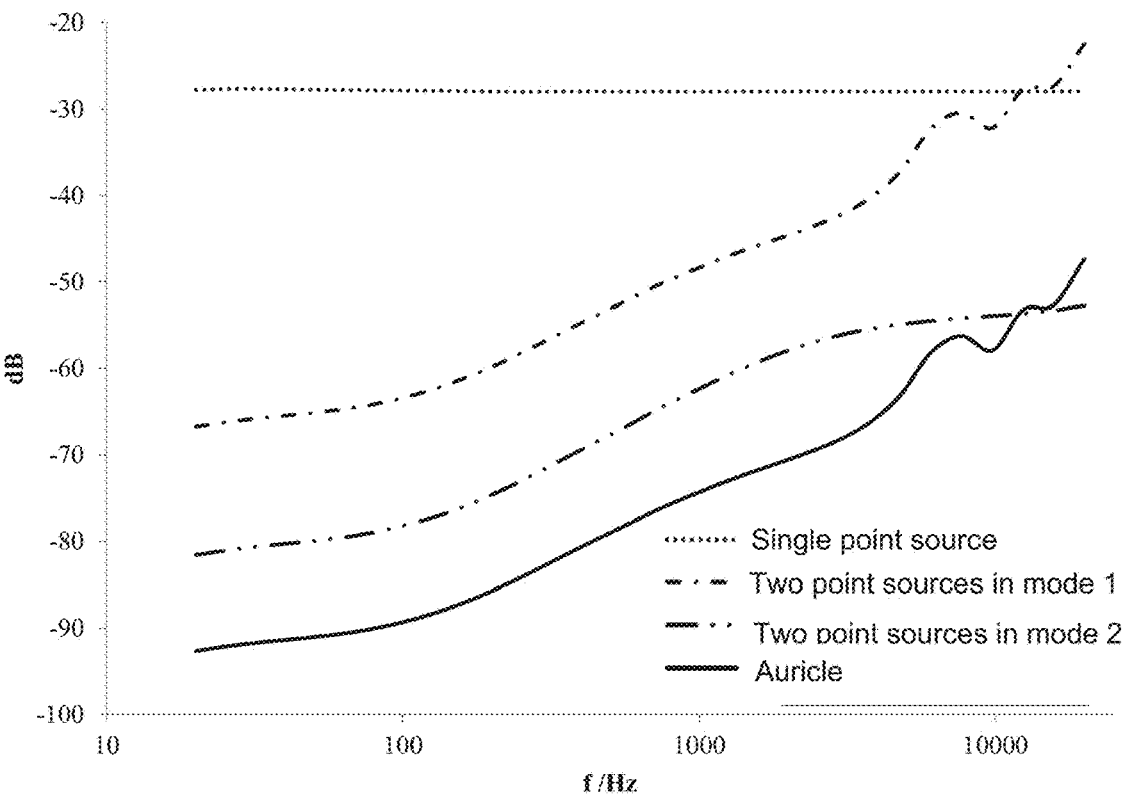
FIG. 21 is a graph illustrating a variation of a normalized parameter as a function of frequency when two point sources of an acoustic output apparatus is distributed on both sides of an auricle according to some embodiments of the present disclosure.

In the present disclosure, when the two point sources are located on both sides of the auricle, the auricle may serve as a baffle, so the auricle may also be referred to as a baffle for convenience. As an example, due to the existence of the auricle, the result may be equivalent to that the near-field sound may be generated by two point sources with a distance of d1 (also known as mode 1). The far-field sound may be generated by two point sources with a distance of D2 (also known as mode 2), and D1>D2. FIG. 19 is a graph illustrating a variation of the volume of a sound heard by a user as a function of the frequency of sound when the auricle is located between two point sources according to some embodiments of the present disclosure. As shown in FIG. 19, when the frequency is low (for example, when the frequency is less than 1000 Hz), the volume at the near-field sound (that is, the sound heard by the user by the user's ear) may basically be the same as that of the near-field sound in mode 1, be greater than the volume of the near-field sound in mode 2, and be close to the volume of the near-field sound of a single point source. As the frequency increases (for example, when the frequency is between 2000 Hz and 7000 Hz), the volume of the near-field sound in mode 1 and the two point sources being distributed on both sides of the auricle may be greater than that of the one point source. It shows that when the user's auricle is located between the two point sources, the volume of the near-field sound transmitted from the sound source to the user's ear may be effectively enhanced. FIG. 20 is a graph illustrating a variation of the volume of a leaked sound as a function of the frequency of sound when the auricle is located between two point sources according to some embodiments of the present disclosure. As shown in FIG. 20, as the frequency increases, the volume of the far-field leakage may increase. When the two point sources are distributed on both sides of the auricle, the volume of the far-field leakage generated by the two point sources may be basically the same as the volume of the far-field leakage in mode 2, and both of which may be less than the volume of the far-field leakage in mode 1 and the volume of the far-field leakage of a single point source. It shows that when the user's auricle is located between the two point sources, the sound transmitted from the sound source to the far field may be effectively reduced, that is, the sound leakage from the sound source to the surrounding environment may be effectively reduced. FIG. 21 is a graph illustrating a variation of a normalized parameter as a function of the frequency of sound when two point sources of an acoustic output apparatus is distributed on both sides of the auricle according to some embodiments of the present disclosure. As shown in FIG. 21, when the frequency is less than 10000 Hz, the normalized parameter of the two point sources being distributed on both sides of the auricle may be less than the normalized parameter in the case of mode 1 (no baffle structure between the two point sources, and the distance is D1), mode 2 (no baffle structure between the two point sources, and the distance is D2), and the single point source, which may show that when the two point sources are located on both sides of the auricle, the acoustic output apparatus may have a better capability to reduce the sound leakage.

In order to further explain the effect of the acoustic output apparatus with or without a baffle between the two point sources or two sound guiding holes, the volume of the near-field sound at the listening position and/or volume of the far-field leakage under different conditions may specifically be described below.

Figure 22:
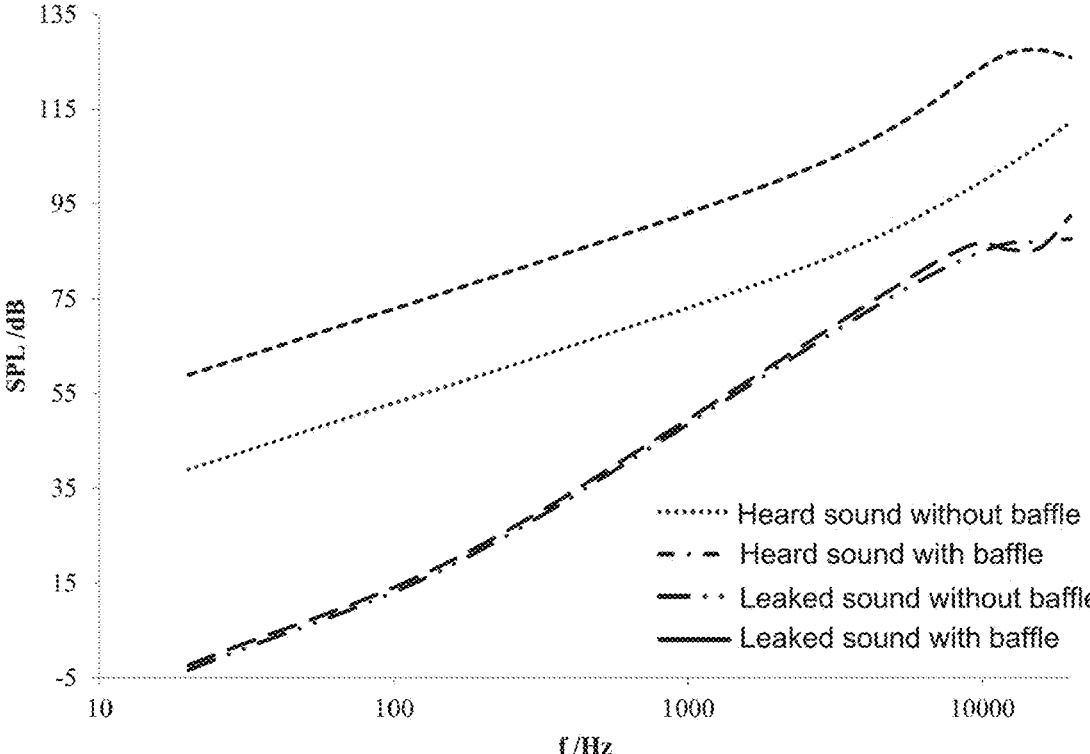
FIG. 22 is a graph illustrating a variation of a volume of sound heard by the user and a volume of leaked sound as a function of frequency with and without a baffle between two point sources according to some embodiments of the present disclosure.

FIG. 22 is a graph illustrating a variation of the volume of a sound heard by the user and volume of a leaked sound as a function of the frequency of sound with and without a baffle between two point sources according to some embodiments of the present disclosure. As shown in FIG. 22, after adding a baffle between the two point sources (i.e., two sound guiding holes) of the acoustic output apparatus, in the near field, it may be equivalent to increasing the distance between the two point sources, and the sound volume at the near-field listening position may be equivalent to being generated by a set of two point sources with a large distance. The volume of the near-field sound may be significantly increased compared to the case without a baffle. In the far field, because the interference of the sound waves generated by the two point sources may be rarely affected by the baffle, the sound leakage may be equivalent to being generated by two point sources with a small distance, therefore the sound leakage may not change significantly with or without the baffle. It may be seen that by setting a baffle between two sound guiding holes (i.e., two point sources), the ability of the sound output apparatus to reduce the sound leakage may be effectively improved, and the volume of the near-field sound of the acoustic output apparatus may be increased significantly. Therefore, the requirements for sound production components of the acoustic output apparatus may be reduced. At the same time, the simple circuit structure may reduce the electrical loss of the acoustic output apparatus, so that the working time of the acoustic output apparatus may be greatly prolonged under a certain amount of electricity.

Figure 23:
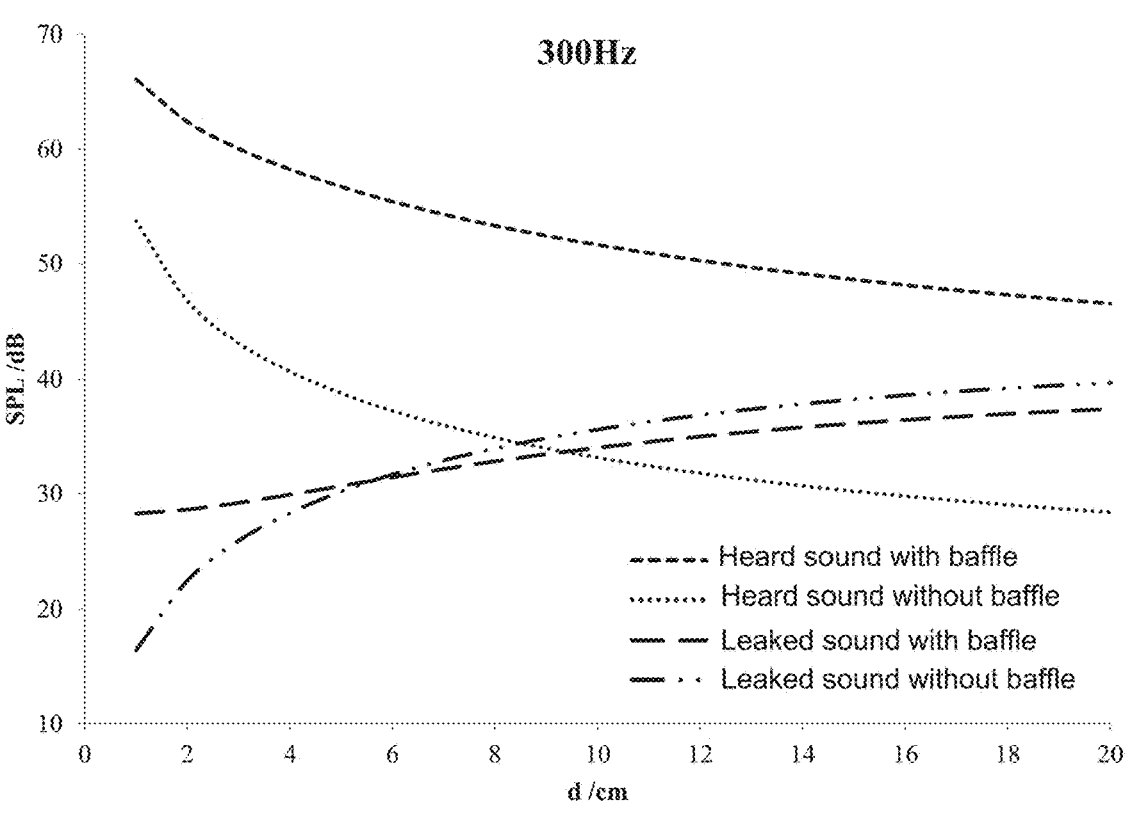
FIG. 23 is a graph illustrating a variation of a volume of sound heard by the user and a volume of leaked sound as a function of distance between two point sources at a frequency of 300 Hz and with or without a baffle according to some embodiments of the present disclosure.
Figure 24:
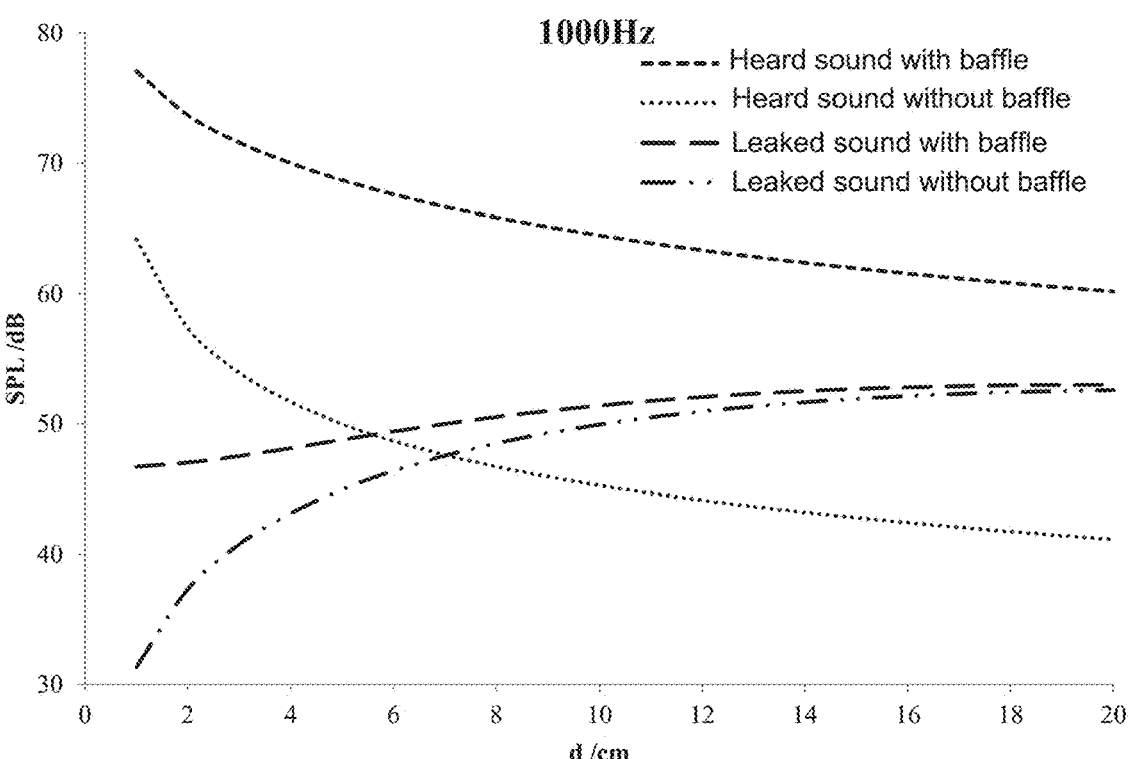
FIG. 24 is a graph illustrating a variation of a volume of sound heard by the user and a volume of leaked sound as a function of distance between two point sources at a frequency of 1000 Hz and with or without a baffle according to some embodiments of the present disclosure.

FIG. 23 is a graph illustrating a variation of the volume of a sound heard by the user and the volume of a leaked sound as a function of the distance between two point sources when the frequency of the two point sources is 300 Hz according to some embodiments of the present disclosure. FIG. 24 is a graph illustrating a variation of the volume of a sound heard by the user and the volume of a leaked sound as a function of the distance between two point sources when the frequency of the two point sources is 1000 Hz according to some embodiments of the present disclosure. As shown in FIGS. 23 and 24, in the near field, when the frequency is 300 Hz or 1000 Hz, as the increase of the distance d of the two point sources, the volume of the sound heard by the user with a baffle between the two point sources may be greater than that without a baffle between the two point sources, which shows that at this frequency, the baffle structure between the two point sources may effectively increase the volume of the sound heard by the user in the near field. In the far field, the volume of the leaked sound with a baffle between the two point sources may be equivalent to that without a baffle between the two point sources, which shows that at this frequency, with or without a baffle structure arranged between the two point sources has little effect on the far-field sound leakage.

Figures 25, 26:
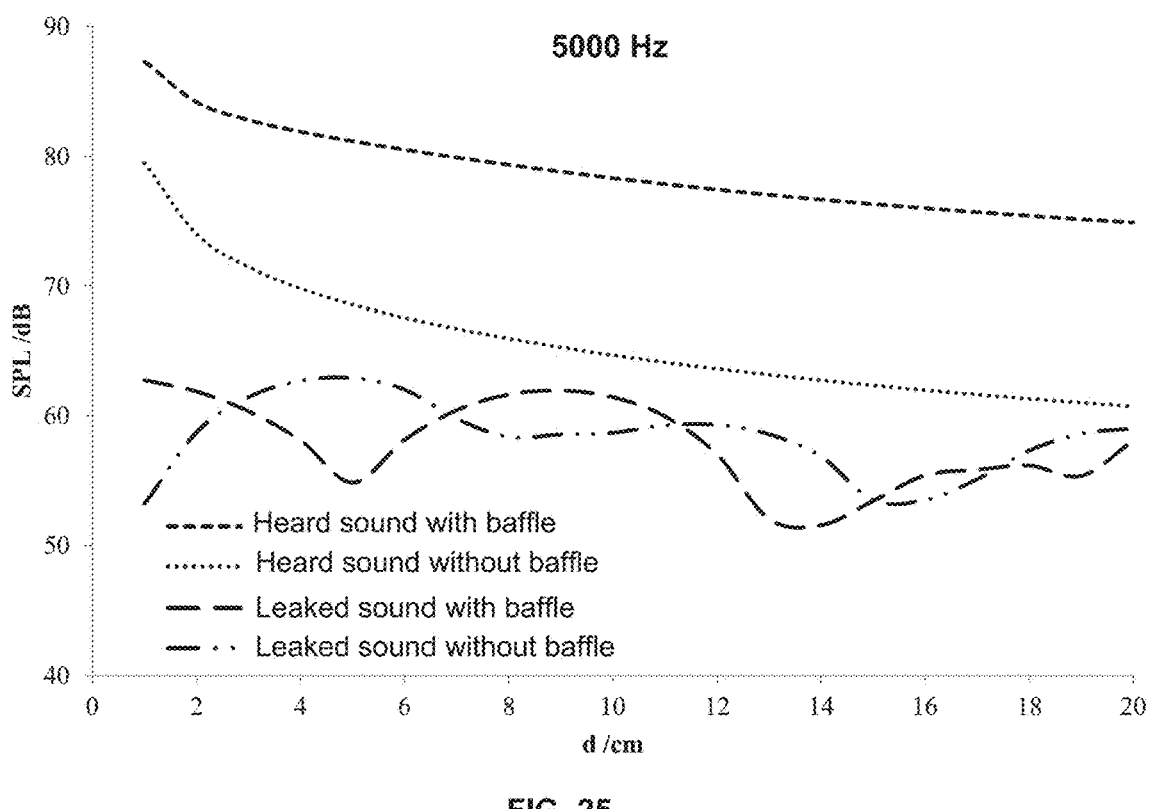
FIG. 25 is a graph illustrating a variation of a volume of sound heard by the user and a volume of leaked sound as a function of distance at a frequency of 5000 Hz and with or without a baffle between the two point sources according to some embodiments of the present disclosure.
FIGS. 26-28 are graphs illustrating a variation of a volume of sound heard by the user as a function of frequency when a distance d of two point sources is 1 cm, 2 cm, 3 cm, respectively, according to some embodiments of the present disclosure.

FIG. 25 is a graph illustrating a variation of the volume of a sound heard by the user and the volume of a leaked sound as a function of the distance when the frequency of the two point sources is 5000 Hz according to some embodiments of the present disclosure. As shown in FIG. 25, in the near field, when the frequency is 5000 Hz, as the distance d of the two point sources increases, the volume of the sound heard by the user when there is a baffle between the two point sources may be greater than that when there is no baffle. In the far-field, the volume of the leaked sound of the two point sources with and without baffle may be fluctuant as a function of the distance d. Overall, whether the baffle structure is arranged between the two point sources has little effect on the far-field leakage.

Figure 27:
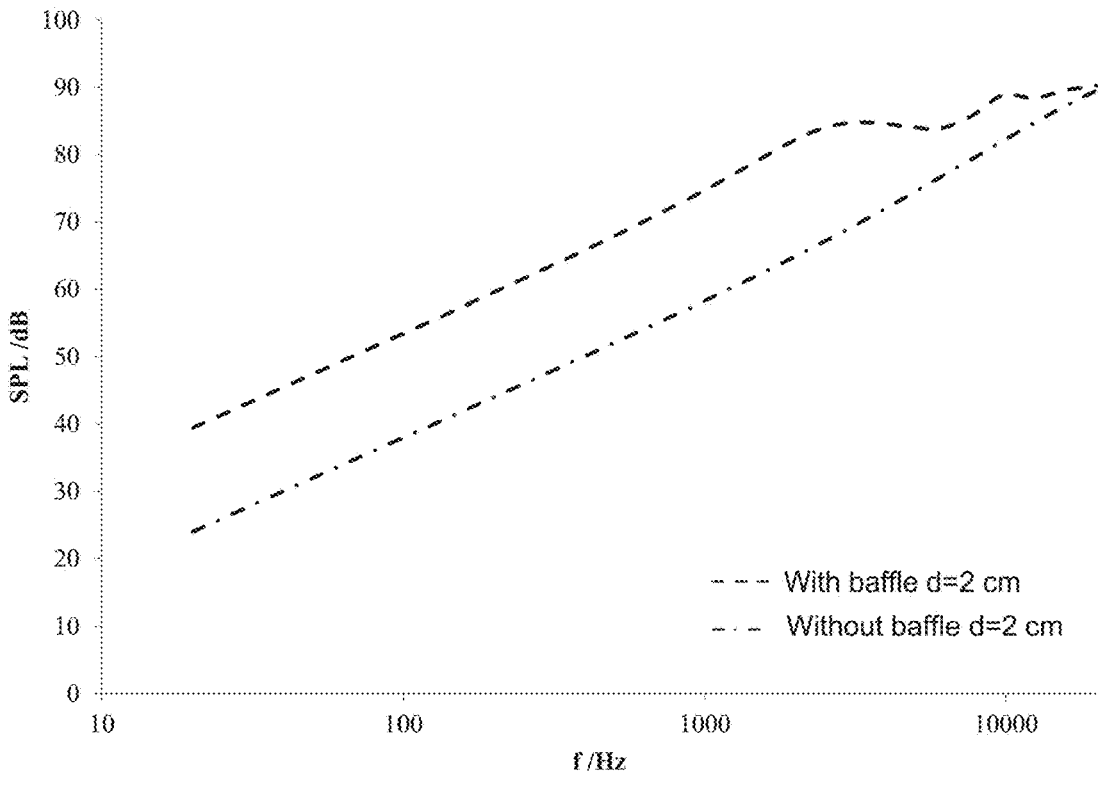
Figure 28:
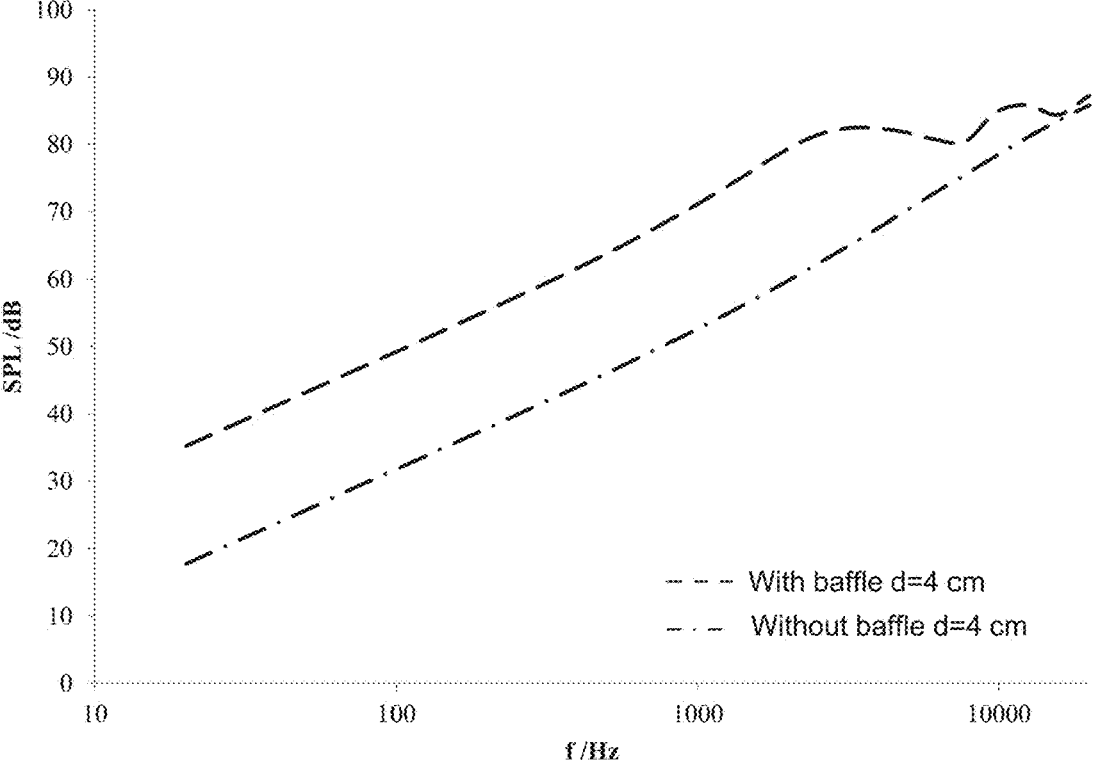
Figure 29:
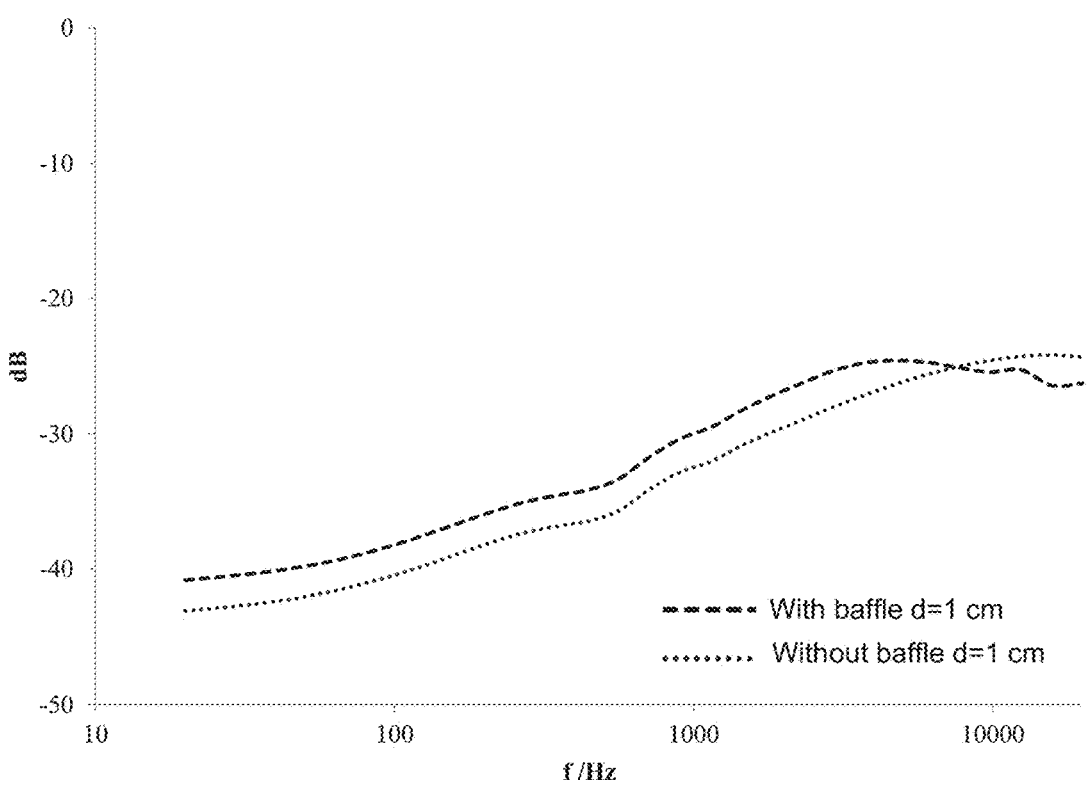
FIG. 29 is a graph illustrating a variation of a normalized parameter as a function of frequency when a distance d of two point sources is 1 cm according to some embodiments of the present disclosure.
Figure 30:
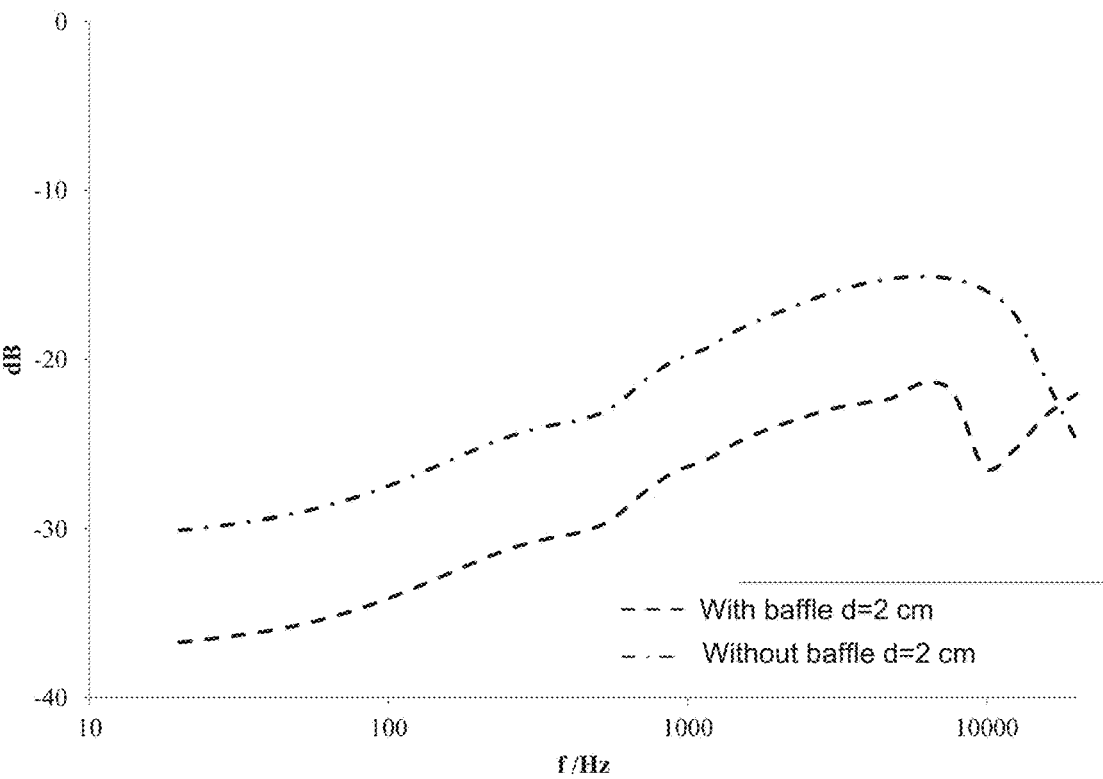
FIG. 30 is a graph illustrating a variation of a normalized parameter as a function of frequency when a distance d of two point sources is 2 cm according to some embodiments of the present disclosure.
Figure 31:
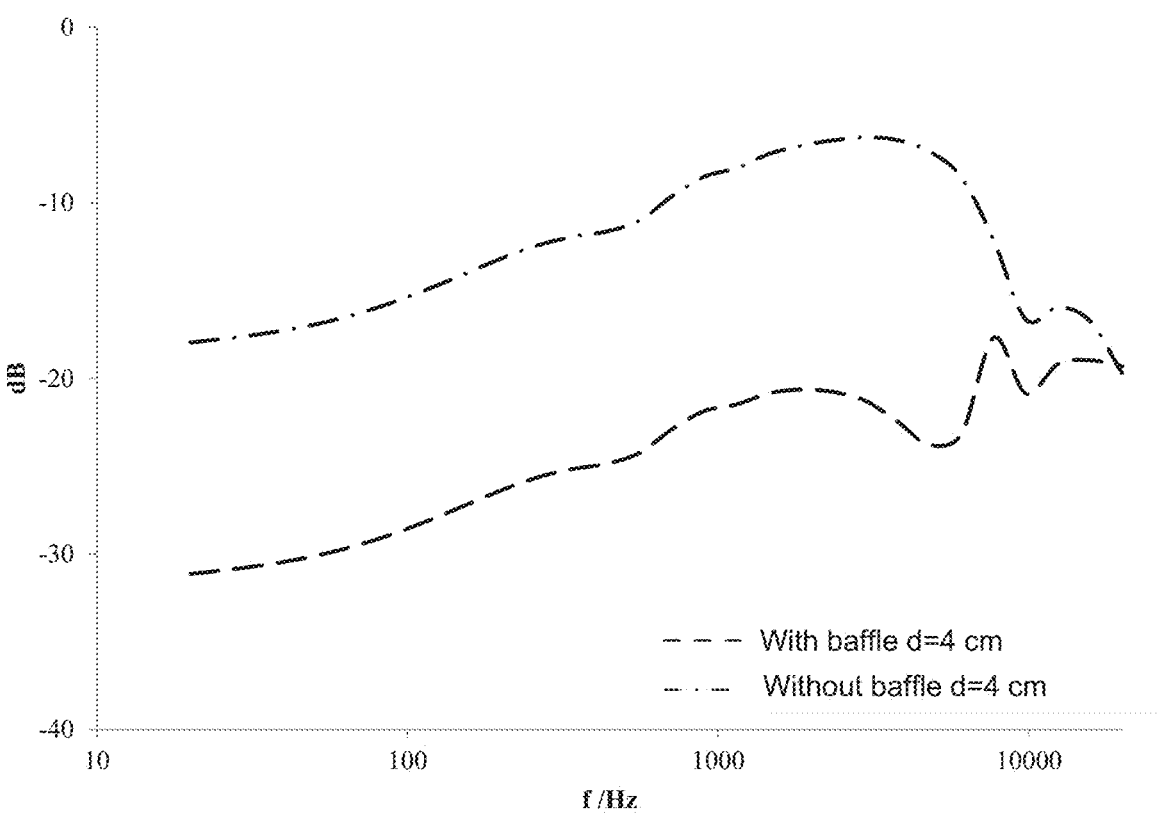
FIG. 31 is a graph illustrating a variation of a normalized parameter as a function of frequency when a distance d of two point sources is 4 cm according to some embodiments of the present disclosure.

FIGS. 26-28 are graphs illustrating a variation of the volume of a sound heard by the user as a function of the frequency of sound when the distance d of two point sources is 1 cm, 2 cm, 3 cm, respectively, according to some embodiments of the present disclosure. FIG. 29 is a graph illustrating a variation of a normalized parameter of a far field as a function of the frequency of sound when the distance d of two point sources is 1 cm according to some embodiments of the present disclosure. FIG. 30 is a graph illustrating a variation of a normalized parameter of a far field as a function of the frequency of sound when the distance d of two point sources is 2 cm according to some embodiments of the present disclosure. FIG. 31 is a graph illustrating a variation of a normalized parameter of a far field as a function of the frequency of sound when the distance d of two point sources is 4 cm according to some embodiments of the present disclosure. As shown in FIGS. 26 through 28, for the different distances d of the sound guiding holes (for example, 1 cm, 2 cm, 4 cm), at a certain frequency, in the near-field listening position (for example, the user's ear), the sound volume of two sound guiding holes located on both sides of the auricle (i.e., the "baffle effect" situation shown in the figure) may be greater than the sound volume of two sound guiding holes located on a same side of the auricle (i.e., the case of "without baffle" as shown in the figures). The certain frequency may be below 10000 Hz, below 5000 Hz, or below 1000 Hz.

As shown in FIGS. 29 to 31, for the different distances d of the sound guiding holes (for example, 1 cm, 2 cm, and 4 cm), at a certain frequency, in the far-field position (for example, the environment position away from the user's ear), the volume of the leaked sound generated when the two sound guiding holes are provided on both sides of the auricle may be smaller than that generated when the two sound guiding holes are not provided on both sides of the auricle. It should be noted that as the distance between two sound guiding holes or two point sources increases, the interference cancellation of sound at the far-field position may weaken, leading to a gradual increase in the far-field leakage and a weaker ability to reduce sound leakage. Therefore, the distance d between two sound guiding holes or the two point sources may not be too large. In some embodiments, in order to keep the output sound as loud as possible in the near-field, and suppress the sound leakage in the far field, the distance d between the two sound guiding holes may be set to be no more than, for example, 20 cm, 12 cm, 10 cm, 6 cm, or the like. In some embodiments, considering the size of the acoustic output apparatus and the structural requirements of the sound guiding holes, the distance d between the two sound guiding holes may be set to be in a range of, for example, 1 cm to 12 cm, 1 cm to 10 cm, 1 cm to 8 cm, 1 cm to 6 cm, 1 cm to 3 cm, or the like.

It should be noted that the above description is merely for the convenience of description, and not intended to limit the scope of the present disclosure. It may be understood that, for those skilled in the art, after understanding the principle of the present disclosure, various modifications and changes in the forms and details of the acoustic output apparatus may be made without departing from this principle. For example, in some embodiments, a plurality of sound guiding holes may be set on both sides of the baffle. The number of the sound guiding holes on both sides of the baffle may be the same or different. For example, the number of sound guiding holes on one side of the baffle may be two, and the number of sound guiding holes on the other side may be two or three. These modifications and changes may still be within the protection scope of the present disclosure.

Figure 32:
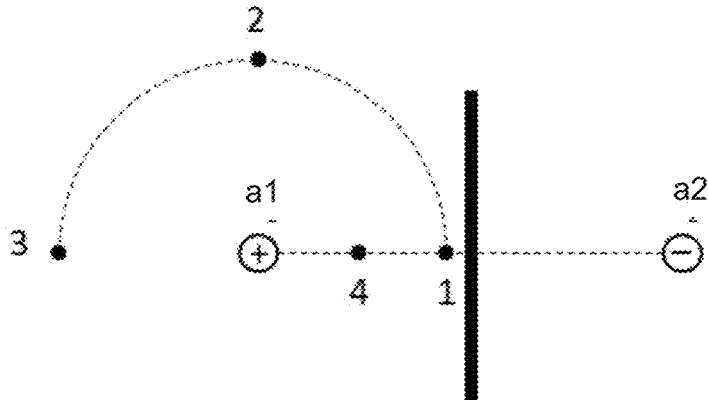
FIG. 32 is a graph illustrating exemplary distributions of different listening positions according to some embodiments of the present disclosure.

In some embodiments, on the premise of maintaining the distance between the two point sources, a relative position of the listening position to the two point sources may have a certain effect on the volume of the near-field sound and the far-field leakage reduction. In order to improve the acoustic output effect of the acoustic output apparatus, in some embodiments, the acoustic output apparatus may be provided with at least two sound guiding holes. The at least two sound guiding holes may include two sound guiding holes located on the front and back sides of the user's auricle, respectively. In some embodiments, considering that the sound propagated from the sound guiding hole located on the rear side of the user's auricle needs to bypass over the auricle to reach the user's ear canal, the acoustic route between the sound guiding hole located on the front side of the auricle and the user's ear canal (i.e., the acoustic distance from the sound guiding hole to the user's ear canal entrance) is shorter than the acoustic route between the sound guiding hole located on the rear side of the auricle and the user's ear. In order to further explain the effect of the listening position on the acoustic output effect, four representative listening positions (listening position 1, listening position 2, listening position 3, listening position 4) may be selected as shown in FIG. 32. The listening position 1, the listening position 2, and the listening position 3 may have equal distance from the point source a1, which may be r1. The distance between the listening position 4 and the point source a1 may be r2, and r2<r1. The point source a1 and the point source a2 may generate sounds with opposite phases, respectively.

Figure 33:
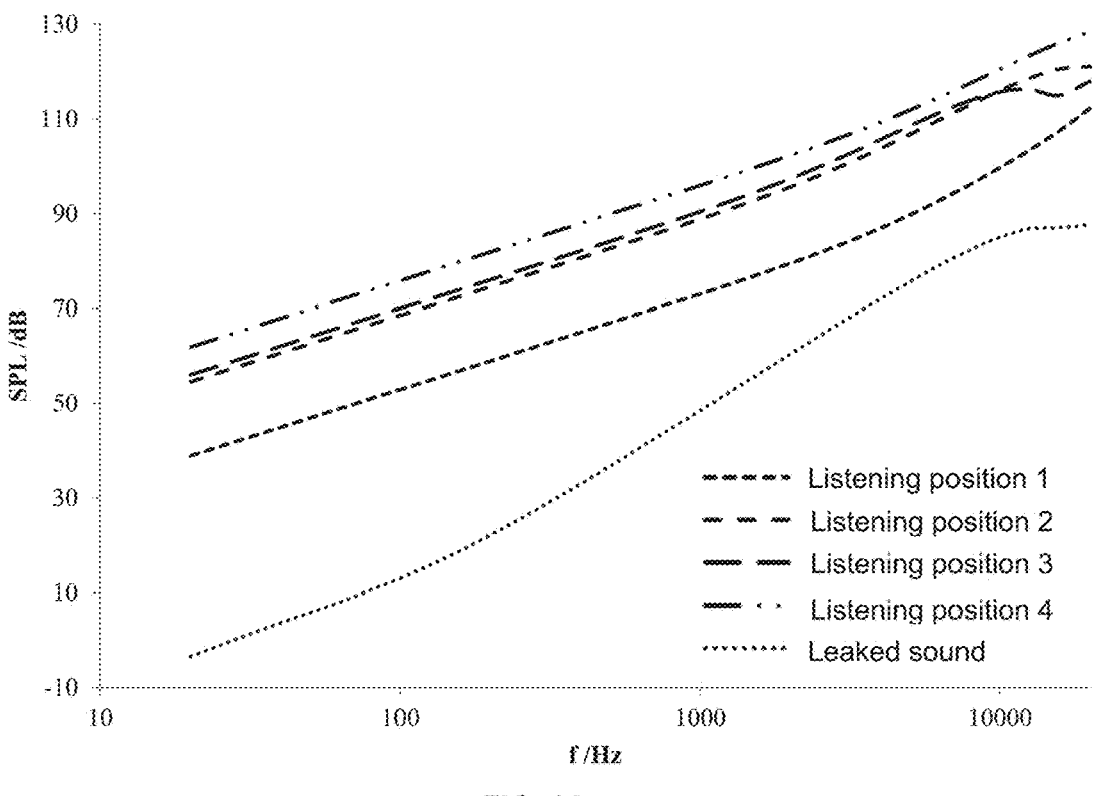
FIG. 33 is a graph illustrating a volume of sound heard by the user from a two point sources without baffle at different listening positions in a near field as a function of frequency according to some embodiments of the present disclosure.
Figure 34:
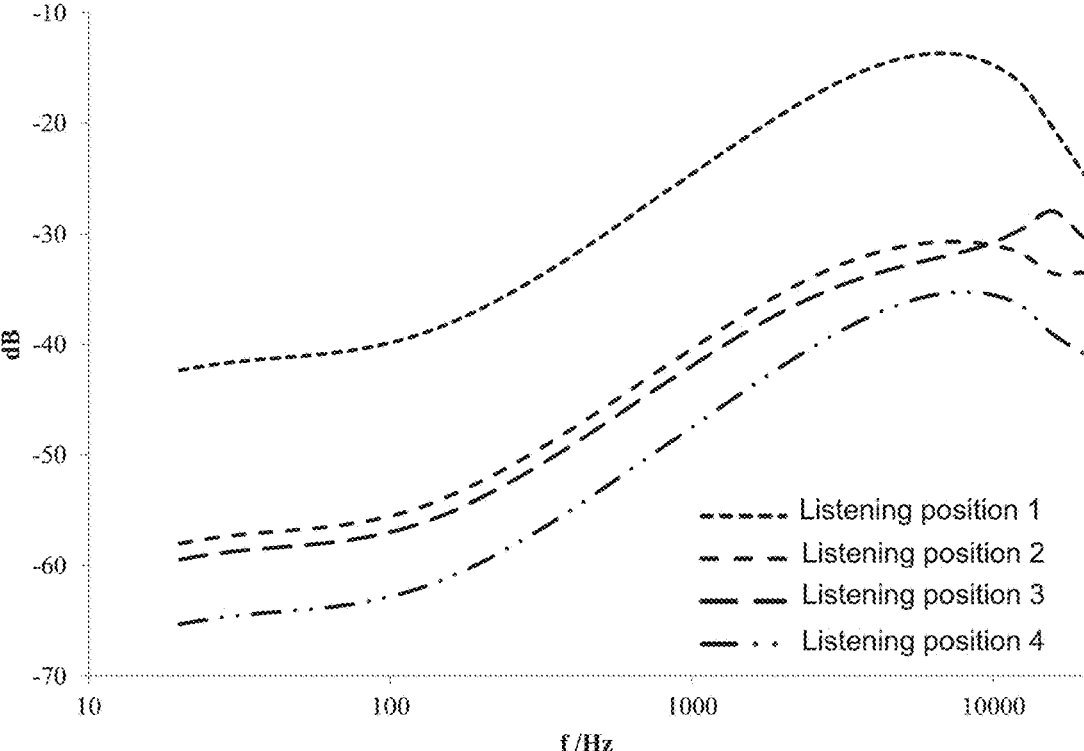
FIG. 34 is a graph illustrating a normalized parameter of two point sources without baffle at different listening positions in a near field according to some embodiments of the present disclosure.

FIG. 33 is a graph illustrating the volume of a sound heard by a user of two point sources without baffle at different listening positions as a function of the frequency of sound according to some embodiments of the present disclosure. FIG. 34 is a graph illustrating a normalized parameter of different listening positions as a function of the frequency of sound. The normalized parameter may be obtained with reference to Equation (4). As shown in FIGS. 33 and 34, for the listening position 1, since the difference between the acoustic routes from the point source a1 and the point source a2 to the listening position 1 is small, the difference in amplitude of the sounds produced by the two point sources at the listening position 1 may be small. Therefore, an interference of the sounds of the two point sources at the listening position 1 may cause the volume of the sound heard by the user to be smaller than that of other listening positions. For the listening position 2, compared with the listening position 1, the distance between the listening position 2 and the point source a1 may remain unchanged, that is, the acoustic route from the point source a1 to the listening position 2 may not change. However, the distance between the listening position 2 and the point source a2 may be longer, and the length of the acoustic route between the point source a2 and the listening position 2 may increase. The amplitude difference between the sound generated by the point source a1 and the sound generated by the point source a2 at the listening position 2 may increase. Therefore, the volume of the sound transmitted from the two point sources after interference at the listening position 2 may be greater than that at the listening position 1. Among all positions on an arc with a radius of r1, a difference between the acoustic route from the point source a1 to the listening position 3 and the acoustic route from the point source a2 to the listening position 3 may be the longest. Therefore, compared with the listening position 1 and the listening position 2, the listening position 3 may have the highest volume of the sound heard by the user. For the listening position 4, the distance between the listening position 4 and the point source a1 may be short. The sound amplitude of the point source a1 at the listening position 4 may be large. Therefore, the volume of the sound heard by the user at the listening position 4 may be large. In summary, the volume of the sound heard by the user at the near-field listening position may change as the listening position and the relative position of the two point sources change. When the listening position is on the line between the two point sources and on the same side of the two point sources (for example, listening position 3), the acoustic route difference between the two point sources at the listening position may be the largest (the acoustic route difference may be the distance d between the two point sources). In this case (i.e., when the auricle is not used as a baffle), the volume of the sound heard by the user at this listening position may be greater than that at other locations. According to Equation (4), when the far-field leakage is constant, the normalization parameter corresponding to this listening position may be the smallest, and the leakage reduction capability may be the strongest. At the same time, reducing the distance r1 between the listening position (for example, listening position 4) and the point source a1 may further increase the volume at the listening position, at the same time reduce the sound leakage, and improve the capability to reduce leakage.

Figure 35:
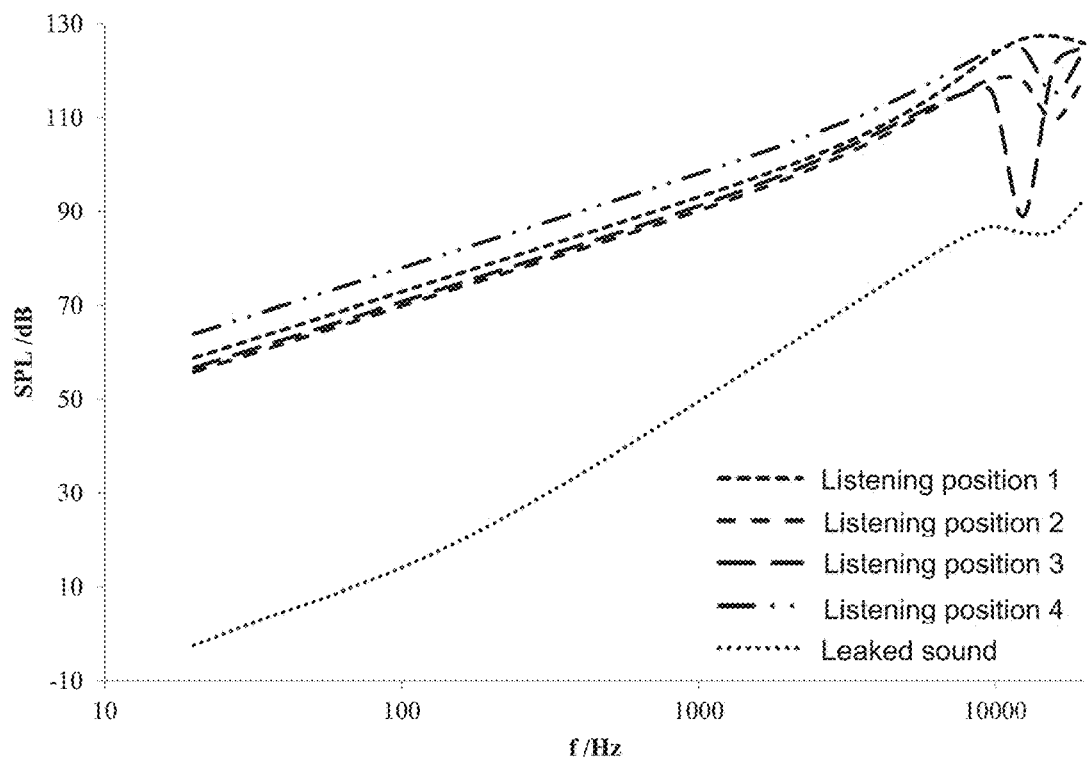
FIG. 35 is a graph illustrating a volume of sound heard by the user from two point sources with a baffle at different listening positions in a near field as a function of frequency according to some embodiments of the present disclosure.
Figure 36:
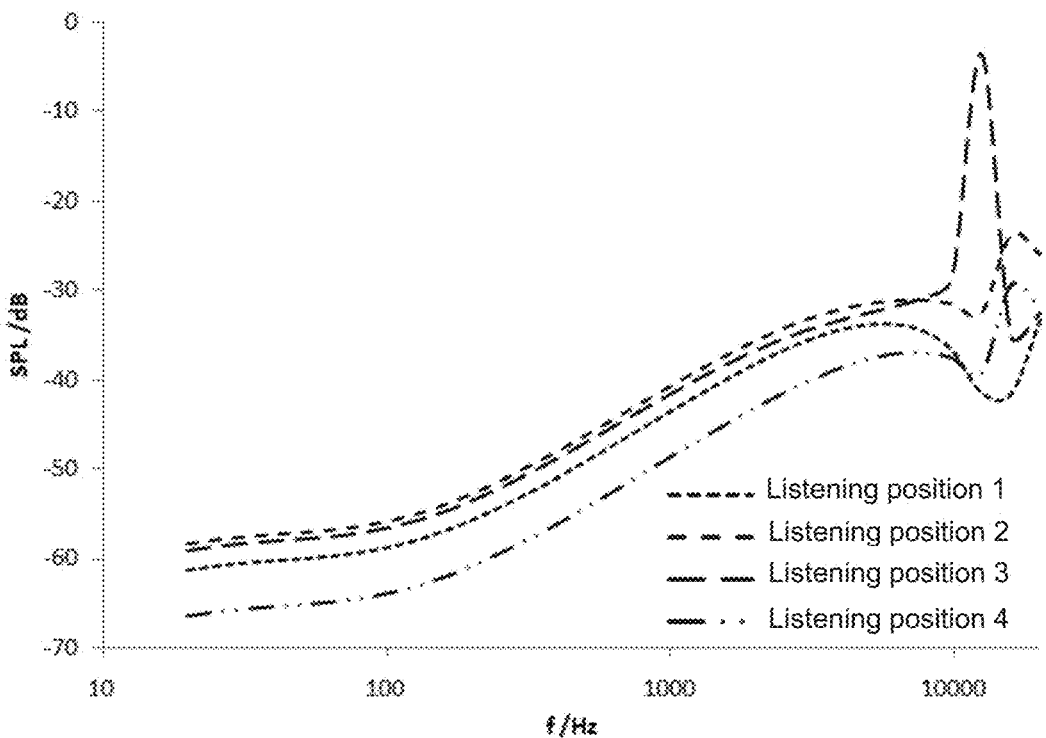
FIG. 36 is a graph illustrating a normalized parameter of two point sources with a baffle at different listening positions in a near field according to some embodiments of the present disclosure.

FIG. 35 is a graph illustrating the volume of the sound heard by the user of two point sources with baffle (as shown in FIG. 32) at different listening positions in the near field as a function of frequency according to some embodiments of the present disclosure. FIG. 36 is a graph of the normalization parameters of different listening positions obtained with reference to Equation (4) based on FIG. 35, as a function of frequency. As shown in FIGS. 35 and 36, compared to the case without a baffle, the volume of the sound heard by the user generated by the two point sources at listening position 1 may increase significantly when there is a baffle. The volume of the sound heard by the user at the listening position 1 may exceed that at the listening position 2 and the listening position 3. The reason may be that the acoustic route from the point source a2 to the listening position 1 may increase after a baffle is set between the two point sources. As a result, the acoustic route difference between the two point sources at the listening position 1 may increase significantly. The amplitude difference between the sounds generated by the two point sources at the listening position 1 may increase, making it difficult to produce sound interference cancellation, thereby increasing the volume of the sound heard by the user generated at the listening position 1 significantly. At the listening position 4, since the distance between the listening position and the point source a1 is further reduced, the sound amplitude of the point source a1 at this position may be larger. The volume of the sound heard by the user at the listening position 4 may still be the largest among the four listening positions. For listening position 2 and listening position 3, since the effect of the baffle on the acoustic route from the point source a2 to the two listening positions is not very obvious, the volume increase effect at the listening position 2 and the listening position 3 may be less than that at the listening position 1 and the listening position 4 which are closer to the baffle.

The volume of the leaked sound in the far field may not change with listening positions, and the volume of the sound heard by the user at the listening position in the near field may change with listening positions. In this case, according to Equation (4), the normalization parameter of the acoustic output apparatus may vary in different listening positions. Specifically, a listening position with a large volume of sound heard by the user (e.g., listening position 1 and listening position 4) may have a small normalization parameter and strong capability to reduce sound leakage. A listening position with a low volume of sound heard by the user (e.g., listening position 2 and listening position 3) may have a large normalization parameter and weak capability to reduce leakage.

Therefore, according to the actual application scenario of the acoustic output apparatus, the user's auricle may serve as a baffle. In this case, the two sound guiding holes on the acoustic output apparatus may be arranged on the front side and the back side of the auricle, respectively, and the ear canal may be located between the two sound guiding holes as a listening position. In some embodiments, by designing the positions of the two sound guiding holes on the acoustic output apparatus, the distance between the sound guiding hole on the front side of the auricle and the ear canal may be smaller than the distance between the sound guiding hole on the back side of the auricle and the ear canal. In this case, the acoustic output apparatus may produce a large sound amplitude at the ear canal since the sound guiding hole on the front side of the auricle is close to the ear canal. The sound amplitude formed by the sound guiding hole on the back of the auricle may be smaller at the ear canal, which may avoid the interference cancellation of the sound at the two sound guiding holes at the ear canal, thereby ensuring that the volume of the sound heard by the user at the ear canal is large. In some embodiments, the acoustic output apparatus may include one or more contact points (e.g., "an inflection point" on a supporting structure to match the shape of the ear) that can contact with the auricle when it is worn. The contact point(s) may be located on a line connecting the two sound guiding holes or on one side of the line connecting the two sound guiding holes. And a ratio of the distance between the front sound guiding hole and the contact point(s) to the distance between the rear sound guiding hole and the contact point(s) may be 0.05-20. In some embodiments, the ratio may be 0.1-10. In some embodiments, the ratio may be 0.2-5. In some embodiments, the ratio may be 0.4-2.5.

Figure 37:
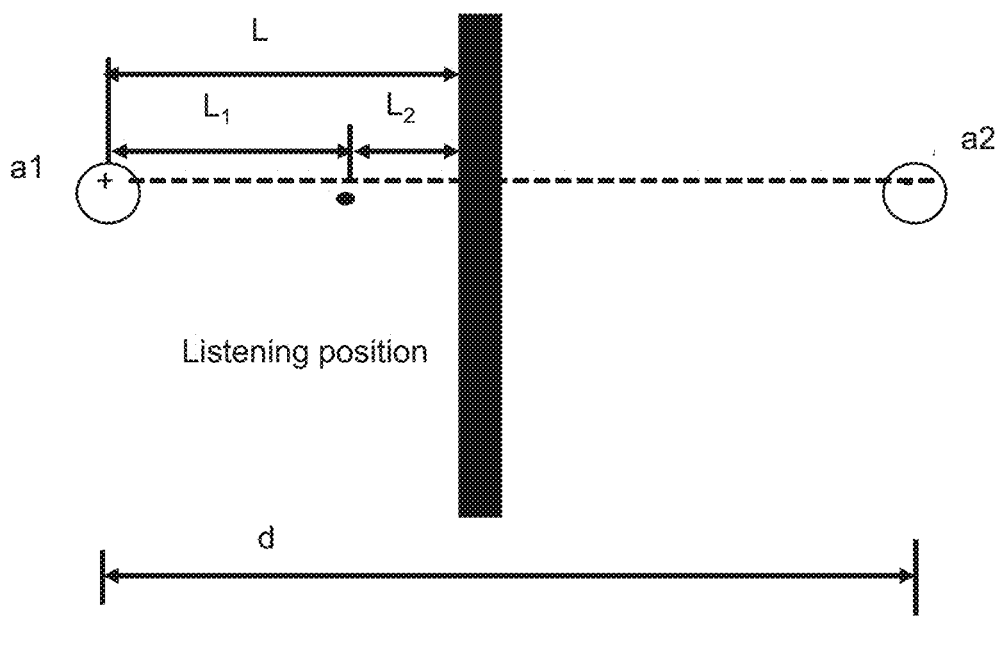
FIG. 37 is a schematic diagram illustrating two point sources and a baffle according to some embodiments of the present disclosure.

FIG. 37 is a schematic diagram illustrating two point sources and a baffle (e.g., an auricle) according to some embodiments of the present disclosure. In some embodiments, a position of the baffle between the two sound guiding holes may have a certain influence on the acoustic output effect. Merely by way of example, as shown in FIG. 37, a baffle may be provided between a point source a1 and a point source a2, a listening position may be located on the line connecting the point source a1 and the point source a2. In addition, the listening position may be located between the point source a1 and the baffle. A distance between the point source a1 and the baffle may be L. A distance between the point source a1 and the point source a2 may be d. A distance between the point source a1 and the sound heard by the user may be L1. A distance between the listening position and the baffle may be L2. When the distance L1 is constant, a movement of the baffle may cause different ratios of L to d, thereby obtaining different volumes of the sound heard by the user at the listening position and/or the volumes of the far-field leakage.

Figure 38:
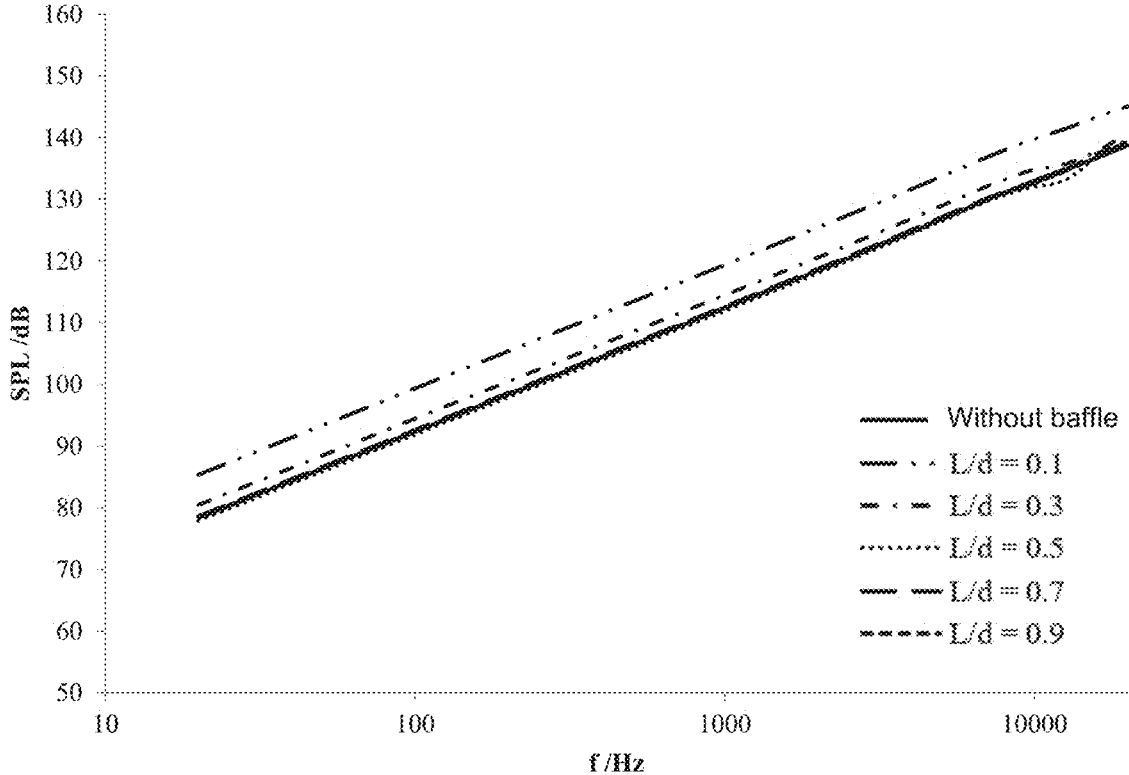
FIG. 38 is a graph illustrating a variation of a volume of the near-field sound as a function of frequency when a baffle is at different positions according to some embodiments of the present disclosure.
Figure 39:
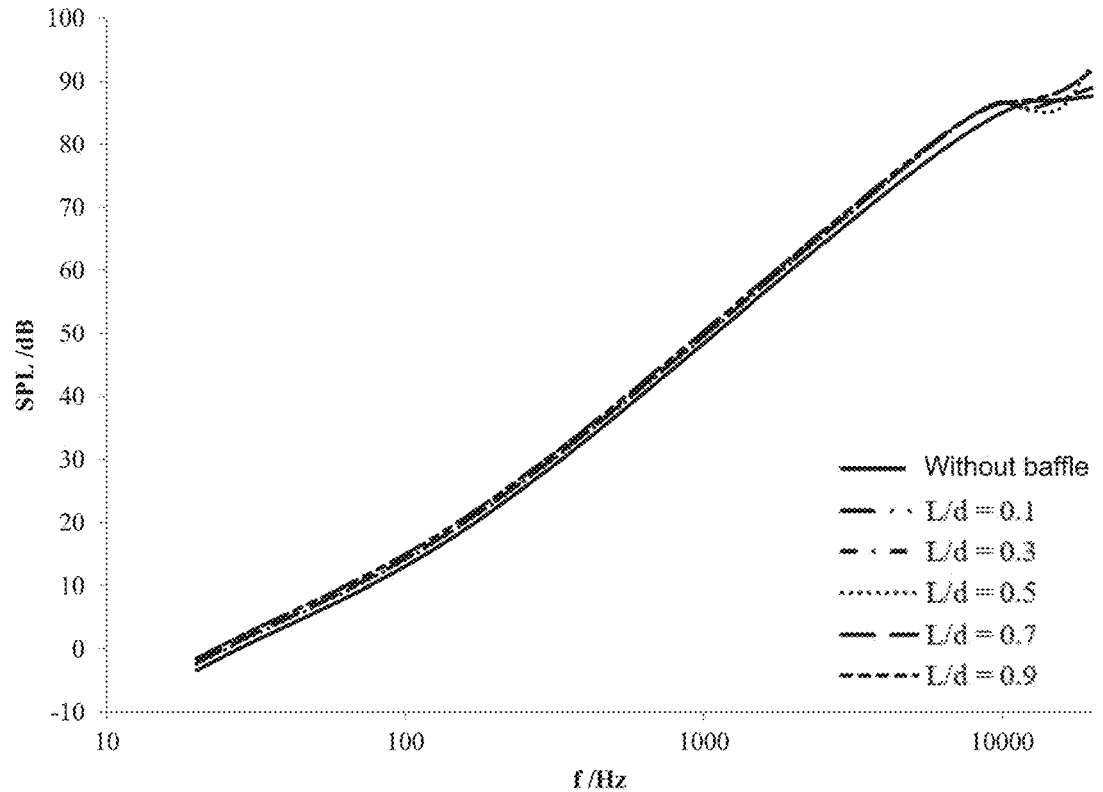
FIG. 39 is a graph illustrating a variation of a volume of the far-field leakage as a function of frequency when a baffle is at different positions according to some embodiments of the present disclosure.
Figure 40:
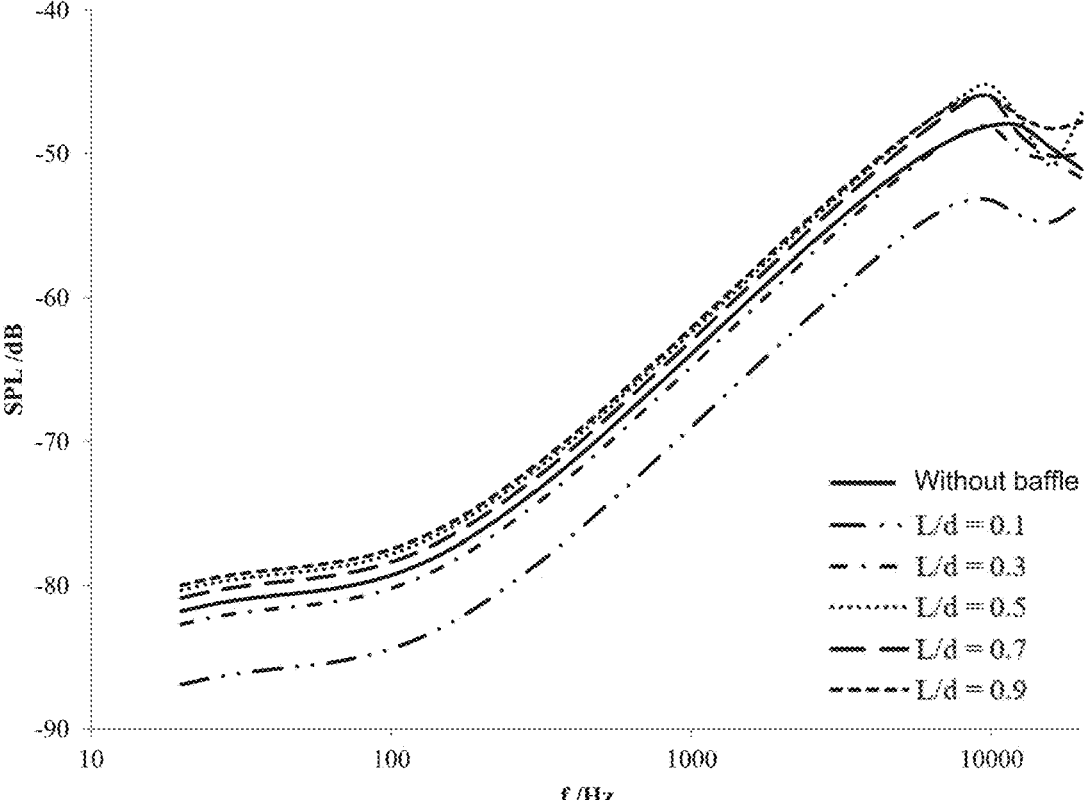
FIG. 40 is a graph illustrating a variation of a normalization parameter as a function of frequency when a baffle is at different positions according to some embodiments of the present disclosure.

FIG. 38 is a graph illustrating a variation of the volume of a near-field sound as a function of the frequency of sound when a baffle is at different positions according to some embodiments of the present disclosure. FIG. 39 is a graph illustrating a variation of the volume of a far-field leakage as a function of the frequency of sound when a baffle is at different positions according to some embodiments of the present disclosure. FIG. 40 is a graph illustrating a variation of a normalization parameter as a function of the frequency of sound when a baffle is at different positions according to some embodiments of the present disclosure. According to FIGS. 38-40, the volume of the far-field leakage may vary little with the change of the position of the baffle between the two point sources. In a situation that the distance d between the point source a1 and the point source a2 remains constant, when L decreases, the volume at the listening position may increase, the normalization parameter may decrease, and the capability to reduce sound leakage may be enhanced. In the same situation, when L increases, the volume at the listening position may increase, the normalization parameter may increase, and the capability to reduce sound leakage may be weakened. A reason for the above result may be that when L is small, the listening position may be close to the baffle, an acoustic route of the sound wave from the point source a2 to the listening position may be increased due to the baffle. In this case, an acoustic route difference between the point source a1 and the point source a2 to the listening position may be increased and the interference cancellation of the sound may be reduced. As a result, the volume at the listening position may be increased after the baffle is added. When L is large, the listening position may be far away from the baffle. The baffle may have a small effect on the acoustic route difference between the point source a1 and the point source a2 to the listening position. As a result, a volume change at the listening position may be small after the baffle is added.

As described above, by designing positions of the sound guiding holes on the acoustic output apparatus, an auricle of a human body may serve as a baffle to separate different sound guiding holes when the user wears the acoustic output apparatus. In this case, a structure of the acoustic output apparatus may be simplified, and the output effect of the acoustic output apparatus may be further improved. In some embodiments, the positions of the two sound guiding holes may be properly designed so that a ratio of a distance between the sound guiding hole on the front side of the auricle and the auricle (or a contact point on the acoustic output apparatus for contact with the auricle) to a distance between the two sound guiding holes may be less than or equal to 0.5 when the user wears the acoustic output apparatus. In some embodiments, the ratio may be less than or equal to 0.3. In some embodiments, the ratio may be less than or equal to 0.1. In some embodiments, the ratio of the distance between the sound guiding hole on the front side of the auricle and the auricle (or a contact point on the acoustic output apparatus for contact with the auricle) to the distance between the two sound guiding holes may be larger than or equal to 0.05. In some embodiments, a second ratio of the distance between the two sound guiding holes to a height of the auricle may be larger than or equal to 0.2. In some embodiments, the second ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output apparatus may have a certain effect on the volumes of the near-field sound and far-field sound leakage. The acoustic route may be changed by adjusting a cavity length between a vibration diaphragm in the acoustic output apparatus and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of the lengths of the acoustic routes between the vibration diaphragm and the two sound guiding holes may be, for example, 0.5-2, 0.6-1.5, or 0.8-1.2.

In some embodiments, on the premise of keeping the phases of the sounds generated at the two sound guiding holes opposite, the amplitudes of the sounds generated at the two sound guiding holes may be changed to improve the output effect of the acoustic output apparatus. Specifically, impedances of acoustic routes connecting the acoustic driver and the two sound guiding holes may be adjusted so as to adjust the sound amplitude at each of the two sound guiding holes. In some embodiments, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance, thereby changing the impedances of the acoustic route. As another example, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic route between the acoustic driver and the other sound guiding hole may be 0.5-2 or 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output apparatus without departing from this principle. For example, the listening position may not be on the line connecting the two point sources, but may also be above, below, or in an extension direction of the line connecting the two point sources. As another example, a measurement method of the distance from a point sound source to the auricle, and a measurement method of the height of the auricle may also be adjusted according to different scenarios. These similar changes may be all within the protection scope of the present disclosure.

Figure 41:
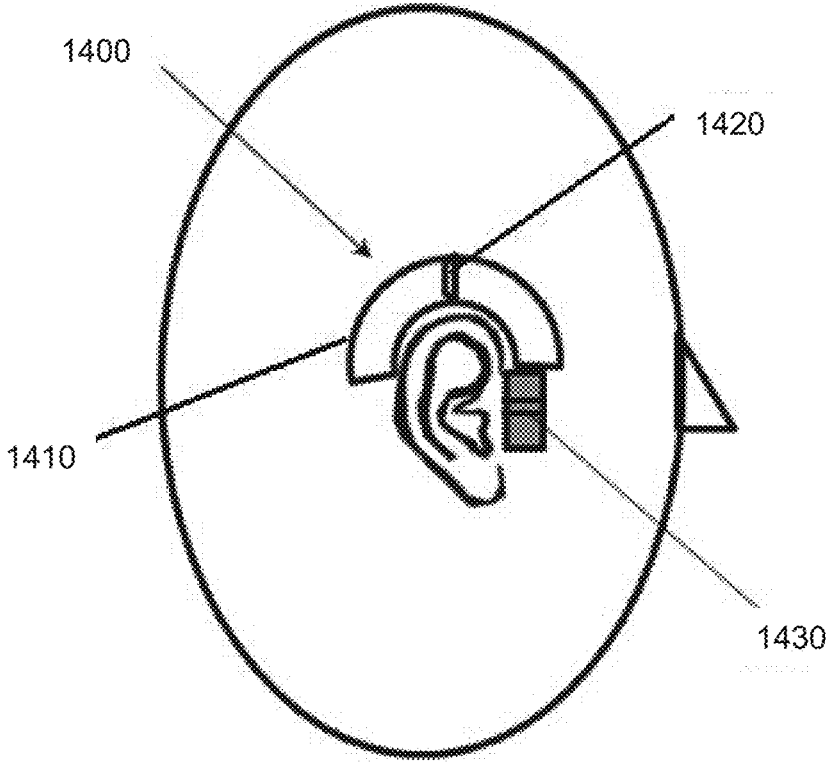
FIG. 41 is a schematic diagram illustrating another exemplary acoustic output apparatus according to some embodiments of the present disclosure.

FIG. 41 is a schematic diagram illustrating another exemplary acoustic output apparatus according to some embodiments of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two point sources may be weaker. In the high-frequency band, an optimization goal may be reducing a sound leakage. The sound leakage may be further reduced by adjusting the parameters of the two point sources of different frequencies. In some embodiments, the acoustic output apparatus 1400 may also include an acoustic driver 1430. The acoustic driver 1430 may output sounds from two of second sound guiding holes. Details regarding the acoustic driver 1430, the second sound guiding holes, and a structure therebetween may be described with reference to the acoustic driver 1420 and the first sound guiding holes. In some embodiments, the acoustic driver 1430 and the acoustic driver 1420 may output sounds of different frequencies. In some embodiments, the acoustic output apparatus may further include a controller configured to cause the acoustic driver 1420 to output sound in the first frequency range, and cause the acoustic driver 1430 to output sound in the second frequency range. The second frequency range may include frequencies higher than the first frequency range. For example, the first frequency range may be 100 Hz-1000 Hz, and the second frequency range may be 1000 Hz-10000 Hz.

In some embodiments, the acoustic driver 1420 may be a low-frequency speaker, and the acoustic driver 1430 may be a mid-high-frequency speaker. Due to different frequency response characteristics of the low-frequency speaker and the mid-high-frequency speaker, frequency bands of the output sound may also be different. High-frequency bands and low-frequency bands may be divided by using the low-frequency speakers and the mid-high-frequency speakers, and accordingly, two low-frequency point sources and two mid-high-frequency point sources may be constructed to perform near-field sound output and a far-field leakage reduction. For example, the acoustic driver 1420 may provide two point sources for outputting low-frequency sound through the sound guiding hole 1411 and the sound guiding hole 1412, which may be mainly used for outputting sound in low-frequency band. The two low-frequency point sources may be distributed on both sides of an auricle to increase a volume near the near-field ear. The acoustic driver 1430 may provide two point sources for outputting mid-high-frequency sound through two second sound guiding holes. A mid-high-frequency sound leakage may be reduced by adjusting a distance between the two second sound guiding holes. The two mid-high-frequency point sources may be distributed on both sides of the auricle or on the same side of the auricle. Alternatively, the acoustic driver 1420 may provide two point sources for outputting full-frequency sound through the sound guiding hole 1411 and the sound guiding hole 1412 so as to further increase the volume of the near-field sound.

Further, the distance d2 between the two second sound guiding holes may be less than the distance d1 between the sound guiding hole 1411 and the sound guiding hole 1412, that is, d1 may be larger than d2. For illustration purpose, as shown in FIG. 13, it may be possible to obtain a stronger sound leakage reduction capability than a single point source and one set of two point sources by setting two sets of two point sources including one set of two low-frequency point sources and one set of two high-frequency point sources with different distances.

It should be noted that the positions of the sound guiding holes of the acoustic output apparatus may be not limited to the case that the two sound guiding holes 1411 and 1412 corresponding to the acoustic driver 1420 shown in FIG. 41 are distributed on both sides of the auricle, and the case that the two sound guiding holes corresponding to the acoustic driver 1430 are distributed on the front side of the auricle. For example, in some embodiments, two second sound guiding holes corresponding to the acoustic driver 1430 may be distributed on the same side of the auricle (e.g., a rear side, an upper side, or a lower side of the auricle). As another example, in some embodiments, the two second sound guiding holes corresponding to the acoustic driver 1430 may be distributed on both sides of the auricle. In some embodiments, when the sound guiding holes 1411 and the sound guiding hole 1412 (and/or the two second sound guiding holes) are located on the same side of the auricle, a baffle may be disposed between the sound guiding holes 1411 and the sound guiding hole 1412 (and/or the two second sound guiding holes) so as to further increase the volume of the near-field sound and reduce the far-field sound leakage. For a further example, in some embodiments, the two sound guiding holes corresponding to the acoustic driver 1420 may also be located on the same side of the auricle (e.g., a front side, a rear side, an upper side, or a lower side of the auricle).

In practical applications, the acoustic output apparatus may include different application forms such as bracelets, glasses, helmets, watches, clothings, or backpacks, smart headsets, etc. In some embodiments, an augmented reality technology and/or a virtual reality technology may be applied in the acoustic output apparatus so as to enhance a user's audio experience. For illustration purposes, a pair of glasses with a sound output function may be provided as an example. Exemplary glasses may be or include augmented reality (AR) glasses, virtual reality (VR) glasses, etc.

Figure 42:
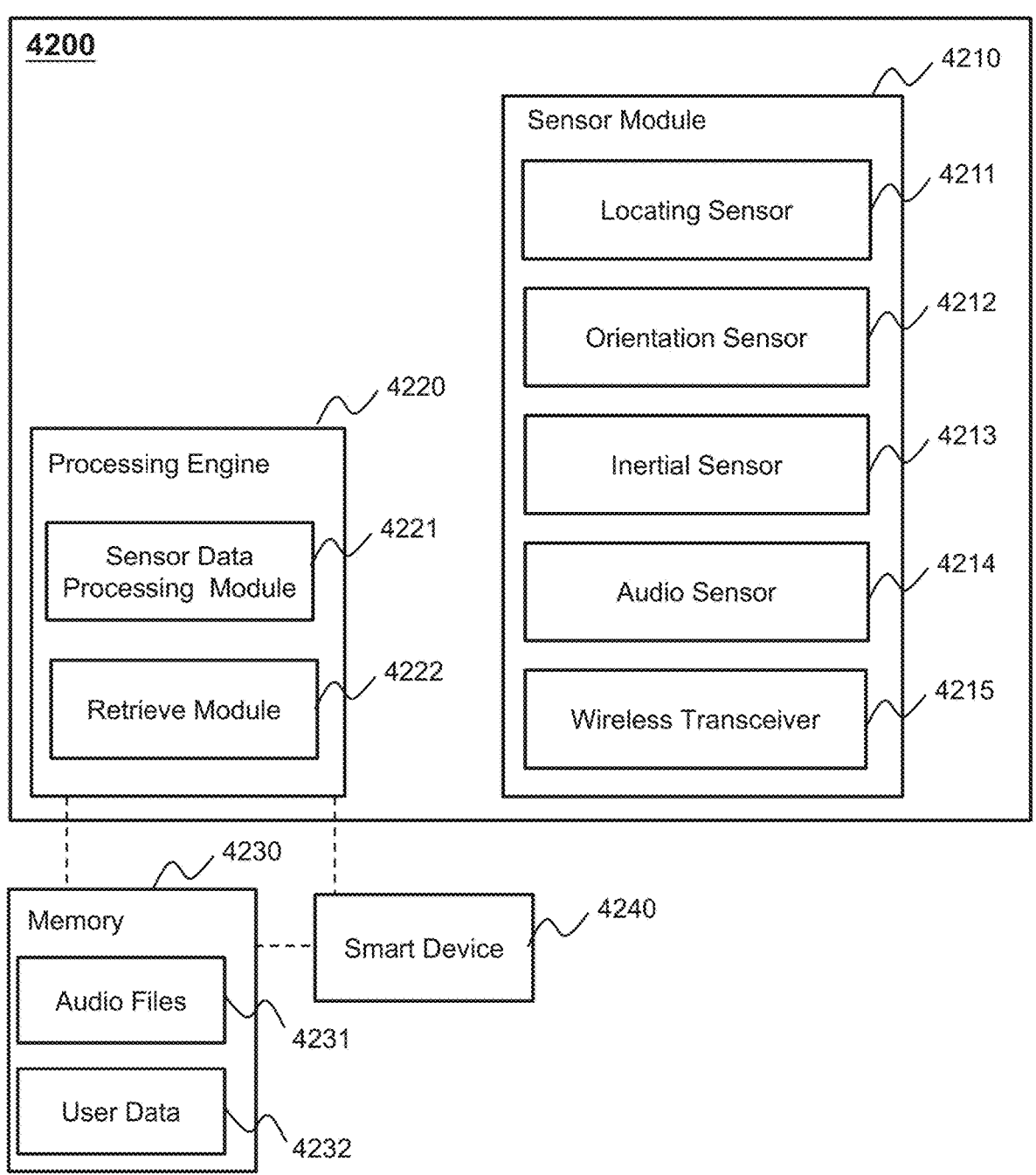
FIG. 42 is a schematic diagram illustrating an exemplary acoustic output apparatus customized for augmented reality according to some embodiments of the present disclosure.

FIG. 42 is a schematic diagram illustrating an exemplary acoustic output apparatus customized for augmented reality according to some embodiments of the present disclosure. Merely for illustration purposes, the acoustic output apparatus 4200 may be or include an AR glasses. The AR glasses may include a frame and lenses. The AR glasses may be provided with a plurality of components which may implement different functions. Details regarding structures and components of the AR glasses may be described with reference to the glasses 100 illustrated in FIG. 1. In some embodiments, the acoustic output apparatus 4200 may include a sensor module 4210 and a processing engine 4220. In some embodiments, the power source assembly may also provide electrical power to the sensor module 4210 and/or the processing engine 4220.

The sensor module 4210 may include a plurality of sensors of various types. The plurality of sensors may detect status information of a user (e.g., a wearer) of the acoustic output apparatus. The status information may include, for example, a location of the user, a gesture of the user, a direction that the user faces, an acceleration of the user, a speech of the user, etc. A controller (e.g., the processing engine 4220) may process the detected status information, and cause one or more components of the acoustic output apparatus 4200 to implement various functions or methods described in the present disclosure. For example, the controller may cause at least one acoustic driver to output sound based on the detected status information. The sound output may be originated from audio data from an audio source (e.g., a terminal device of the user, a virtual audio marker associated with a geographic location, etc.). The plurality of sensors may include a locating sensor 4211, an orientation sensor 4212, an inertial sensor 4213, an audio sensor 4214, and a wireless transceiver 4215. Merely for illustration, only one sensor of each type is illustrated in FIG. 42. Multiple sensors of each type may also be contemplated. For example, two or more audio sensors may be used to detect sounds from different directions.

The locating sensor 4211 may determine a geographic location of the acoustic output apparatus 4200. The locating sensor 4211 may determine the location of the acoustic output apparatus 4200 based on one or more location-based detection systems such as a global positioning system (GPS), a Wi-Fi location system, an infra-red (IR) location system, a bluetooth beacon system, etc. The locating sensor 4211 may detect changes in the geographic location of the acoustic output apparatus 4200 and/or a user (e.g., the user may wear the acoustic output apparatus 4200, or may be separated from the acoustic output apparatus 4200) and generate sensor data indicating the changes in the geographic location of the acoustic output apparatus 4200 and/or the user.

The orientation sensor 4212 may track an orientation of the user and/or the acoustic output apparatus 4200. The orientation sensor 4212 may include a head-tracking device and/or a torso-tracking device for detecting a direction in which the user is facing, as well as the movement of the user and/or the acoustic output apparatus 4200. Exemplary head-tracking devices or torso-tracking devices may include an optical-based tracking device (e.g., an optical camera), an accelerometer, a magnetometer, a gyroscope, a radar, etc. In some embodiments, the orientation sensor 4212 may detect a change in the user's orientation, such as a turning of the torso or an about-face movement, and generate sensor data indicating the change in the orientation of the body of the user.

The inertial sensor 4213 may sense gestures of the user or a body part (e.g., head, torso, limbs) of the user. The inertial sensor 4213 may include an accelerometer, a gyroscope, a magnetometer, or the like, or any combination thereof. In some embodiments, the accelerometer, the gyroscope, and/ or the magnetometer may be independent components. In some embodiments, the accelerometer, the gyroscope, and/ or the magnetometer may be integrated or collectively housed in a single sensor component. In some embodiments, the inertial sensor 4213 may detect an acceleration, a deceleration, a tilt level, a relative position in the three-dimensional (3D) space, etc. of the user or a body part (e.g., an arm, a finger, a leg, etc.) of the user, and generate sensor data regarding the gestures of the user accordingly.

The audio sensor 4214 may detect sound from the user, a smart device 4240, and/or ambient environment. In some embodiments, the audio sensor 4214 may include one or more microphones, or a microphone array. The one or more microphones or the microphone array may be housed within the acoustic output apparatus 4200 or in another device connected to the acoustic output apparatus 4200. In some embodiments, the one or more microphones or the microphone array may be generic microphones. In some embodiments, the one or more microphones or the microphone array may be customized for VR and/or AR.

In some embodiments, the audio sensor 4214 may be positioned so as to receive audio signals proximate to the acoustic output apparatus 4200, e.g., speech/voice input by the user to enable a voice control functionality. For example, the audio sensor 4214 may detect sounds of the user wearing the acoustic output apparatus 4200 and/or other users proximate to or interacting with the user. The audio sensor 4214 may further generate sensor data based on the received audio signals.

The wireless transceiver 4215 may communicate with other transceiver devices in distinct locations. The wireless transceiver 4215 may include a transmitter and a receiver. Exemplary wireless transceivers may include, for example, a Local Area Network (LAN) transceiver, a Wide Area Network (WAN) transceiver, a ZigBee transceiver, a Near Field Communication (NFC) transceiver, a bluetooth (BT) transceiver, a bluetooth Low Energy (BTLE) transceiver, or the like, or any combination thereof. In some embodiments, the wireless transceiver 4215 may be configured to detect an audio message (e.g., an audio cache or pin) proximate to the acoustic output apparatus 4200, e.g., in a local network at a geographic location or in a cloud storage system connected with the geographic location. For example, another user, a business establishment, a government entity, a tour group, etc. may leave an audio message at a particular geographic or virtual location, and the wireless transceiver 4215 may detect the audio message, and prompt the user to initiate a playback of the audio message.

In some embodiments, the sensor module 4210 (e.g., the locating sensor 4211, the orientation sensor 4212, and the inertial sensor 4213) may detect that the user moves toward or looks in a direction of a point of interest (POI). The POI may be an entity corresponding to a geographic or virtual location. The entity may include a building (e.g., a school, a skyscraper, a bus station, a subway station, etc.), a landscape (e.g., a park, a mountain, etc.), or the like. In some embodiments, the entity may be an object specified by a user. For example, the entity may be a favorite coffee shop of the user. In some embodiments, the POI may be associated with a virtual audio marker. One or more localized audio messages may be attached to the audio marker. The one or more localized audio message may include, for example, a song, a pre-recorded message, an audio signature, an advertisement, a notification, or the like, or any combination thereof.

The processing engine 4220 may include a sensor data processing module 4221 and a retrieve module 4222. The sensor data processing module 4221 may process sensor data obtained from the sensor module 4210 (e.g., the locating sensor 4211, the orientation sensor 4212, the inertial sensor 4213, the audio sensor 4214, and/or the wireless transceiver 4215), and generate processed information and/ or data. The information and/or data generated by the sensor data processing module 4221 may include a signal, a representation, an instruction, or the like, or any combination thereof. For example, the sensor data processing module 4221 may receive sensor data indicating the location of the acoustic output apparatus 4200, and determine whether the user is proximate to a POI or whether the user is facing towards a POI. In response to a determination that the user is proximate to the POI or the user is facing towards the POI, the sensor data processing module 4221 may generate a signal and/or an instruction used for causing the retrieve module 4222 to obtain an audio message (i.e., a localized audio message associated with the POI). The audio message may be further provided to the user via the acoustic output apparatus 4200 for playback.

Optionally or additionally, during the playback of the audio message, an active noise reduction (ANR) technique may be performed so as to reduce noise. As used herein, the ANR may refer to a method for reducing undesirable sound by generating additional sound specifically designed to cancel the noise in the audio message according to the reversed phase cancellation principle. The additional sound may have an reversed phase, a same amplitude, and a same frequency as the noise. Merely by way of example, the acoustic output apparatus 4200 may include an ANR module (not shown) configured to reduce the noise. The ANR module may receive sensor data generated by the audio sensor 4214, signals generated by the processing engine 4220 based on the sensor data, or the audio messages received via the wireless transceiver 4215, etc. The received data, signals, audio messages, etc. may include sound from a plurality of directions, which may include desired sound received from a certain direction and undesired sound (i.e., noise) received from other directions. The ANR module may analyze the noise, and perform an ANR operation to suppress or eliminate the noise.

In some embodiments, the ANR module may provide a signal to a transducer (e.g., the transducer 843, the transducer 853, or any other transducers) disposed in the acoustic output apparatus to generate an anti-noise acoustic signal. The anti-noise acoustic signal may reduce or substantially prevent the noises from being heard by the user. In some embodiments, the anti-noise acoustic signal may be generated according to the noise detected by the acoustic output apparatus (e.g., the audio sensor 4214). For example, the anti-noise acoustic signal may have a same amplitude, a same frequency, and a reverse phase as the detected noise.

The processing engine 4220 may be coupled (e.g., via wireless and/or wired connections) to a memory 4230. The memory 4230 may be implemented by any storage device capable of storing data. In some embodiments, the memory 4230 may be located in a local server or a cloud-based server, etc. In some embodiments, the memory 4230 may include a plurality of audio files 4231 for playback by the acoustic output apparatus 4200 and/or user data 4232 of one or more users. The audio files 4231 may include audio messages (e.g., audio pins or caches created by the user or other users), audio information provided by automated agents, or other audio files available from network sources coupled with a network interface, such as a network-attached storage (NAS) device, a DLNA server, etc. The audio files 4231 may be accessible by the acoustic output apparatus 4200 over a local area network such as a wireless (e.g., Wi-Fi) or wired (e.g., Ethernet) network. For example, the audio files 4231 may include localized audio messages attached to virtual audio markers associated with a POI, which may be accessed when a user is proximate to or facing towards a POI.

The user data 4232 may be user-specific, community-specific, device-specific, location-specific, etc. In some embodiments, the user data 4232 may include audio information related to one or more users. Merely by ways of example, the user data 4232 may include user-defined playlists of digital music files, audio messages stored by the user or other users, information about frequently played audio files associated with the user or other similar users (e.g., those with common audio file listening histories, demographic traits, or Internet browsing histories), "liked" or otherwise favored audio files associated with the user or other users, a frequency at which the audio files 4231 are updated by the user or other users, or the like, or any combination thereof. In some embodiments, the the user data 4232 may further include basic information of the one or more users. Exemplary bacis information may include names, ages, careers, habits, preferences, etc.

The processing engine 4220 may also be coupled with a smart device 4240 that has access to user data (e.g., the user data 4232) or biometric information about the user. The smart device 4240 may include one or more personal computing devices (e.g., a desktop or laptop computer), wearable smart devices (e.g., a smart watch, a smart glasses), a smart phone, a remote control device, a smart beacon device (e.g., a smart bluetooth beacon system), a stationary speaker system, or the like, or any combination thereof. In some embodiments, the smart device 4240 may include a conventional user interface for permitting interaction with the user, one or more network interfaces for interacting with the processing engine 4220 and other components in the acoustic output apparatus 4200. In some embodiments, the smart device 4240 may be utilized to connect the acoustic output apparatus 4200 to a Wi-Fi network, creating a system account for the user, setting up music and/or location-based audio services, browsing content for playback, setting assigments of the acoustic output apparatus 4200 or other audio playback devices, transporting control (e.g., play/pause, fast forward/rewind, etc.) of the acoustic output apparatus 4200, selecting one or more acoustic output apparatus for content playback (e.g., a single room playback or a synchronized multi-room playback), etc. In some embodiments, the smart device 4240 may further include sensors for measuring biometric information about the user. Exemplary biometric information may include travel, sleep, or exercise patterns, body temperature, heart rates, paces of gait (e.g., via accelerometers), or the like, or any combination thereof.

The retrieve module 4222 may be configured to retrieve data from the memory 4230 and/or the smart device 4240 based on the information and/or data generated by the sensor data processing module 4221, and determine audio message for playback. For example, the sensor data processing module 4221 may analyze one or more voice commands from the user (obtained from the audio sensor 4214), and determine an instruction based on the one or more voice commands. The retrieve module 4222 may obtain and/or modify a localized audio message based on the instruction. As another example, the sensor data processing module 4221 may generate signals indicating that a user is proximate to a POI and/or the user is facing towards the POI. Accordingly, the retrieve module 4222 may obtain a localized audio message associated with the POI based on the signals. As a further example, the sensor data processing module 4221 may generate a representation indicating a characteristic of a location as a combination of factors from the sensor data, the user data 4232 and/or information from the smart device 4240. The retrieve module 4222 may obtain the audio message based on the representation.

Figure 43:
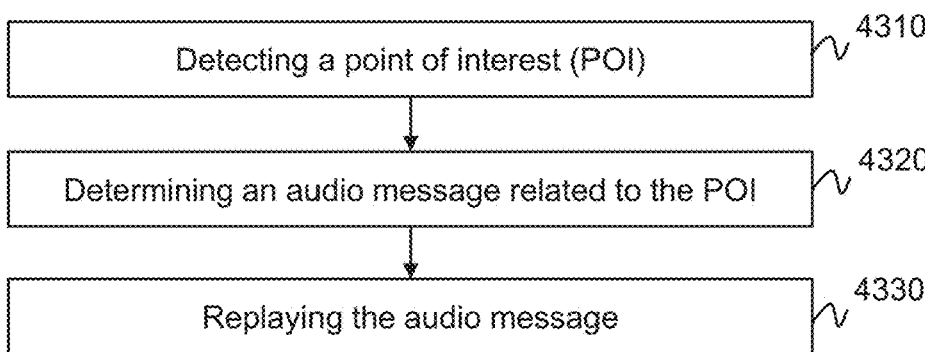
FIG. 43 is a flowchart illustrating an exemplary process for replaying an audio message according to some embodiments of the present disclosure.

FIG. 43 is a flowchart illustrating an exemplary process for replaying an audio message according to some embodiments of the present disclosure.

In 4310, a point of interest (POI) may be detected. In some embodiments, the POI may be detected by the sensor module 4210 of the acoustic output apparatus 4200.

As used herein, the POI may be an entity corresponding to a geographic or virtual location. The entity may include a building (e.g., a school, a skyscraper, a bus station, a subway station, etc.), a landscape (e.g., a park, a mountain, etc.), or the like, or any combination thereof. In some embodiments, the entity may be an object specified by the user. For example, the entity may be a favorite coffee shop of the user. In some embodiments, the POI may be associated with a virtual audio marker. One or more localized audio messages may be attached to the audio marker. The one or more localized audio message may include, for example, a song, a pre-recorded message, an audio signature, an advertisement, a notification, or the like, or any combination thereof.

In some embodiments, the sensor module 4210 (e.g., the locating sensor 4211, the orientation sensor 4212, and the inertial sensor 4213) may detect that a user wearing the acoustic output apparatus 4200 moves toward to or looks in the direction of the POI. Specifically, the sensor module 4210 (e.g., the locating sensor 4211) may detect changes in a geographic location of the user, and generate sensor data indicating the changes in the geographic location of the user. The sensor module 4210 (e.g., the orientation sensor 4212) may detect changes in an orientation of the user (e.g., the head of the user), and generate sensor data indicating the changes in the orientation of the user. The sensor module 4210 (e.g., the inertial sensor 4213) may also detect gestures (e.g., via an acceleration, a deceleration, a tilt level, a relative position in the three-dimensional (3D) space, etc. of the user or a body part (e.g., an arm, a finger, a leg, etc.)) of the user, and generate sensor data indicating the gestures of the user. The sensor data may be transmitted, for example, to the processing engine 4220 for further processing. For example, the processing engine 4220 (e.g., the sensor data processing module 4221) may process the sensor data, and determine whether the user moves toward to or looks in the direction of the POI.

In some embodiments, other information may also be detected. For example, the sensor module 4210 (e.g., the audio sensor 4214) may detect sound from the user, a smart device (e.g., the smart device 4240), and/or ambient environment. Specifically, one or more microphones or a microphone array may be housed within the acoustic output apparatus 4200 or in another device connected to the acoustic output apparatus 4200. The sensor module 4210 may detect sound using the one or more microphones or the microphone array. In some embodiments, the sensor module 4210 (e.g., the wireless transceiver 4215) may communicate with transceiver devices in distinct locations, and detect an audio message (e.g., an audio cache or pin) when the acoustic output apparatus 4200 is proximate to the transceiver devices. In some embodiments, other information may also be transmitted as part of the sensor data to the processing engine 4220 for processing.

In 4320, an audio message related to the POI may be determined. In some embodiments, the audio message related to the POI may be determined by the processing engine 4220.

In some embodiments, the processing engine 4220 (e.g., the sensor data processing module 4221) may generate information and/or data based at least in part on the sensor data. The information and/or data include a signal, a representation, an instruction, or the like, or any combination thereof. Merely by way of example, the sensor data processing module 4221 may receive sensor data indicating a location of a user, and determine whether the user is proximate to or facing towards the POI. In response to a determination that the user is proximate to the POI or facing towards the POI, the sensor data processing module 4221 may generate a signal and/or an instruction causing the retrieve module 4222 to obtain an audio message (i.e., a localized audio message attached to an audio marker associated with the POI). As another example, the sensor data processing module 4221 may analyze sensor data related to a voice command detected from a user (e.g., by performing a natural language processing), and generate a signal and/or an instruction related to the voice command. As a further example, the sensor data processing module 4221 may generate a representation by weighting the sensor data, user data (e.g., the user data 4232), and other available data (e.g., a demographic profile of a plurality of users with at least one common attribute with the user, a categorical popularity of an audio file, etc.). The representation may indicate a general characteristic of a location as a combination of factors from the sensor data, the user data and/or information from a smart device.

Further, the processing engine 4220 (e.g., the retrieve module 4222) may determine an audio message related to the POI based on the generated information and/or the data. For example, the processing engine 4220 may retrieve an audio message from the audio files 4231 in the memory 4230 based on a signal and/or an instruction related to a voice command. As another example, the processing engine 4220 may retrieve an audio message based on a representation and relationships between the representation and the audio files

4231. The relationships may be predetermined and stored in a storage device. As a further example, the processing engine 4220 may retrieve a localized audio message related to a POI when a user is proximate to or facing towards the POI. In some embodiments, the processing engine 4220 may determine two or more audio messages related to the POI based on the information and/or the data. For example, when a user is proximate to or facing towards the POI, the processing engine 4220 may determine audio messages including "liked" music files, audio files accessed by other users at the POI, or the like, or any combination thereof.

Taking an acoustic output apparatus customized for VR as an example, the acoustic output apparatus may determine an audio message related to a POI based at least in part on sensor data obtained by sensors disposed in the acoustic output apparatus. For example, the POI may be a historical site associated with a virtual audio marker having one or more localized audio messages. When the user wearing the acoustic output apparatus is proximate to or facing towards the historical site, the localized audio messages may be recommended to the user via a virtual interface. The one or more localized audio messages may include virtual environment data used to relive historical stories of the historical site. In the virtual environment data, sound data may be properly designed for simulating sound effects of different scenarios. For example, sound may be transmitted from different sound guiding holes to simulate sound effects of different directions. As another example, the volume and/or delay of sound may be adjusted to simulate sound effects at different distances.

Figure 44:
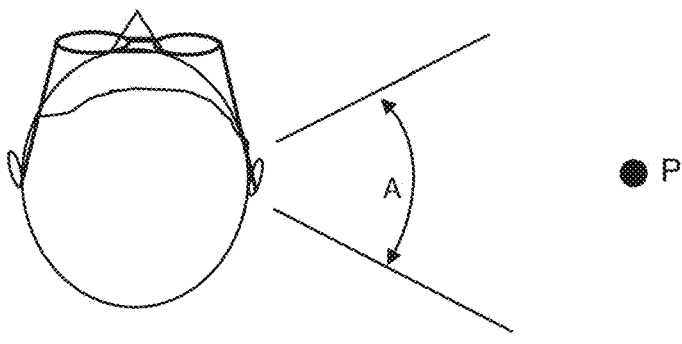
FIG. 44 is a schematic diagram illustrating an exemplary acoustic output apparatus focusing on sounds in a certain direction according to some embodiments of the present disclosure.

Taking an acoustic output apparatus customized for AR as another example, the acoustic output apparatus may determine an audio message related to a POI based at least in part on sensor data obtained by sensors disposed in the acoustic output apparatus. Additionally, the audio message may be combined with real-world sound in ambient environment so as to enhance an audio experience of the user. The real-world sound in ambient environment may include sounds in all directions of the ambient environment, or may be sounds in a certain direction. Merely by way of example, FIG. 44 is a schematic diagram illustrating an exemplary acoustic output apparatus focusing on sounds in a certain direction according to some embodiments of the present disclosure. As illustrated in FIG. 44, when a user is proximate to a POI P, an acoustic output apparatus (e.g., the acoustic output apparatus 4200) worn by the user may focus on sound received from a virtual audio cone. The vertex of the virtual audio cone may be the acoustic output apparatus. The virtual audio cone may have any suitable size, which may be determined by an angle of the virtual audio cone. For example, the acoustic output apparatus may focus on sound of a virtual audio cone with an angle of, for example, 20°, 40°, 60°, 80°, 120°, 180°, 270°, 360°, etc. In some embodiments, to focus on sound within the range of the virtual audio cone, the acoustic output apparatus may improve audibility of most or all sound in the virtual audio cone. For example, an ANR technique may be used by the acoustic output apparatus so as to reduce or substantially prevent sound in other directions (e.g., sounds outside of the virtual audio cones) from being heard by the user. Additionally, the POI may be associated with virtual audio markers to which localized audio messages may be attached. The localized audio messages may be accessed when the user is proximate to or facing towards the POI. That is, the localized audio messages may be overlaid on the sound in the virtual audio cone so as to enhance an audio experience of the user. In some embodiments, a direction and/or a virtual audio cone of the sound focused by the acoustic output apparatus may be determined according to actual needs. For example, the acoustic output apparatus may focus on sound in a plurality of virtual audio cones in different directions simultaneously. As another example, the acoustic output apparatus may focus on sound in a specified direction (e.g., the north direction). As a further example, the acoustic output apparatus may focus on sound in a walking direction and/or a facing direction of the user.

In 4330, the audio message may be replayed. In some embodiments, the audio message may be replayed by the processing engine 4220.

In some embodiments, the processing engine 4220 may replay the audio message via the acoustic output apparatus 4200 directly. In some embodiments, the processing engine 4220 may prompt the user to initiate a playback of the audio message. For example, the processing engine 4220 may output a prompt (e.g., a voice prompt via a sound guiding hole, a visual representation via a virtual user-interface) to the user. The user may respond to the prompt by interacting with the acoustic output apparatus 4200. For example, the user may interact with the acoustic output apparatus 4200 using, for example, gestures of his/her body (e.g., head, torso, limbs, eyeballs), voice command, etc.

Figure 45:
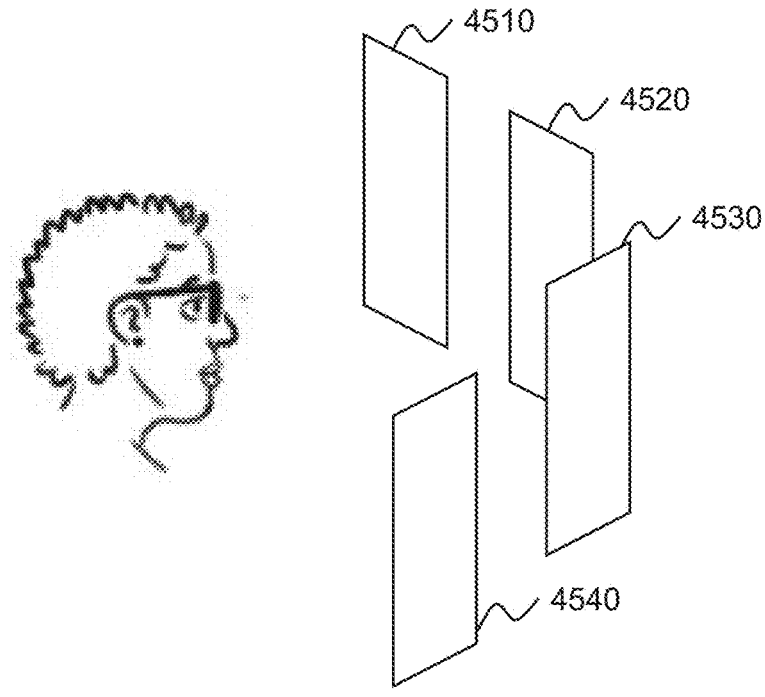
FIG. 45 is a schematic diagram illustrating an exemplary user interface of an acoustic output apparatus according to some embodiments of the present disclosure.

Taking an acoustic output apparatus customized for AR as another example, the user may interact with the acoustic output apparatus via a virtual user-interface (UI). FIG. 45 is a schematic diagram illustrating an exemplary UI of the acoustic output apparatus. As illustrated in FIG. 45, the virtual UI may be present in a head position and/or a gaze direction of the user. In some embodiments, the acoustic output apparatus may provide a plurality of audio samples, information, or choices corresponding to spatially delineated zones (e.g., 4510, 4520, 4530, 4540) in an array defined relative to a physical position of the acoustic output apparatus. Each audio sample or piece of information provided to the user may correspond to an audio message to be replayed. In some embodiments, the audio samples may include a selection of an audio file or stream, such as a representative segment of the audio content (e.g., an introduction to an audio book, a highlight from a sporting broadcast, a description of the audio file or stream, a description of an audio pin, an indicator of the presence of an audio pin, an audio beacon, a source of an audio message). In some embodiments, the audio samples may include entire audio content (e.g., an entire audio file). In some embodiments, the audio samples, information, or choices may be used as prompts for the user. The user may respond to the prompts by interacting with the acoustic output apparatus. For example, the user may click on a zone (e.g., 4520) to initiate a playback of entire audio content corresponding to the audio sample presented in the zone. As another example, the user may shake his/her head to switch between different zones.

Beneficial effects of the present disclosure may include but not limited to: (1) wires or connections between different elements or components inside the acoustic output apparatus may be simplified; (2) mutual influence between wires or connections may be reduced and sound quality of the acoustic output apparatus may be improved; (3) a pair of high-frequency two point sources and a pair of low-frequency two point sources may be provided to output sound in different frequency bands, thereby achieving better acoustic output effect; (4) two point sources with different distances may be provided, such that the acoustic output apparatus may have a stronger capability to reduce sound leakage in higher frequency bands, which may meet requirements for an open acoustic output apparatus; (5) an acoustic route difference between two point sources and a listening position may be increased by disposing a baffle structure, which may improve a volume of sound heard by the user in the near field and reduce a volume of leaked sound in the far field, thereby providing a better acoustic output effect; (6) AR technology and/or VR technology may be combined with the acoustic output apparatus so as to enhance the user's audio experience. It should be noted that different embodiments may have different beneficial effects. In various embodiments, the acoustic output apparatus may have any one or a combination of the benefits exemplified above, and any other beneficial effects that can be obtained.

We claim:

1. An acoustic output apparatus, comprising:
   an earphone core including at least one acoustic driver for outputting sound through at least one sound guiding hole;
   one or more sensors configured to detect status information of a user; and
   a controller configured to cause the at least one acoustic driver to output sound based on the detected status information, wherein the at least one acoustic driver includes a low-frequency acoustic driver that outputs sound from at least two first sound guiding holes and a high-frequency acoustic driver that outputs sound from at least two second sound guiding holes, and the controller is configured to: cause the acoustic output apparatus to focus on sound received from a virtual audio cone based on a point of interest (POI).

2. The acoustic output apparatus of claim 1, wherein the at least one sound guiding hole includes two or more sound guiding holes, and to cause the at least one acoustic driver to output sound based on the detected status information, the controller is further configured to:
   transmit the sound from different sound guiding holes in the two or more sound guiding holes to simulate sound effects of different directions.

3. The acoustic output apparatus of claim 1, wherein the one or more sensors is further configured to detect the POI that the user is proximate to or facing towards.

4. The acoustic output apparatus of claim 3, wherein to cause the at least one acoustic driver to output sound based on the detected status information of the user, the controller is further configured to
   determine an audio message related to the POI; and
   cause the at least one acoustic driver to replay the audio message upon the detection of the POI by the one or more sensors.

5. The acoustic output apparatus of claim 4, wherein to determine the audio message related to the POI, the controller is configured to:
   generate information based at least in part on sensor data detected by the one or more sensors; and
   determine the audio message related to the POI based on the generated information.

6. The acoustic output apparatus of claim 5, wherein to generate information based at least in part on sensor data detected by the one or more sensors, the controller is configured to:
   generate a representation by weighting at least one of the sensor data, user data of the user, a demographic profile of a plurality of users with at least one common attribute with the user, a categorical popularity of an audio file.

7. The acoustic output apparatus of claim 4, wherein to cause the at least one acoustic driver to replay the audio message upon the detection of the POI by the one or more sensors, the controller is configured to:

obtain sensor data detected by the one or more sensors;

determine whether the user is proximate to or facing towards the POI based on the sensor data; and in response to determining that the user is proximate to or facing towards the direction of the POI, cause the at least one acoustic driver to replay the audio message.

8. The acoustic output apparatus of claim 1, wherein to cause the acoustic output apparatus to focus on sound received from a virtual audio cone based on a POI, the controller is configured further to:

reduce sound outside of the virtual audio cone from being heard by the user using an active noise reduction (ANR) technique.

9. The acoustic output apparatus of claim 1, wherein to cause the at least one acoustic driver to output sound based on the detected status information, the controller is configured further to:

determine an audio message related to the POI; and cause the at least one acoustic driver to output sound by overlaying the audio message on the sound received from the virtual audio cone.

10. The acoustic output apparatus of claim 1, wherein the controller is further configured to provide a virtual user-interface through which a user interacts with the acoustic output apparatus.

11. The acoustic output apparatus of claim 10, wherein to cause the at least one acoustic driver to output sound based on the detected status information, the controller is further configured to:

determine one or more audio messages based on the detected status information;

causing the acoustic output apparatus to display a plurality of zones via the virtual user-interface, each of the plurality of zones corresponding to one of the one or more audio messages;

receive, from the user, a selection of a zone from the plurality of zones; and cause the at least one acoustic driver to replay an audio message corresponding to the zone.

12. The acoustic output apparatus of claim 11, wherein the first frequency range and the second frequency range at least in part overlap.

13. The acoustic output apparatus of claim 10, wherein the user interacts with the acoustic output apparatus through at least one of gestures of a body of the user or a voice command.

14. The acoustic output apparatus of claim 1, wherein the status information of the user includes at least one of a location of the user, a gesture of the user, a direction that the user faces, an acceleration of the user, or a speech of the user.

15. The acoustic output apparatus of claim 1, wherein the one or more sensors include at least one of a locating sensor, an orientation sensor, an inertial sensor, an audio sensor, or a wireless transceiver.

16. The acoustic output apparatus of claim 1, wherein the low-frequency acoustic driver and the at least two first sound guiding holes form a first acoustic route, the high-frequency acoustic driver and the at least two second sound guiding holes form a second acoustic route, and the first acoustic route and the second acoustic route have different frequency selection characteristics.

17. The acoustic output apparatus of claim 1, wherein the controller causes the low-frequency acoustic driver to output sound in a first frequency range and the high-frequency acoustic driver to output sound in a second frequency range, and the second frequency range including frequencies higher than the first frequency range.

\* \* \* \* \*